United States Patent
Shanahan et al.

(10) Patent No.: US 6,732,090 B2
(45) Date of Patent: May 4, 2004

(54) META-DOCUMENT MANAGEMENT SYSTEM WITH USER DEFINABLE PERSONALITIES

(75) Inventors: James G. Shanahan, Pittsburgh, PA (US); Gregory T. Grefenstette, Gieres (FR); Christer Fernstrom, St-Ismier (FR); Laurence Hubert, St Bernard du Touvet (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/683,236

(22) Filed: Dec. 5, 2001

(65) Prior Publication Data

US 2003/0033287 A1 Feb. 13, 2003

Related U.S. Application Data

(60) Provisional application No. 60/311,857, filed on Aug. 13, 2001.

(51) Int. Cl.[7] .............................................. G06F 17/30
(52) U.S. Cl. ........................... 707/3; 707/101; 715/500; 715/515
(58) Field of Search .............................. 707/1, 2, 3, 4, 707/5, 6, 7, 100, 101, 102, 500; 715/515, 517, 526, 500.1

(56) References Cited

U.S. PATENT DOCUMENTS

| | | | |
|---|---|---|---|
| 5,359,514 A | 10/1994 | Manthuruthil et al. | 364/419 |
| 5,367,621 A | 11/1994 | Cohen et al. | 707/500.1 |
| 5,822,720 A | 10/1998 | Bookman et al. | 704/3 |

(List continued on next page.)

FOREIGN PATENT DOCUMENTS

| | | |
|---|---|---|
| EP | 0 986 010 A2 | 3/2000 |
| EP | 1 087 306 A2 | 3/2001 |
| EP | 1 143 356 A2 | 10/2001 |
| WO | WO 00/67159 A2 | 11/2000 |
| WO | WO 01/31479 A1 | 5/2001 |

OTHER PUBLICATIONS

U.S. patent application Ser. No. 09/746,917 "Recommended System And Method", filed Dec. 22, 2000.

Alexa Internet, "Alexa What's Related for Netscape Navigator", available on the Internet Apr. 2001 at http://www.alexa.com/prod_serv/netscape.html.

Alexa Internet, "Alexa Related Links for Microsoft IE", available on the Internet Apr. 2001 at http://www.alexa.com/prod_serv/msie.html.

Autonomy, Technology White Paper, available on the Internet Apr. 2001 at http://www.autonomy.com/echo/userfile/Technology_White_Paper.pdf.

(List continued on next page.)

Primary Examiner—Kim Vu
Assistant Examiner—Isaac Woo

(57) ABSTRACT

A system operates using meta-documents which include document content associated with one or more personalities. Each personality is associated with a set of document service requests. Users are provided different techniques for creating personalities and modifying existing personalities. These techniques include: the use of an algebra to tailor existing personalities, the use of a list of links or documents to create a personality, the use of predefined personalities and knowledge levels in a field to create new personalities, the use of question answering techniques, and the use of learning personalities. Specified personalities are then used to enrich document content by integrating into corresponding meta-documents the results received from their document service requests.

25 Claims, 69 Drawing Sheets

U.S. PATENT DOCUMENTS

| | | | | |
|---|---|---|---|---|
| 5,930,787 A | | 7/1999 | Minakuchi et al. | 707/4 |
| 5,940,614 A | | 8/1999 | Allen et al. | 707/501.1 |
| 5,963,205 A | * | 10/1999 | Sotomayor | 707/531 |
| 6,029,182 A | * | 2/2000 | Nehab et al. | 715/523 |
| 6,092,074 A | | 7/2000 | Rodkin et al. | 707/102 |
| 6,161,124 A | | 12/2000 | Takagawa et al. | 709/203 |
| 6,178,430 B1 | * | 1/2001 | Cohen et al. | 707/501.1 |
| 6,189,019 B1 | * | 2/2001 | Blumer et al. | 707/102 |
| 2001/0047365 A1 | * | 11/2001 | Yanaitis | 707/3 |

OTHER PUBLICATIONS

Autonomy, ActiveKnowledge(TM), available on the Internet Apr. 2001 at http://www.autonomy.com/echo/userfile/PB_Autonomy_ActiveKnowledge (02.01).pdf.

Cooper et al. in "A Simple Answering System", published in proceedings of the Ninth Text REtrieval Conference (TREC–9) held in Gaithersburg, Maryland, Nov. 13–16, 2000.

"Searchandfind, Inxight Thing Finder SDK", Inxight Software, Inc., ThingFinder SDK Data Sheet, available on the Internet Apr. 2001 at http://www.inxight.com/pdfs/products/tf_sdk_ds.pdf.

Jon Kleinberg, "Authoritative sources in a hyperlinked environment", Technical Report RJ 10076, IBM, May 1997.

Kenichi Kamiya, Martin Röscheisen, And Terry Winograd. "Grassroots: A System Providing A Uniform Framework for Communicating, Structuring, Sharing Information, and Organizing People". Fifth International World Wide Web Conference, May 6–10, 1996, Paris, France.

A. McCallum, K. Nigam, "Text Classification by Bootstrapping with Keywords", EM and Shrinkage, ACL Workshop for Unsupervised Learning in Natural Language Processing, 1999.

Projects, "Watson", available on the Internet Apr. 2001 at http://dent.infolab.nwu.edu/infolab/projects/project.asp?ID=5.

Budzik, J., And Hammond, K. J., "Watson: Anticipating and Contextualizing Information Needs". In Proceedings of the Sixty–second Annual Meeting of the American Society for Information Science. Information Today, Inc., Medford, NJ, 1999.

Budzik, J., Hammond, K., And Birnbaum, L. "Information access in context", available on the Internet Apr. 2001 at http://dent.infolab.nwu.edu/infolab/projects/project.asp?ID=5.

Paul Festa, "Amazon pops into consumers reviews with zBubbles", Nov. 17, 1999, available on the Internet at http://news.cnet.com/news/0–1007–200–1452140.html.

John Lamping, Ramana Rao, And Peter Pirolli. "A focus+context technique based on hyperbolic geometry for visualizing large hierarchies", in Proceedings of the ACM SIG-CHI Conference on Human Factors in Computing Sytems, ACM, May 1995.

Inxight Software, Inc. "Star Tree Walk–Through Tour", available on the Internet Apr. 2001 at http://www.inxight-.com/products/star_tree/walk_thru/index.html.

"Network Tools—Zapper [Windows 95/98/2000/NT, IE 4.0+]", The Scout Report, A Publication of the Internet Scout Project Computer Sciences Department, University of Wisconsin–Madison, vol. 7, No. 4, Jun. 9, 2000 available on the Internet at http://scout.cs.wisc.edu/report/sr/2000/scout–000609.html#17.

Netscape's "What's related service FAQ", available on the Internet Apr. 2001 at http://home.netscape.com/escapes/related/faq.html.

OpenCola Folders, Product and Technology Overview, available on the Internet Apr. 2001 at http://www.opencola.com/products/1_folders/.

Pazzani, M., Billsus, D., "Learning and Revising User Profiles: The Identification of Interesting Web Sites", Machine Learning 27, Kluwer Academic Publishers, pp. 313–331, 1997.

Thorsten Joachims. "A probabilistic analysis of the Rocchio algorithm with TFIDF for text categorization.". Technical Report CMU–CS–96–118, School of Computer Science, Carnegie Mellon University, Mar. 1996.

Yoelle S. Maarek, Israel Z. Ben Shaul. "Automatically Organizing Bookmarks per Contents". Fifth International World Wide Web Conference, May 6–10, 1996, Paris, France.

Zapper Tour, Zapper Technologies Inc., available on the Internet Apr. 2001 at http://www.zapper.com/tour/tour_fr.html.

Walter Mossberg, "New Windows XP Feature Can Re–Edit Others' Sites", The Wall Street Journal, Jun. 7, 2001.

Luis Gravano And Hector Garca–Molina, "Gioss: Text-–Source Discovery over the Internet", ACM Transactions on Database Systems, 1999.

Bradley Rhodes And Pattie Maes, "Just–in–time information retrieval agents", IBM Systems Journal special issue on the MIT Media Laboratory, vol. 39, Nos. 3 and 4, 2000 pp. 685–704.

Scott Deerwester, Susan Dumais, Goerge Furnas, Thomas Landauer, And Richard Harshman. "Indexing by latent semantic analysis". Journal of the American Society for Information Science, 41(6):391–407, 1990.

"Zapper Technology Brief", available on the Internet Apr. 2001 at www.zapper.com.

"Zapper Technologies Announces Release of Zapper 2.0", available on the Internet Apr. 2001 at www.zapper.com.

"Inxight Thingfinder", RubberTreePlant.co.uk KM Software Review, Apr. 3, 2001.

"Autonomy UpdateTM", Read Between The Lines available on the Internet Apr. 2001 at www.autonomy.com.

"Autonomy ServerTM", Read Between The Lines available on the Internet Apr. 2001 at www.autonomy.com.

"Smart Tags Overview", available on the Internet Jun. 2001 at www.microsoft.com.

Shi–Kuo Chang and Taieb Znati, "Adlet: Active Document for Adaptive Information Integration", available on the Internet Jul. 2001 at http://www.cs.pitt.edu/~chang/365/adlet.html.

P. Ipeirotis, L. Gravano, And M. Sahami, "Probe, Count, and Classify: Categorizing Hidden–Web Databases", Proceedings of the 2001 ACM SIGMOD International Conference On Management of Data, 2001.

European Search Report for EPO counterpart Application No. 02 018 111.1, Dec. 18, 2002.

Frederiksson, Martin, "Active Documents and Their Applicability in Distributed Environments", Master of Science thesis, Department of Software Engineering and Computer Science, Blekinge Institute of Technology, 1998.

Fredriksson, Martin and Svahnberg, Mikael "Fargo: Technical Description", University College of Karlskrona/Ronneby, Department of Computer Science and Business Administration, Roneby, Sweden, 1997.

* cited by examiner

FIG. 14

| SEL | NAME | ENTITY TYPE | ANNOTATE | DEPTH | PROVIDER | COST | QUERY | REFRESH |
|---|---|---|---|---|---|---|---|---|
| ☑ | COMPUTING | COMPUTING | ALWAYS | 0 | YAHOO | FREE | LINK | DAILY |
| ☐ | BIOLOGY | BIOLOGY | ALWAYS | 0 | GOOGLELUCKY | NULL | LINK | NEVER |
| ☐ | MEDICINE | MEDICINE | ALWAYS | 0 | ALTAVISTA | FEE | LINK | AUTO |
| ☐ | APPLY PAIRS OF ENTITIES AND IDENTIFY 3RD PARTY ENTITIES | COMPANIES | EXPERT | 0 | GOOGLELUCKY | NULL | CONTENT | NULL |
| ☐ | APPLY PAIRS OF ENTITIES USING GOOGLELUCKY | PRODUCTS | ALWAYS | 2 | NORTHERNLIGHTS | NULL | LINK | WEEKLY |
| ☐ | COUNTRIES | COUNTRIES | NOVICE | 0 | GOOGLELUCKY | FEE | CONTENT | UNTIL 2003 |
| ☐ | ASTRONOMY | ASTRONOMY | ALWAYS | 1 | GOOGLE | NULL | LINK | MONTHLY |
| ☑ | PEOPLE | PEOPLE | ALWAYS | 3 | GOOGLE.PEOPLE | NULL | LINK | NULL |

VIEW HIERARCHY
SET DEPTH

| SCIENTIFIC SEARCH ☐ ▽ | | | | | | | |
|---|---|---|---|---|---|---|---|
| SEL | NAME | ENTITY TYPE | ANNOTATE | DEPTH | PROVIDER | COST | QUERY | REFRESH |
| ☑ | ALL FOLDERS RESULT OF SCIENTIFIC CONTENT PROVIDER | STANDARD | ALWAYS | 0 | | | | |
| ☐ | PHYSICS RESULT OF SCIENTIFIC CONTENT PROVIDER | PHYSICS | ALWAYS | 0 | S.C.P. | FREE | CONTENT | NULL |
| ☐ | CHEMISTRY RESULT OF SCIENTIFIC CONTENT PROVIDER | CHEMISTRY | ALWAYS | 0 | S.C.P. | FREE | CONTENT | NULL |
| ☐ | BIOLOGY RESULT OF SCIENTIFIC CONTENT PROVIDER | BIOLOGY | ALWAYS | 0 | S.C.P. | FREE | CONTENT | NULL |

| 2502 | E-LEARNING SERVICES ASSOCIATED WITH E-LEARNING PERSONALITY | |
|---|---|---|
| | SEL | |
| 2504 | ☑ | LINK WORDS OR MULTIWORD EXPRESSIONS FOUND IN THE DOCUMENT TO THEIR DEFINITIONS |
| 2506 | ☐ | LINK WORDS OR MULTIWORD EXPRESSIONS FOUND IN THE DOCUMENT TO THEIR TRANSLATIONS |
| 2508 | ☐ | LINK EACH TEXT UNIT (I.E., DOCUMENT, PARAGRAPH, PHRASE, WORD) TO A TUTORIAL CONCERNING EACH TEXT UNIT |
| 2510 | ☐ | LINK EACH TEXT UNIT (I.E., DOCUMENT, PARAGRAPH, PHRASE, WORD) TO AN EXPERT CONCERNING IDENTIFIED SUBJECTS |
| 2512 | ☐ | LINK EACH TEXT UNIT (I.E., DOCUMENT, PARAGRAPH, PHRASE, WORD) TO AN INTERACTIVE COURSE ABOUT IDENTIFIED SUBJECTS |
| 2514 | ☑ | LINK EACH TEXT UNIT (I.E., DOCUMENT, PARAGRAPH, PHRASE, WORD) TO A LIST OF REAL WORLD CLASSES ABOUT IDENTIFIED SUBJECTS |
| 2516 | ☑ | LINK TEXT UNITS TO (I.E., DOCUMENT, PARAGRAPH, PHRASE, WORD) LEARNING RESOURCES CONCERNING EACH TEXT UNITS |

*FIG. 25*

| ENTITY | ENTITY TYPE | VISITS | LAST VISIT | ACTION LIST | DMOZ CATEGORY | LOCATION | POS | MARKUP |
|---|---|---|---|---|---|---|---|---|
| XEROX | BUSINESS | 45 | 11/4/2000 | VIEW (43), PRINT(2) | BUSINESS | 40 | NOUN | WWW.XEROX.COM |
| XEROX | BUSINESS | 1 | 5/1/2001 | VIEW(1) | FINANCE | 689 | NOUN | WWW.NYTIMES.COM |
| XEROX | BUSINESS | 4 | 2/22/2001 | EMAIL(1), VIEW(3) | COMPUTER | 343 | NOUN | WWW.GYROCON.COM |
| ... | ... | | | ... | | ... | ... | ... |

| (A) KEY | (B) ENTITY | (C) MARKUP | (D) FORMAT | (E) ORIGIN | (F) ORIGIN POSITION | (G) PART OF SPEECH | (H) CONTEXT |
|---|---|---|---|---|---|---|---|
| Sili | Silicon Valley | www.siliconvalley.com | Capitalize | TARGET DOCUMENT CONTENT | 1 | Noun | Science |
| Dig | Digital | www.digital.com | ® | www.digital.com | 434 | Adjective | Science |
| Dig | DigiPaper | NONE | Bold | www.parc.xerox.com | 23 | Noun | Science |
| Dig | digress | NONE | NONE | www.nytimes.com | 343 | Verb | Politics |
| ... | ... | ... | ... | ... | ... | ... | ... |

FIG. 48

```
<service id='Products'
    refresh=30
    insert='Content'
    language='En'
    quality='Premium&High&Not-copyrighted&paid'
    maxprice='50'
    maxwords='2000'
    search='cost'>
    <entity>Xerox
        <offsets>13 18 456 461 710 715</offsets>
        <provider name='Thomson' id=18></provider>
        <provider name='Reuters' id=19></provider>
    </entity>
</service>
```

FIG. 54

```
<!- SERVER ID>
<docsouls:serverid> DS v1.0 server name </docsouls:serverid>
    <!- PROPERTIES OF DOCUMENT>
    <docsouls:docid> xxx </docsouls:docid>
    <docsouls:name> xxx </docsouls:name>
<docsouls:owner> xxx </docsouls:owner>
...
<!-- ORIGINAL DOCUMENTS DOCUMENT CONTENT>
<docsouls:originaldoc format="HTML">toto.html</docsouls:originaldoc>
<docsouls:browsingdoc format="HTML">browse.html</docsouls:browsingdoc>

<!- LIST OF PERSONALITIES AND DOCUMENT SERVICE REQUESTS>
<docsouls:endowmentdescription>
    <!-- LIST OF PERSONALITIES>
    <docsouls:persorality id=" " name="" etc.>
        <docsouls:service id="" name="" etc.>
            <docsouls:provider name="" etc.>
            <docsouls:provider name="" etc.>
        </docsouls:service>
    </docsouls:personality>
    ...
    <!-- LIST OF SERVICE REQUESTS>
    <docsouls:service id="" name="" etc.>
        <docsouls:provider name="" etc.>
        <docsouls:provider name="" etc.>
    </docsouls:service>
    ...
</docsouls:endowmentdescription>
```

*FIG. 56*

```
<!-- DESCRIPTIONS OF PERSONALITIES -->
<docsouls:personalitydescription>
    <docsouls:id> xx </docsouls:id>
    <!-- all the fields AND service categories -->
    <docsouls:servicecategory id="" name = "" >
</docsouls: personalitydescription>

<!-- NEXT PERSONALITY DESCRIPTION -->
...

<!-- DESCRIPTION OF DOCUMENT SERVICE REQUESTS -->
<docsouls:servicedescription>
    <docsouls:id> xx </docsouls:id>
    <!-- list all fields (e.g., "refresh period", category, etc.) -->
    <!-- list all providers -->
    <docsouls:provider id="" name = "" >
    <!-- list all strategies -->
    <!-- list status of services (original, frozen, mapped, etc.) -->
    <docsouls:servicestatus status="mapped" originalid="" originalserver="" >
    <!-- list ServerId if the service was not available on current server -->
    <docsouls:serverid>id</docsouls:serverid>
</docsouls:servicedescription>

<!-- NEXT SERVICE REQUESTS DESCRIPTION -->
...
```

FIG. 57

```
<!- DESCRIPTION OF PROVIDERS >
<docsouls:providerdescription>
    <docsouls:id> xx </docsouls:id>
    <!-- all the fields e.g. key, URL, etc.. >
</docsouls: providerdescription >

<!- DESCRIPTION OF DICTIONARIES >
<docsouls:dictionarydescription>
    <docsouls:id> xx </docsouls:id>
    <!-- all the fields, e.g. category>
</docsouls:dictionarydescription>

<!- DESCRIPTION OF STRATEGY >
<docsouls:strategydescription>
    <docsouls:id> xx </docsouls:id>
    <!-all the fields>
    <!-all the dictionaries>
</docsouls:strategydescription>

<!- RESULTS OF GLOBAL SERVICES  >
<docsouls:globalservice id="Summary">
    <docsouls:link> xxx </docsouls:link>
    <docsouls:content> xxx </docsouls:content>
</docsouls:globalservice>

<!- OTHER RESULTS (E.G. KEYWORDS, CATEGORIES, ETC.. >
```

FIG. 58A

```
<!-- (OPTIONAL) DESCRIPTION OF ENRICHMENT PERFORMED AT OTHER DOCUMENT ENRICHMENT
SYSTEMS>
<docsouls:serverid>olderServerid</docsouls:serverid>
<docsouls:personalitydescription>...</docsouls:personalitydescription>
<docsouls:servicedescription>...</docsouls:servicedescription>

<!-- (OPTIONAL) LIST OF RESULTS OF THE LAST ENRICHMENT >
    <!-- IDENTIFY DOCUMENT SECTION IN CASE OF MULTI-PART DOC >
    <docsouls:docpart>main_frame.html</docsouls:docpart>
    <!-- OFFSET WHEN ENRICHMENT APPLIES TO A SECTION >
    <docsouls:offset> 0 200 </docsouls:offset>
    <!-- STATUS OF SERVICE APPLIED ("ACTIVE" OR "FROZEN") >
    <docsouls:service id="StockQuote" status="active">
        <!-- ENTITY >
        <docsouls:entity>Xerox
            <!-- NORMALIZED FORM >
            <docsouls:normform>Xerox</docsouls:normform>
            <!-- LIST OF OFFSETS WHERE ENTITY IS FOUND IN TEXT RELATIVE TO SECTION >
            <docsouls:offsets start=35 end=40 />
            <docsouls:offsets start=232 end=237 />
            <!-- DICTIONARIES >
            <docsouls:dict> xxx </docsouls:dict>
            <!-- STRATEGIES >
            <docsouls:strat> xxx </docsouls:strat>
            <!-- LINK INFORMATION >
            <docsouls:link> xxx </docsouls:link>
            <!-- CONTENT INFORMATION >
            <docsouls:content> xxx </docsouls:content>
        </docsouls:entity>
        <!-- NEXT ENTITY>
        ...
    </docsouls:service>
```

*FIG. 58B*

META-DOCUMENT MANAGEMENT SYSTEM WITH USER DEFINABLE PERSONALITIES

CROSS REFERENCE TO RELATED APPLICATIONS

Priority is claimed from U.S. Provisional Application No. 60/311,857, filed Aug. 13, 2001. Cross-reference is made to U.S. patent application Ser. No. 09/543,962, entitled "Meta-Document And Method Of Managing", and U.S. patent application Ser. No. 09/928,619 entitled "Fuzzy Text Categorizer", which are both hereby incorporated herein by reference. In addition, cross-reference is made to the following U.S. patent applications that (a) are concurrently filed with this patent application, (b) are assigned to the same assignee as this patent application, (c) are incorporated in this patent application by reference, and (d) claim priority to U.S. Provisional Patent Application Serial No. 60/311, 857, filed Aug. 13, 2001: U.S. patent application Ser. No. 09/683,238, entitled "Meta-Document Management System With Personality Identifiers"; U.S. patent application Ser. No. 09/683,239, entitled "Meta-Document Management System With Document Identifiers"; U.S. patent application Ser. No. 09/683,240, entitled "Mete-Document Management System With Transit Triggered Enrichment"; U.S. patent application Ser. No. 09/683,241, entitled "System For Propagating Enrichment Between Documents"; U.S. patent application Ser. No. 09/683,242, entitled "Document-Centric System With Auto-Completion And Auto Correction"; U.S. patent application Ser. No. 09/683,237, entitled "System With User Directed Enrichment And Import/Export Control"; U.S. patent application Ser. No. 09/683,235, entitled "System For Automatically Generating Queries".

BACKGROUND OF INVENTION

1. Field of the Invention

The invention relates generally to the management and use of documents, and in particular, to improved management and use of documents which may act as agents, generating requests for information, then seeking, retrieving and packaging responses to enrich the documents while facilitating reading comprehension, understanding relationships with other documents, and content creation. In particular this invention relates to a meta-document server with user definable personalities.

2. Description of Related Art

Knowledge management through document management forms an important part of the knowledge creation and sharing lifecycle. A typical model of knowledge creation and sharing is cyclical, consisting of three main steps: synthesizing (search, gather, acquire and assimilate), sharing (present, publish/distribute), and servicing (facilitate document use for decision making, innovative creativity).

Most systems consider documents as static objects that only acquire new content when acted upon by an authorized user. A user's decision to read and modify a document, or to run a program on it which may change its contents (for example, by adding hyperlinks), is needed for the document to acquire new information. This view of the document as a passive repository leads to the current situation in which documents remain static unless a user is in front of the screen piloting the system. OpenCola Folders™ offers one solution to the view of the document as a passive repository by creating folders on a user's computer that look for a limited set of document types, according to criteria set by the user (i.e., a single purpose information retrieval system).

Both agent-based systems and content-based retrieval systems provide some management of information without user intervention. An agent is a software program that performs a service, such as alerting the user of something that needs to be done on a particular day, or monitoring incoming data and giving an alert when a message has arrived, or searching for information on electronic networks. An intelligent agent is enabled to make decisions about information it finds. Both such systems, however, consider documents to be fixed and static entities.

Many products provide various solutions for individual aspects of the overall problem of knowledge management: anticipatory services, unstructured information management, and visualization of information and knowledge. Watson, for example, from the InfoLab at the University of Northwestern, is a program which operates while a user is creating a document. Watson retrieves information as the user works, from which the user can select for further investigation. Information retrieved by Watson comes from a service provider, and Watson stores the retrieved information in memory associated with Watson.

Also, Autonomy.com's ActiveKnowledge™ analyzes documents that are being prepared on the user's computer desktop and provides links to relevant information. In addition, online services such as Alexa.com, Zapper.com, and Flyswat.com suggest links that are relevant to the content currently viewed highlighted in a browser window. The suggested links appear in an additional window inside or separate from the current browser window. These services treat documents as static objects. Specifically, using Zapper.com's engine, when a user right clicks on selected text, words surrounding the selected text are analyzed to understand the context of the search request, and to reject pages that use those words in a different context.

Various products, such as commercial information retrieval systems, provide unstructured information, such as web pages, documents, emails etc. (which content may consist of text, graphics, video, or audio). Typical management services for unstructured information include: search and retrieval; navigation and browsing; content extraction, topic identification, categorization, summarization, and indexing; organizing information by automatic hyperlinking and creation of taxonomies; user profiling by tracking what a user reads, accesses, or creates create communities; etc. For example, Inxight's parabolic tree is an example of a system that organizes unstructured information and presents it in an intuitive tree-like format.

Furthermore, it is known how to embed executable code in documents to perform certain functions at specified times. For example, European Patent Applications EP 0986010 A2 and EP 1087306 A2 set forth different techniques in which to define active documents (i.e., documents with embedded executable code). More specifically, these publications set forth that executable code within the document can be used to control, supplement, or manipulate their content. Such active documents are said to have active properties.

Notwithstanding these existing methods for statically and actively enriching document content, there continues to exist a need to provide an improved document enrichment architecture that allows ubiquitous use of document enrichment services. Such an improved document enrichment architecture would advantageously provide methods for facilitating the use of such services by automatically attaching, monitoring, and suggesting such services for users.

SUMMARY OF INVENTION

In accordance with the invention, there is provided a system, and method therefor, for enriching document content. The system includes a user interface for specifying a personality defining a set of document service requests that identify enrichment themes. A user-manager receives document content and the personality specified at the user interface. The user-manager forms a meta-document with the document content and the personality. A scheduler selects a document service request from the set, for initiating and managing communication with a service provider to satisfy the selected document service. A content manager integrates results from the selected document service into the meta-document as document markup. The user interface, the user-manager, the scheduler, and the content manager operate together to generate or recommend new personalities or modify existing personalities using one or more in combination of a set of algebraic computations, a set of document references, a set of predefined personalities, a set of learning personalities, a knowledge level, and a classification of personalities.

BRIEF DESCRIPTION OF DRAWINGS

These and other aspects of the invention will become apparent from the following description read in conjunction with the accompanying drawings wherein the same reference numerals have been applied to like parts and in which:

FIG. 14 illustrates a client window for specifying properties of searches performed at the search engine defined in FIG. 13;

FIG. 20 illustrates four services that can be generated using the form shown in FIG. 19;

FIG. 25 illustrates an example list of services available when an e-learning personality is selected to enrich document content;

FIG. 33 illustrates an interaction history;

FIG. 48 illustrates an example of an auto-completion entity database;

FIG. 54 illustrates an example of the output of the directed search specified in FIG. 53;

FIGS. 56, 57, 58A, and 58B illustrate a detailed example of an export format;

DETAILED DESCRIPTION

Outline of Detailed Description

Figure 1:
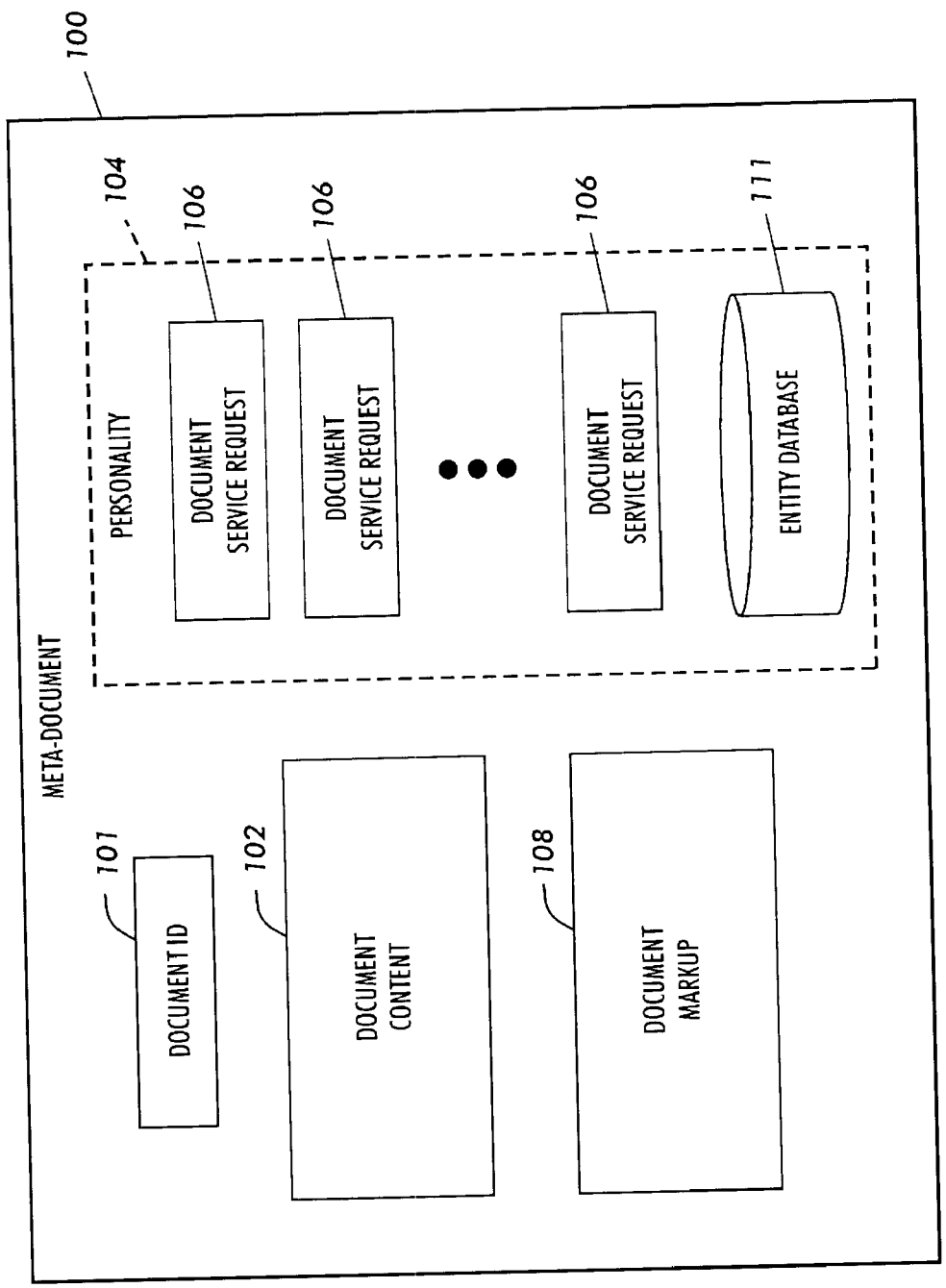
FIG. 1 is a schematic of a meta-document according to one embodiment of the invention.

A. Definition Of Terms
B. Genera/Features
B.1 The Knowledge Management Cycle
B.2 Services
B.3 Personalities
B.4 Methods For Identifying And Using Entities
C. Ubiquitous Personalities
C.1 Personality and Service Tokens
C.2 Personalities Identified By Location
C.3 Transit Triggered Enrichment
D. Creating And Modifying Personalities
D.1 Generally
D.2 Using An Algebra
D.3 Using A List Of Links
D.4 Using Predefined Personalities And Knowledge Levels
D.5 Using Information Extraction Techniques
D.6 Using Learning Personalities
E. User Controlled Enrichment
E.1 Automatically Inserting and/or Linking Content
E.2 Propagating Enrichment Between Documents
E.3 Automatically Completing Citations
E.4 Combining Or Intersecting Entities
E.5 Using Entity Types Defined In A Hierarchy
F. Text Categorization And Related Services And Utilities
F.1 Text Categorizer
F.2 Recommending Personalities
F.3 Generating Queries Using Identified Entities
F.4 Finding An Expert For An Enriched Document
G. Additional Meta-DocumentServices
G.1 Notification Of Enrichment
G.2 Document-Centric Suggestions
G.3 User Directed Enrichment
G.4 Exporting/Importing Enriched Documents
G.5 Alternate Embodiments
H. Miscellaneous

A. Definition of Terms

The terms defined below have the indicated meanings throughout this application, including the claims:

"Annotate" is used herein to mean to create a reference between an entity in a document, or region of a document, and some set of links, text segment, images, or embedded data (e.g., glyphs).

"Content retrieval" is used herein to mean an annotation that consists of content obtained by following a series of one or more links and retrieving their content, which content may be filtered or reformatted after retrieval.

A "document" is used herein to mean an electronic (e.g., digital) or physical (e.g., paper) recording of information. In its electronic form, a document may include image data, audio data, or video data. Image data may include text, graphics, or bitmaps.

Document "mark-up" is used herein to mean the annotation applied to a document.

A "document soul" is used herein to mean a personality that remains attached to a document for an extended period of time that may be indefinite or pre-specified of finite duration.

"Enrich" is used herein to mean to annotate a document in accordance with a predefined personality.

"Entity" is used herein to mean something recognized in a document (e.g., a person's name, a location, a medical term, a graphics entity that may include image data, graphics data, audio data or video data) that can be in the form of an image, text, embedded data, HTML, etc.

"Information space" is used herein to mean the entire set of annotations associated with an entity, a document segment, a document, or a set of documents.

A "lexicon" is used herein to mean a data structure, program, object, or device that indicates a set of words that may occur in a natural language set. A lexicon may be said to "accept" a word it indicates, and those words may thus be called "acceptable" or may be referred to as "in" or "occurring in" the lexicon.

A "link" is used herein to mean, by way of example, a URL (Uniform Resource Locator) associated with a text segment or an image segment.

A "morphological variant" is used herein to mean the conjugated form of a word or expression (e.g., plural form), or a derivational form of a word (e.g., presidential is a variant of president). Morphological variants can be reduced to stems or lemmas using known techniques such as stemming algorithms such as Porter's algorithm or a lemmatization scheme in Inxight's LinguistX Platform.

A "personality" is used herein to mean a thematic set of services that can be applied to enrich a document.

A "service" is used herein to mean a program that provides new markup based on content and meta-data in a document in its current state. For example, the program may identify entities in a document, and annotate each entity with data associated to that entity (e.g., in a database). For example, a service may enrich a document with external information and/or add new services.

A "text segment" is used herein to mean a continuous sequence of bytes in a document, or a group of such segments.

B. General Features

A block diagram of a meta-document or "document soul" 100 is shown in FIG. 1. The meta-document 100 includes an identifier 101, a content portion 102, which is a document created by a user or obtained by a user, and a personality 104. The personality 104 is a set of one or more document service requests 106 and an entity database 111. The entity database may include one or more separate entity databases, where each entity database identifies a class of entities (e.g., people names, city names, business names, etc.). In one embodiment, the personality 104 does not include the entity database 111 but instead includes document service requests that identify entities. In another embodiment, the entity database 111 records document-centric entities (i.e., entities that are related exclusively to the document content 102) that are specified by a user or by the system. It will be appreciated by those skilled in the art that the document service requests 106 and the entity database(s) 111 forming part of the meta-document 100 may include the content of a document service request and an entity database and/or may include references to a document service request and an entity database (in, for example, services database 210). The identifier 101 may include other administrative data such as creator, owner, size, access permissions, etc.

B.1 The Knowledge Management Cycle

Figure 2:
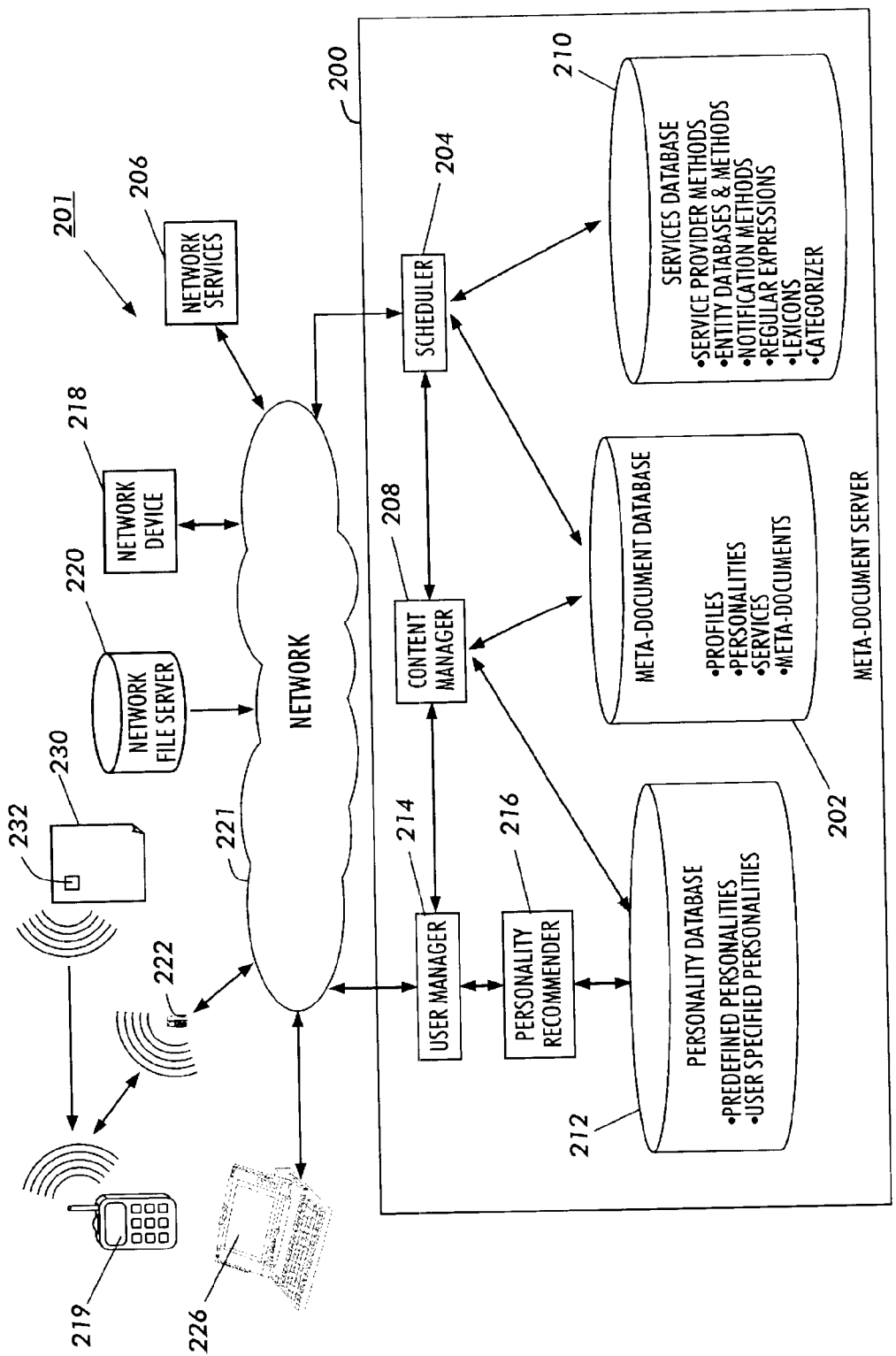
FIG. 2 illustrates a block diagram of a system incorporating a meta-document server.

FIG. 2 illustrates a meta-document management system 201, within which the meta-document 100 is produced as the result of a knowledge crystallization process, where the process may last the lifetime of the document. Typically a meta-document's life begins with a focus and purpose which helps direct and refine the synthesis phase. During the synthesis phase, the meta-document 100 anticipates the information needs of the writer or reader, either independently through a pre-defined set of document service requests or by following specific or customized instructions, and performs the sometimes tedious tasks of searching, gathering, assimilating, and organizing information relevant to the document content.

The actions of the synthesis phase occur through the activation of one or more document service requests 106. Document service requests 106 may be activated while the user is creating or working on the meta-document 100 or when user has set aside the meta-document 100 so that the service requests can benefit from idle computer time, unused network bandwidth, etc. Activating a document service request 106 while the user works on the document has the additional advantage of allowing the meta-document to learn about the user's preferences. Document service requests 106 may be activated automatically by a scheduler 204 or manually by a user.

The next phase in the knowledge management cycle is concerned with sharing the information produced during the synthesizing phase. Typically the sharing phase consists of integrating the information gathered during the synthesizing phase into the contents of the meta-document 100 in a format useful for the user, person, or community that will use the document. The document content can be further enhanced for the user by assigning a personality to the document which marks up the document with information that eases the understanding of the content or that regularly provides more recent updates related to the content. The final servicing step in the cycle deals with periodic updates whereby the meta-document performs predefined service requests on behalf of the user. For example, the meta-document can keep up-to-date information of the temperature of an identified city.

B.2 Services

Referring again to FIG. 2, one or more meta-documents 100 are stored in a meta-document server 200 at meta-document database 202. In an alternate embodiment, document references (e.g., URLs) are stored in meta-document database 202 and their content referenced on network file server 220. Each meta-document 100 in the meta-document server 200 is endowed with a set of document service requests which each meta-document 100 exercises under control of a scheduler or scheduling demon 204, which wakes up each meta-document in database 202 in accordance with some predetermined time schedule. The scheduler 204 may be implemented in a software mechanism which accesses the document service requests 106, entity database 111, and content in a meta-document 100.

Figure 3:
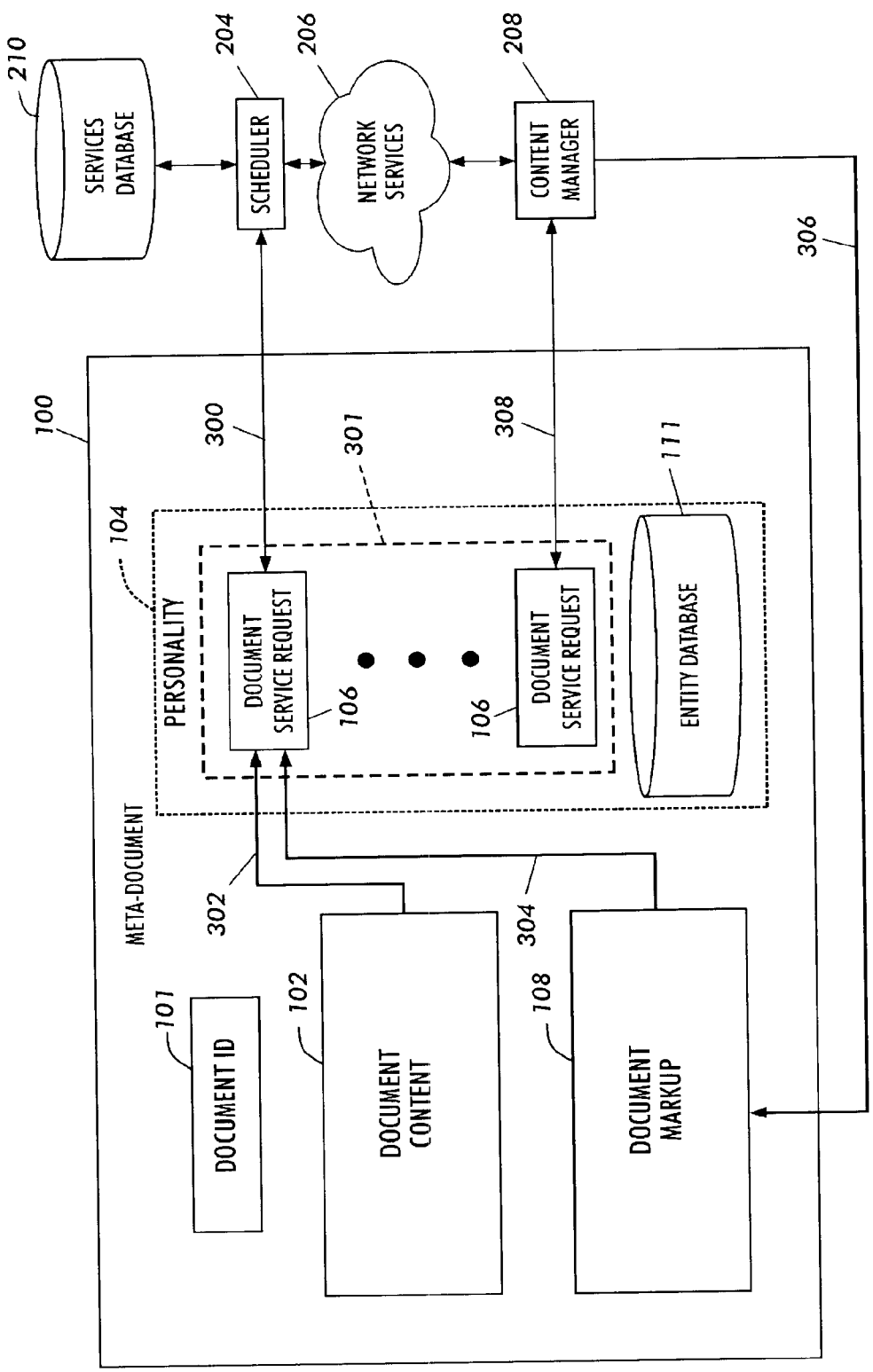
FIG. 3 is a schematic of meta-document enrichment according to one embodiment of the invention.

As illustrated in FIG. 3, after the scheduler 204 wakes up the meta-document 100, the meta-document 100 informs the scheduler 204 of its current set of document service requests 301. Depending on the resources (e.g., service providers which can fulfill or satisfy a particular document service request) available to the meta-document server 200, the scheduler 204 chooses a document service request 106 to fulfill (indicated by arrow 300). Subsequently, the scheduler 204 invokes service providers 206 identified using services database 210 to satisfy those requests.

The services database 210 includes "service provider methods" for lookup and selecting service providers (including authentication data associated with each service), "entity methods" for identifying entities in document content using entity database 111 or entity databases in services database 210 or available as a network service 206, "notification methods" for notifying a user of new enrichment, regular expressions, lexicons, and a categorizer. In other embodiments, the services database 210 also includes content rights management methods.

Fulfilling a document service request means accessing a service provider from the services database 210 (e.g., selecting a service provider from a list of possible service providers) which includes some processes (or programs) that are invoked by the scheduler to access to the document content 102 (indicated by arrow 302) and document markup 108 (indicated by arrow 304). The results received from service providers 206 are integrated back into the original meta-document 100 by content manager 208. That is, these processes terminate by producing document-specific markup 108 (indicated by arrow 306) and/or new document service requests 106 (indicated by arrow 308), both of which are added to the meta-document 100 by content manager 208.

Various standards for attaching metadata exist, for example, DOM (Document Object Model) and XML (extended markup language) may be used. In one embodiment, both meta-document document service requests and resulting knowledge can be represented as XML metadata and added to the document at the end of each waking cycle. For example, a meta-document's document service requests are expressed as XML fields: <DSR>. . . </DSR>(where DSR is short for "DOCUMENT-SERVICE-REQUEST"). For example, one document service can be expressed as:<DSR> who-am-i </DSR>.

In order to fulfill this document service request, the scheduler 204 invokes a "who-am-i" process stored in services database 210. This process uses the document content 102 and its document markup 108 as input. For example, the "who-am-i" process may return the filename of a document with identical content and additional document service requests to know who created this document, and where the document resides. The manager 208 marks the initial document service as fulfilled, or deletes it from the meta-document, and adds the additional knowledge returned by the process fulfilling the document service. In this example the following three lines are added to the initial document:

<MYNAME> xerox.txt </MYNAME>

<DSR> who-made-me </DSR>

<DSR> where-am-i </DSR>

During each operating cycle of the meta-document server 200, a meta-document 100 may acquire new markup 108 and new document service requests 106 as a function of document service requests that have been fulfilled. Some document service requests may add markup 108, and replicate the same document service request or other document service requests. Some document service requests may indicate to the content manager 208 markup 108 that should be eliminated when these requests are fulfilled.

In general, document service requests 106 correspond to services which add markup 108 to the document, based on the document's existence as a file in a file system; based on the content of the document as it was originally authored; and based on the content of the markup added to the document by some other process. When the document or the document's location is altered, the knowledge in the document may have to be regenerated or changed. Some knowledge, such as the relation of the contents of the document to other files in an intranet, or to documents found on the Internet may have to be update of periodically, possibly by some <DSR> continuous-education </DSR> document service request. For example, a textbook document may reference the population of the world and may need to be updated periodically to remain current.

Some document service requests may take a long time (for example, finding all the company names mentioned on a page and accessing all WWW pages mentioning two of those companies together). Other document services may be satisfied periodically (for example, finding the closing price of a stock share price). Besides document service requests, other functions not shown can be included in the meta-document server: a coordination system to orchestrate the concurrent execution of the functions described for the scheduler, a visualization and interaction system that allows various levels of display and interaction of metadata-enhanced documents, and a learning system that learns by observing the user interactions with the document. Likewise the meta-document 100 may be physically stored as a number of destination files (e.g., a file corresponding to the original content 102, a file corresponding to markup 108, and a file corresponding to document service requests 104, which files may all be related by known naming schemes).

B.3 Personalities

The meta-document server 200 provides end-to-end solution for document-based knowledge creation and sharing in a customizable fashion. Customization is provided by the mechanism of personalities within a meta-document server. Personalities are assigned to a document thereby assisting a user in the acquisition, sharing and utilization of knowledge; this creates a document view of the world as opposed to a global view as in current web portals. One or more personalities can be attached to a document. Each personality thematically and/or contextually encodes a collection of documents service requests 106 which will allow the document to act autonomously on behalf of the creator or reader, anticipating the information needs of both the writer and reader of documents, keeping the document connected and up-to-date with the rest of information world.

A meta-document 100, for example, may be given a personality 104 that is: (a) inquisitive: a set of document service requests to find out more information about concepts present in the document content, find biographies of people mentioned in the content, (b) polyglot: search out translations of the words, terms and phrases contained in the document, (c) private: marked to keep the document's metadata invisible to other documents, (d) scientific: search for online versions of the papers cited in the document content, or (e) genealogical: looking for documents containing similar contents as itself.

B.4 Methods for Identifying and Using Entities

As shown in FIG. 3, a personality 104 identifies one or more service requests 106. Each service request includes methods for: (a) recognizing entities in the document content 102; and (b) accessing a service using the recognized entities.

Entities include proper names (e.g., people, places, organizations, etc.), times, locations, amounts, citations (e.g., book titles), addresses, etc. Entities can be recognized using a variety of known techniques that may include any one or a combination of regular expressions, lexicons, keywords, and rules. A lexicon is typically a database of tuples of the form <entity-string, part-of-speech-tag, entity-type> where: an entity-string is the string characters that make up the entity (e.g., a person's name "John Smith"); a part-of-speech-tag, which is optional, denotes the grammatical usage of the entity (e.g., as a noun, noun phrase, verb, etc.); and entity-type denotes whether the entity belongs to one or more predefined classes (i.e., categories) of entities (e.g., person, organization, company name, etc.). A contiguous text string is recognized as an entity if the string is accepted as belonging to the lexicon.

Entities can be recognized by string matching or by using regular expressions. For example, a person's name could be recognized as two capitalized words. Regular expressions can be expressed in terms of the actual textual document content (i.e., words) or in terms of the linguistic markup associated with the textual content. This linguistic markup could include part of speech tags (such as noun phrases, nouns, etc.) or shallow parsing tags.

As an alternative means of recognizing entities some rules can be used. For example the following rule could be used to recognize proper names: if "word" is capitalized and is not in the lexicon (or dictionary, or thesaurus) then the word is a proper name.

Figure 4:
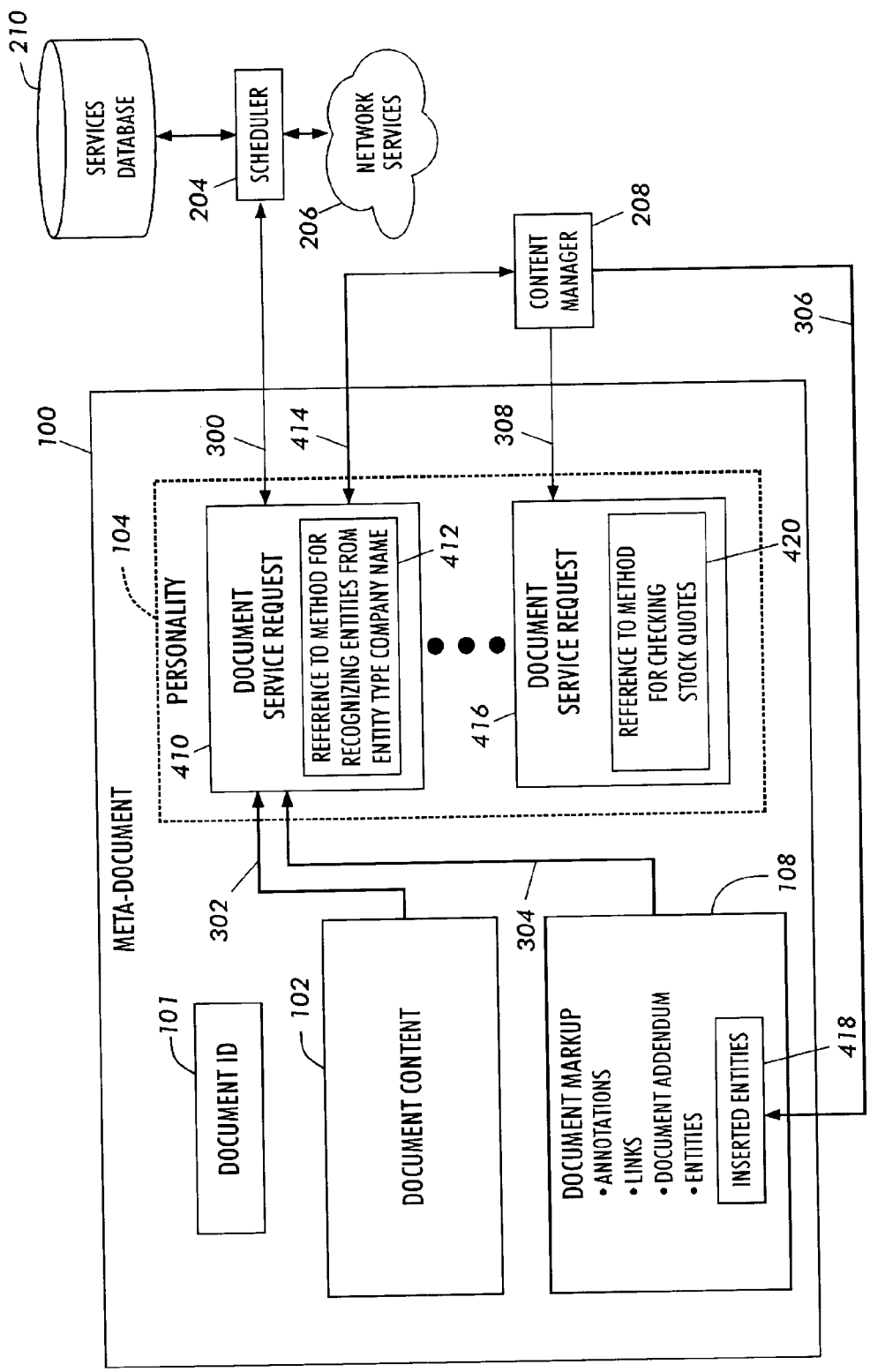
FIG. 4 illustrates an example of meta-document enrichment as illustrated in FIG. 3.

FIG. 4 illustrates an example in which a meta-document 100 is enriched using a personality 104 specified therein. At some predefined time or at pre-specified time intervals the scheduler 204 wakes up and identifies document service request 410. The scheduler then invokes the methods of the document service request referenced at 412 in the service database 210. The methods of a document service request referenced in the service database 210 may include regular expressions, lexicons, service provider selection, authentication data associated with each service, and content rights management. In executing the method identified by reference 412, a service is identified from network services 206 that recognizes entities from entity type "Company Name" also stored in services database 210.

Once the identified service is executed by the scheduler 204, it provides its results to content manager 208 which subsequently performs one or more of the following tasks: (a) marks the document service request 410 as completed at 414; (b) marks the document service request 416 as no longer waiting for input but waiting to be executed; and (c) inserts entities from the Company Name entity type and that appear in the document content 102 as well as their location(s) in the document content 102 at 418.

When the scheduler subsequently identifies the document service request 416, the scheduler will similarly identify a method 420 from service database 210 that will use the stock quote service to check the Company Name entities identified at 418. These stock quote results will similarly be inserted into document markup 108 and linked directly to the entities 418 which in turn link to locations in the document content. Alternatively, instead of inserting the stock quote results in 418, the service identified by request 416 will be inserted as document markup 108 to be initiated when the user accesses the identified entities in the document content 102.

C. Ubiquitous Personalities

This section pertains to methods for attaching personalities to documents, whether physical or in electronic form, and to objects, whether animate or inanimate.

That is, depending on the particular form of the document, there exist different manners in which to preferably attach personalities thereto. Once a personality is attached, an enriched view of the document can be produced using the meta-document management system. Users of the meta-document management system can then be notified using the notification service when further enrichments of interest take place to the document. The general steps for attaching a personality to a document include: (a) uploading the document to a meta-document server; (b) attaching one or more personality to the document; (c) periodically enriching the document in accordance with the personality.

More specifically, in this section personality tokens and readers enable document enrichment to occur more ubiquitously and systematically throughout the life of a meta-document. In addition, in-transit enrichment services enable document enrichment to be invoked when a document service is initiated.

C.1 Personality and Service Tokens

A personality token records an identifier to a personality in personality database 212 shown in FIG. 2. In one form, a personality token is an electronic tag that includes a digitally readable identifier. In operation, the digitally readable identifier of the electronic tag has prerecorded thereon with suitable graphic, symbolic, or textual indicia a personality identifier that is pre-associated with a predefined personality in the personality database 212 of the meta-document server 200.

Methods for transferring instruction sequences and information from one or more electronic tags to an electronic tag reader connected computer is disclosed in the following U.S. Patent Application Serial Nos., which are hereby incorporated by reference: Ser. Nos. 09/404,734; 09/391,898; 09/391,462. For example, electronic tag and tag reader systems can be based on temporary direct connection between a tag and a computing system (e.g., a magnetic card strip and card reader, or a small integrated circuit in a "smart card" with associated reader). Alternatively, the electronic tag is read by the electronic tag reader through a wireless infrared or radio frequency connection.

Figure 5:
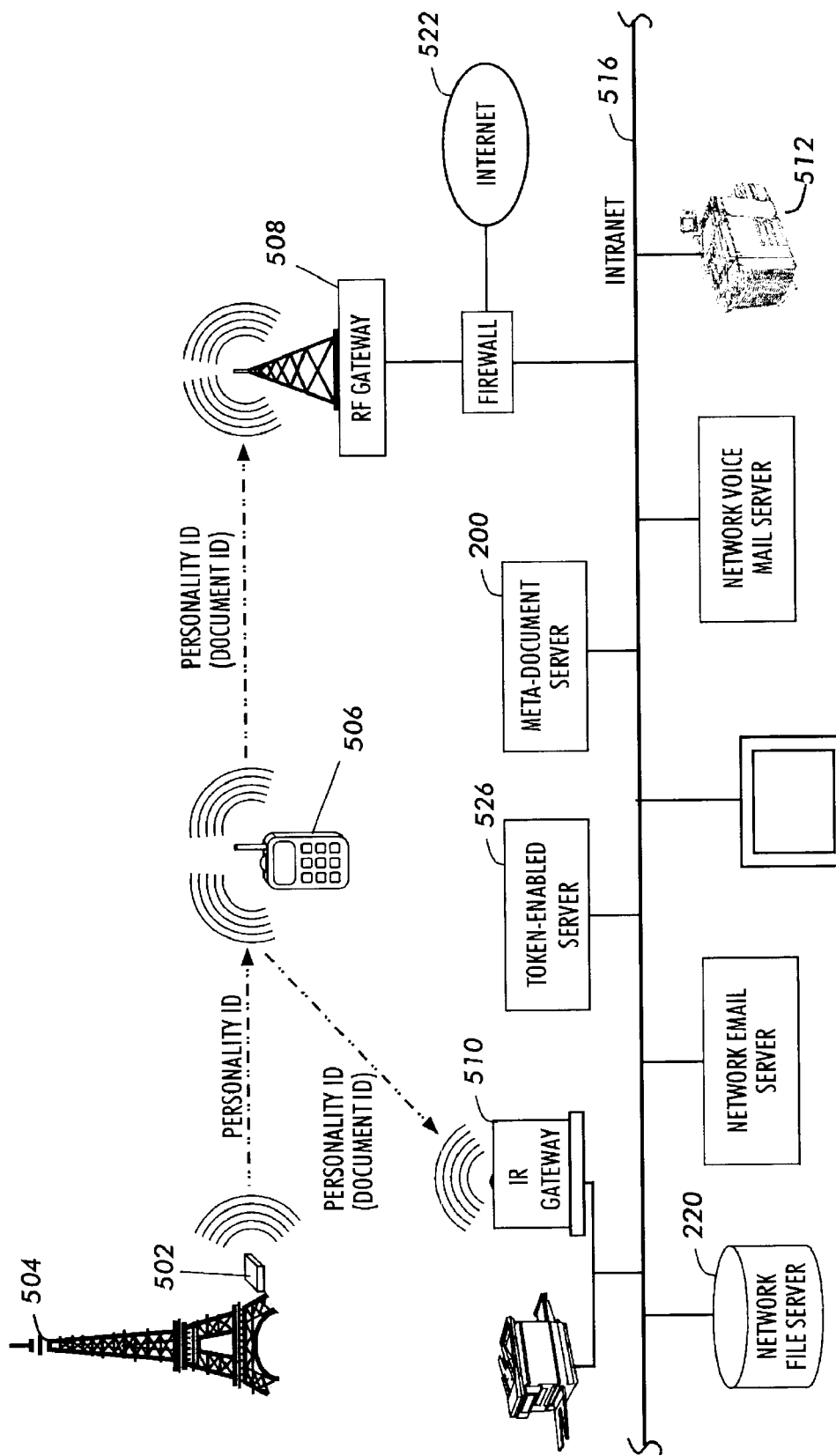
FIG. 5 illustrates an electronic identification tag having a specified personality that is affixed or positioned proximate to a physical object.

In operation, at least one electronic identification tag is located on or proximate to each physical object or location (hereinafter referred to together as physical item) that is to be assigned one or more personality identifiers. FIG. 5 illustrates an example in which an electronic identification tag 502 is affixed or positioned proximate to a physical object 504 (e.g., the Eiffel tower). The tag 502 can be a small radio frequency transponder comprised of an integrated circuit, containing a unique user accessible identification number. A small coil inductively powers the tag, and an antenna is used to broadcast the personality identifier to an electronic identification tag reader 506.

The electronic identification tag reader 506 includes transmitter and receiver components that are integrated with in its computer system. The tag reader momentarily energizes the tag through its coil until it has sufficient power for transient transmission of its personality identifier. The communication between the tag 502 and the tag reader 506 only occurs when both are proximate, with an actual distance varying based on size of the antenna attached to the tag and to the transmitter, from a distance of a few inches to that of several feet.

Once the personality identifier is received, the tag reader 506 passes this on to its computer system as for example an ASCII string via some suitable connection, while simultaneously providing user feedback to confirm reading of the electronic tag. User feedback can be visual (e.g., blinking or turning on an LED status light, text based or iconic display presentations), auditory (e.g., an audible buzz or beep), tactile (e.g., a button being raised or a perceptible structure rotation), or combinations of the foregoing.

Upon receipt of the personality identifier, the computing system of the tag reader 506 determines the context in which the information is received, and identifies the appropriate meta-document(s) to attach the personality identifier thereto. Context information can include location and/or time information. For example, the context related to location may be determined using a GPS (Global Positioning System) in the tag reader 506 that identifies where the personality identifier is being received. This context information is used to assign a personality identifier to a meta-document based on information related to location. Also, context information related to time can also be used to assign a personality identifier to a meta-document based on information related to time. For example, depending on the time of year a personality identifier is read, the tag reader 506 assigns different personality identifiers to document content (e.g., a seasonally dependent document).

The tag reader 506 in one embodiment is programmed to use context information (i.e., location and time information) to assign a personality identifier to documents and/or document tokens on the tag reader 506 by using document metadata (e.g., document title, creation date, author, etc.) and/or document content. In one instance of this embodiment, a personality identifier read by tag reader 506 is assigned to each document or document token recorded on the tag reader 506 based on the time and/or region its content was last accessed and/or modified relative to the time and/or region the personality identifier is located. In this manner, personality identifiers are automatically associated with existing meta-documents by the tag reader 506. Alternatively, the user of the tag reader 506 may manually associate a personality identifier with a meta-document.

In either instance, the tag reader 506 may be embodied in a token-enabled mobile computing device. Token-enabled mobile computing devices are described in for example the following patent and patent applications, which are hereby incorporated by reference: U.S. Pat. No. 5,862,321; U.S. patent application Ser. No. 09/118,322 (entitled: "Token-Based Document Transactions"); and U.S. patent application Ser. No. 09/270,320 (entitled "Secure Token-Based Document Server"). A transaction involves a series of steps that include: (a) a request for information from a source that will satisfy the request; (b) an estimate to satisfy the request from the provider; and (c) formalizing and submitting the request.

As shown in FIG. 5, the token-enabled mobile computing device with tag reader 506 is bridged to the wire-based networks 516 and 522 through either gateway 508 or gateway 510, all of which forms part of network 221 shown in FIG. 2. The mobile computing device 506 communicates with other wire-based or wireless devices using either an IR (infrared) transceiver or a radio (RF) transceiver integrated therein. The radio transceiver operates over any suitable wireless network using, for example, Bluetooth™ wireless personal area network (PAN) technology, PCS (Personal Communications Services), GSM (Global System for Mobile Communications), or pager messaging. The infrared transceiver uses, for example, communication standards set by the infrared data association (IrDA).

The wire-based network is further populated with a token-enabled server 526 to provide users of the mobile computing device 506 with access to document services available on wire-based networks 516 and 522. A user of token-enabled mobile computing device 506 is capable of browsing through directories of document tokens. These document tokens represent the user's documents stored on wired-based networks 516 or 522. In addition using a token-enabled mobile computing device, the user is able to apply document services available on networks 516 or 522 to selected document tokens, including but not limited to services offered by the meta-document server 200.

In one embodiment, one or more personality identifiers is embedded in a general document token along with one or more document references (e.g., URL's) that each identify a meta-document. In one embodiment, each personality is specified as a service parameter of the requested service, which is encoded as a service identifier in the general document token. (See specifically elements 36 and 38 in FIGS. 3A and 3B of U.S. patent application Ser. No. 09/118,322, and their associated description.) Once the contents of a general document token embodying a personality identifier is communicated to the meta-document server and received by the user manager 214 (as shown in FIG. 2), the user manager 214 then adds the one or more personalities to the referenced meta-document(s).

Document enrichment is initiated by the scheduler 204 as set forth above in accordance with the personality associated therewith. The enriched document is then made available to the owner of the document, either by placing the enriched document in the owner's list of enriched documents, or by storing the enriched document in a computer storage space available to the object referenced by the personality, or by emailing the location of the enriched document to the owner of the mobile computing device 506.

Further variants of this embodiment include adding a timestamp along with the specific GPS/GSM location and personality so that time-dependent information is also transmitted to the meta-document server 200. This information would allow for time-specific services to be activated (e.g., public displays related to the recorded time and place). Yet another variant adds a video camera at the location 504, and the image captured is matched against possible images associated with that GPS/GSM location, and a document specific to that identified image (e.g., a building) is enriched with the personality. Yet a further variant adds a laser distance-measuring device at the location 504 to pinpoint an exact location being viewed by the user possessing the GPS/GSM device, thereby providing more position specific enrichment to the user.

Figure 6:
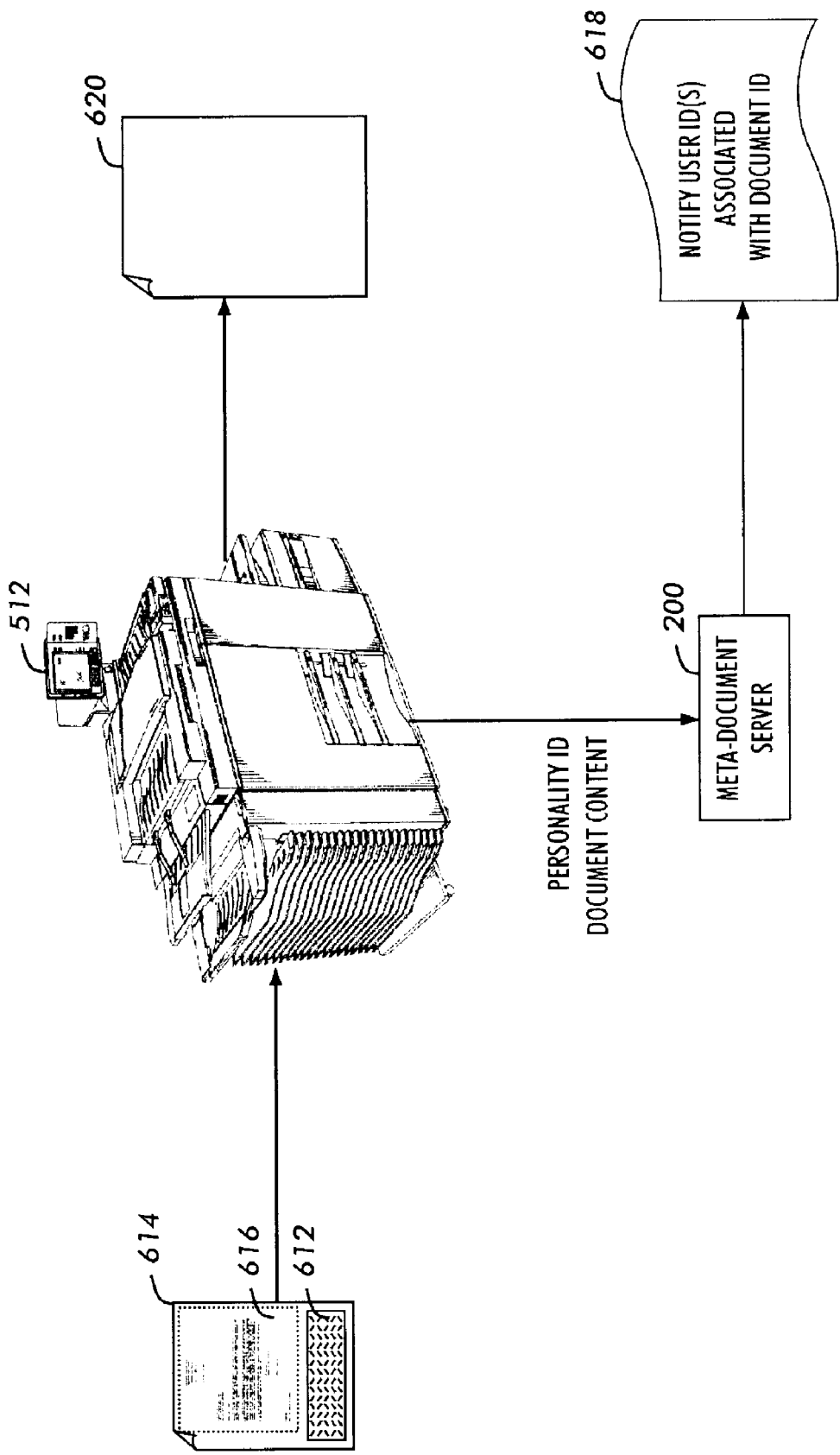
FIG. 6 illustrates an embodiment in which a hardcopy document has encoded thereon a personality identifier in embedded data.

FIG. 6 illustrates an alternate embodiment in which a hardcopy document 614 has associated therewith a personality identifier. In one embodiment, the personality identifier may be encoded thereon in embedded data 612. Embedded data is digital data carried by a document that is machine readable. In one representation of embedded data, a halftone pattern such as a serpentine halftone pattern is used to encode the personality identifier and document content (or reference thereto) as digital data in the halftone pattern. In this representation, a halftone cell is rotated depending on the particular value of the digital encoding required for the halftone cell.

Further details for forming serpentine halftone images are disclosed in U.S. Pat. No. 5,706,099 to Curry, which is incorporated herein by reference. In an alternate representation of embedded data, hyperbolic serpentine halftone cells are used to encode the embedded data instead of circular serpentine halftone cells. Further details of hyperbolic serpentine halftone cells are set forth in U.S. Pat. No. 6,081,345, which is incorporated herein by reference.

Another form of embedded data is data glyphs, which encode digital information in the form of binary ones and zeros that are then rendered in the form of very small linear marks. Each small mark represents a digit of binary data. Whether the particular digit is a binary one or zero depends on the linear orientation of the particular mark. U.S. Pat. Nos. 5,091,966, 5,128,525, 5,168,147, 5,221,833, 5,245,165, 5,315,098, 5,449,895, and 5,486,686, which are all hereby incorporated by reference, provide additional information about the uses, encoding and decoding techniques of data glyphs.

Referring again to FIG. 6, the hardcopy document 614 includes document content 616 and embedded data 612. The embedded data 612 includes at least a personality identifier. In addition, the embedded data 612 may include a digital representation of the document content 616. In one operational embodiment, multifunctional (i.e., fax, scan, print, store, email) device 512 scans in a document 614 with embedded data 612. Once the personality identifier and document content is detected and converted to a digital form, the multifunctional device 512 transmits them to the meta-document server 200.

In an alternate embodiment, the personality identifier associated with a hardcopy document is encoded as part of the human readable content of the hardcopy document. In another embodiment, the personality identifier is encoded as part of a smart coversheet that gives a user the ability to select from one or more personality identifiers. Smart cover sheet are disclosed in U.S. patent application Ser. No. 09/746,913, which is incorporated herein by reference.

At the meta-document server 200, the document content and personality identified by the personality identifier is used to create a meta-document. As set forth above, the meta-document is enriched with content in accordance with the specified personality. Once enriched with content, the user that made the content enrichment request is notified by email as illustrated by reference number 618. In an alternate embodiment, the marked up content can be sent to multi-functional device 512 to be rendered on hardcopy output 620. In yet another embodiment, the user requesting the service may request both electronic notification and hard-copy output of the enriched document. Electronic notification can be performed using, for example, SMS (Short Message Service) text messaging, a paging service, etc.

Personalities may be alternatively developed using pre-defined service tags. In this alternate embodiment, the personality tag 502 represents a service and not a personality. In this embodiment, users capture a collection of one or more document service requests 106 that are stored in a service tag 502 using for example tag reader 506. Using the captured collection, the user defines a personality with it. This personality can then be attached to a document for enrichment in accordance therewith. Unlike personality tags, document service tags can be much more specific. In one embodiment shown in FIG. 2, a hardcopy newspaper 230 includes a service tag 232 that identifies a service that will enrich a document in accordance the content from the newspaper of the service tag attached thereto.

In addition, services attached by personalities to document content may be content and/or media sensitive. For example, a personality may annotate a document depending on the format of the content (e.g., textual, graphical, and image) or form of the content (e.g., audio, video, static). Also, a personality may annotate document content differently depending on the media used to represent document content and/or enrichment. For example, document content may be annotated differently depending on the capabilities of device to which media is to be directed (e.g., whether the display screen is large or small, whether audio capabilities exist, etc.).

It will be appreciated by those skilled in the art that the personality (or personality identifier) may be textually and/or digitally recorded on a tag. In addition, it will be appreciated by those skilled in the art that the contents of the tag may be manually or semi-automatically recorded by a user and input into a mobile computing device. In one embodiment, the user of the mobile computing device may be permitted to compare the tag and select a personality from a list of personalities available on the mobile computing device that represents the tag. In another embodiment, the personality identifier on the tag is recorded in an image with a camera of a mobile computing device. Subsequently processing is performed on the recorded image to identify the personality identifier that may be digitally and/or textually encoded on the tag. In yet another embodiment, the content of the tag may be manually input by the operator of the mobile computing device.

C.2 Personalities Identified by Location

In this section, personalities are attached to document content from the location at which the request is made to enrich document content. In one embodiment, a personality is selected or suggested using a global positioning system. In another embodiment, a personality is assigned to a document token reading system at the location and attached to document references recorded by the document token reading system.

In a further embodiment, personalities are suggested using context such as the physical location of the user of a token-enabled mobile computing device 506 or the time and/or date at which the suggestion is made. In this embodiment, after selecting a document or document reference on a token-enabled mobile computing device 506, the mobile computing device converts positioning coordinates given by a GPS or GSM device or the like or a combination thereof (e.g., snaptrack.com), into a personality identifier. Personality suggestion is performed either at the mobile computing device or at the meta-document server using a lookup table that relates worldwide positioning information with personality identifiers. For example, a location in a city may be associated with personalities concerning particular monuments, streets, restaurants, buildings, or tour guides. The lookup table may be user specific so that time of day or week and/or position may reference either personalities that are directed at either work or personal interests. As set forth above in section C.1, once a personality is identified, the document content or reference thereto is transmitted along with the personality information to the meta-document server for content enrichment.

Figure 7:
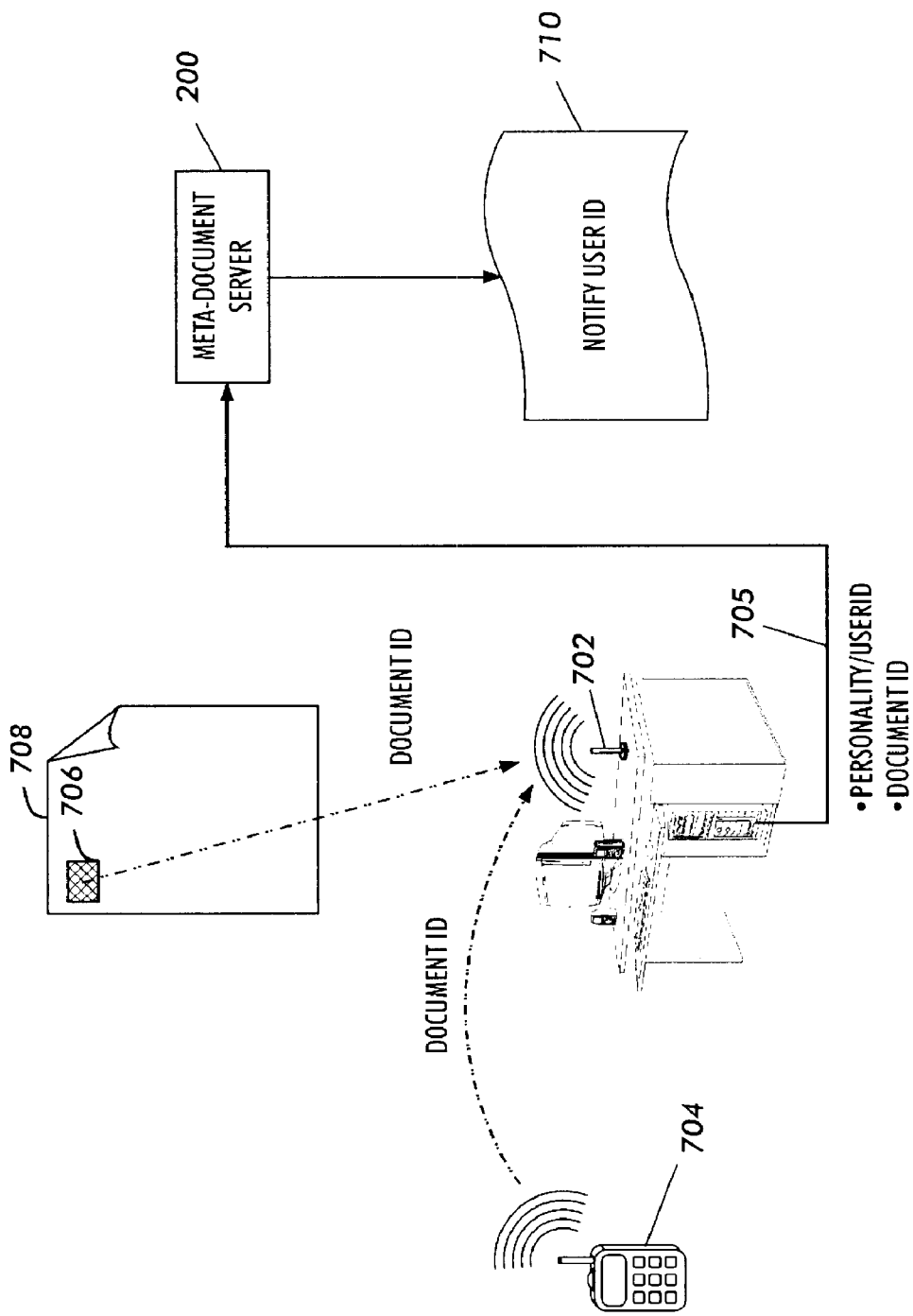
FIG. 7 illustrates a tag reader for receiving document identifiers from a mobile computing device or tag associated with a particular object.

In yet another embodiment, physical locations are assigned a specific personality identifier that is related to a physical object at the location or something which is associated with that location. FIG. 7 illustrates a device such as a tag reader 702 for receiving document identifiers from a mobile computing device 704 or a tag 706 associated with a particular object 708. Once the tag reader 702 or similar device (e.g., scanner) receives a document identifier or content, the system 705 coupled to the tag reader 702 directs a pre-assigned personality identifier and the document identifier or content to the meta-document server 200 for processing. As set forth above, the meta-document server after enriching the document content with the pre-assigned personality, either delivers a notice 710 by email to an identified user or places the enriched content in a folder associated with the particular location at which the tag reader 702 is positioned.

In yet a further embodiment, the tag reader 702 resembles a poker chip that includes a user identifier, a personality identifier, and a communications system for communicating with the meta-document server 200. A user to which the identifier is associated may have a plurality of these chips while working with document objects 708. When the user reads a particular document, the user can select and place any one of the plurality of poker chips upon the document to read tag 706. Upon receipt of the document identifier, the selected poker chip communicates the document identifier (or document content), personality identifier (or personality), and user identification (or user ID) to the meta-document server 200. Subsequently, the meta-document server 200 uses this information to enrich the identified document content with the identified personality and makes it available to the user upon completion. In this way, personalities may be readily applied to objects such as documents.

Context (e.g., physical location) in this section is used to identify or suggest a personality, unlike section C.1 where context is used to identify or suggest document content or a reference thereto that is to be enriched. In the example shown in FIG. 7, the personality assigned to the tag reader 702 is one that is commonly used by a person working at the location. The personality identified tag reader 702 is used by the person to quickly input documents identified using tag 706 or mobile computing device 704 to meta-document server 200. It will be appreciated that in another embodiment context may be used to perform both the actions of identifying or suggesting a personality as well as identifying or suggesting document content to be enriched.

C.3 Transit Triggered Enrichment

Personalities may alternatively be automatically or manually specified at capture or in-transit using personality buttons. Referring back to FIG. 2, a personality button is a button that is associated with a document capture, processing, and/or output device 218 that is programmable with one or more personalities from the personality database 212 of the meta-document sever 200 shown in FIG. 2. The processing of a document involves any action performed on a document (e.g., move, copy, print, email, etc.). The device 218 may be coupled to network 221 permanently or temporarily. In addition, the device may alternatively be a mobile device 219 that communicates with the network 221 through gateway or tag reader 222. Examples of document capture, processing, and/or output device include a scanner, a camera, a printer, a display, a facsimile, an email client/server, SMS text messaging, etc.

In operation, after programming a personality button on the devices 218 or 219, the user has the option of selecting the button during document capture, processing, and/or output. When selected, a program is activated which associates the programmed personality with the document being captured, processed, and/or output. At a specified interval (e.g., after capture, after or before processing, or before output), the document content generated or input to the device is sent to the metadocument server 200 for enrichment. Once enriched, the document content is either made available to the user at the meta-document server 200 or delivered to a specified device for output.

Figure 8:
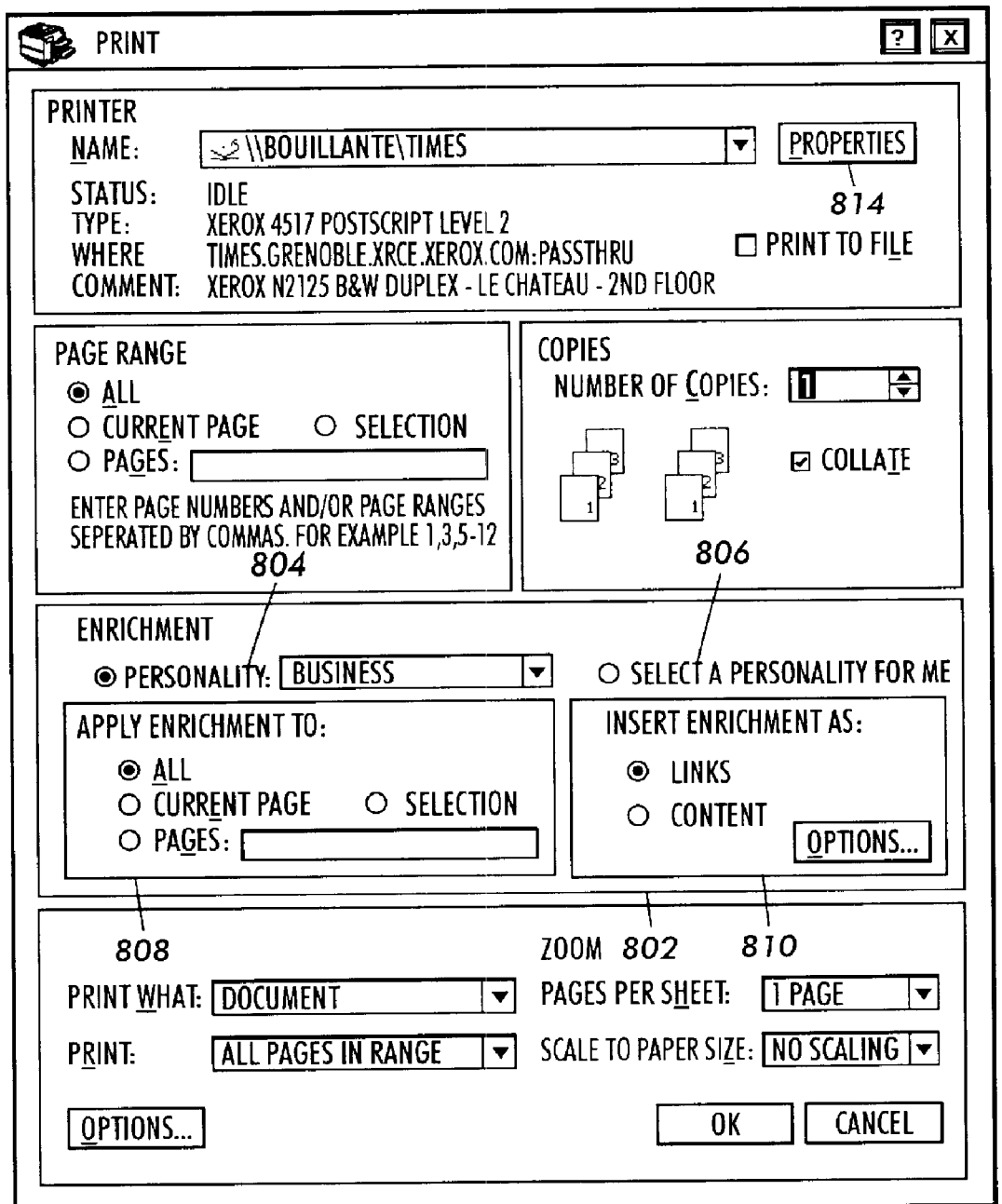
FIG. 8 illustrates a client interface for invoking a print command at a computer with enrichment selections.

In one embodiment, a user at a computer 226 is provided personality buttons when printing a document at a network device 218 coupled to the network 221. FIG. 8 illustrates a client interface 800 for invoking a print command at the computer 226. In addition to well known print property settings, the client interface offers enrichment property buttons 802. The enrichment property buttons 802 enable a user to manually select a personality to apply to a given print request at 804 or have the meta-document server select a personality automatically for the user at 806. In addition, the enrichment property buttons 802 allow a user to apply the enrichment to selected pages or content at 808. Also, the enrichment property buttons 802 allow a user to specify whether the enrichment is inserted in the print request in the form of links or as additional content at 810.

Figure 9:
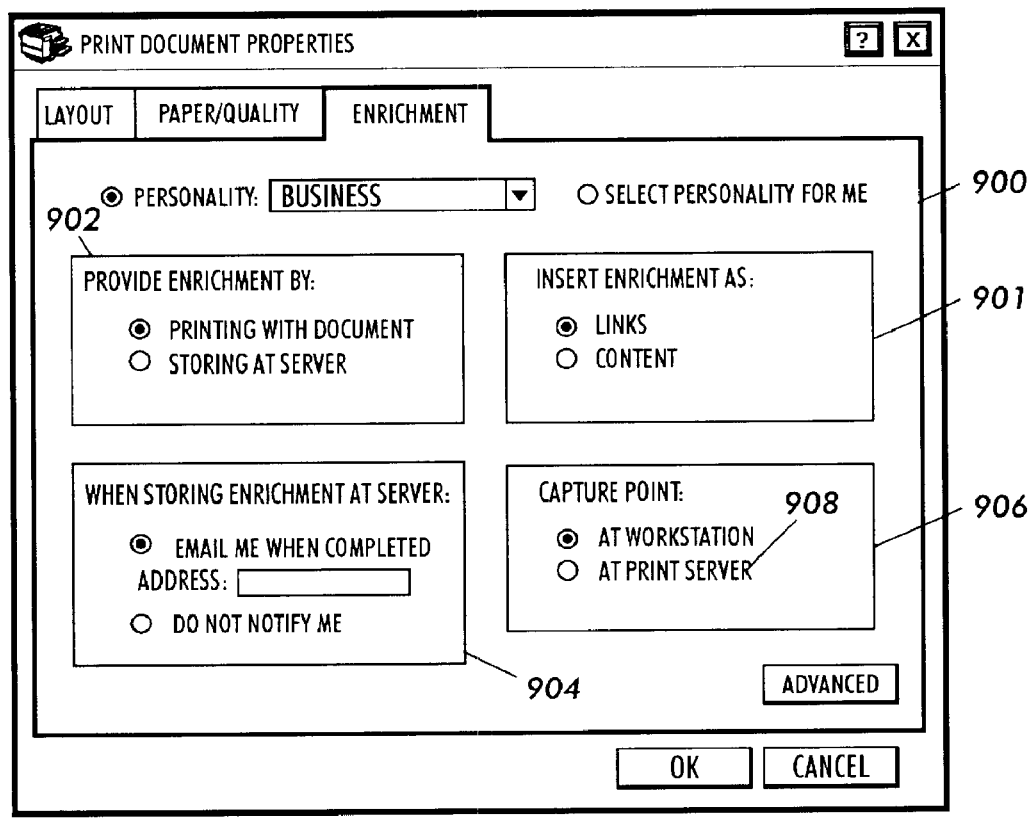
FIG. 9 illustrates a properties interface for the client interface shown in FIG. 8.

FIG. 9 illustrates a properties interface 900 for the client interface 800, which is invoked by selecting properties button 814 in the interface 800. The properties that may be set in the properties interface 900 are default enrichment properties that may be applied to any user print request. For example, the user is given the ability to specify whether enrichment should be provided as links or content at 901, and whether provide enrichment by printing it or storing it (on the meta-document server) at 902. If stored on the server the user is given the ability to specify at 904 whether to be notified by email when such enrichment is completed, or when significant changes occur in the document markup.

The properties interface 900 also provides the user the ability to specify an insertion point at 906. Advantageously, enrichment may be automatically or manually set to occur at any insertion point of a document service request. A document insertion point is a point in the processing of a document at which a stage of processing has begun or ended. For example, in printing a document it may be converted into postscript before being directed to a specific printer. Thus, in this example insertion points exist before or after conversion to postscript.

If the insertion point is selected to occur after the document is rendered to postscript, the postscript driver is alerted to create a copy of the document before sending it to the selected printer. Subsequently, a personality to attached to the rendered postscript document. Both the postscript document and its attached personality are stored on the meta-document server 200 for enrichment to take place. If either the name of the document, and/or the identifier of the user who submitted the document to the device are available to the device driver, then the location of the personality-enriched document is communicated to the user via some notification service (e.g., email, smart cover sheet, etc.). Smart coversheets are disclosed in U.S. patent application Ser. No. 09/746,913, which is incorporated herein by reference.

In summary, the combination of the interfaces 800 and 900 provide a user with the ability to specify what content to enrich, when to enrich it, and in which form the enrichment should be provided to the user. It will be appreciated by those skilled in the art that additional enrichment property buttons 802 can be specified as part of the client interface 800 or properties interface 900, and that these properties can be interchanged between the two interfaces.

Personality buttons may appear in many alternate forms, besides those shown in the drawings. For example, a personality button can be added to a document capture devices such as scanners, printers, email clients, digital cameras, mobile phones, and community walls (such as described in U.S. patent application Ser. No. 09/746,914, entitled "Electronic Board System", which is incorporated herein by reference). The personality button may be a physical button or ones formed using software on a display screen of a device.

In the event an image is scanned at a scanner, the personality applied to the image using a personality button at the scanner's interface can be one that includes a service for identifying objects, such as people or buildings, therein. Identification can be performed using a variety of pattern recognition techniques. Once objects are identified, additional services automatically or manually selected can then be used to enrich the identified object (e.g., photo).

In another embodiment, a personality button is added to a Dictaphone or other voice-input capturing device. When the user records audio, the user has the option of selecting one or more programmable personality buttons to apply a personality to all or a portion of the recorded audio. Note that when there are multiple personality buttons, multiple personalities can be indexed to different portions of a continuous audio recording using audio indexing. Audio indexing is further described in U.S. Pat. No. 5,321,396, which is incorporated herein by reference.

Once the recording of voice terminates, one or more personalities are attached to the recorded voice as specified using one or more personality buttons by the user. When invoked, a first service in one of the personalities converts the audio into text. The recorded audio is converted to text by the first service using well-known voice recognition software such as ViaVoice sold by IBM. Subsequently, one or more additional services are applied to enrich the text in accordance with the attached personalities. If the audio is indexed with multiple personalities, then each indexed portion of the audio after being converted to text is associated with the particular personality that it is assigned, and delivered to the meta-document server 200 for enrichment in accordance with the indexed personality.

In variation of voice-input capturing using personality buttons, the user adds the personality to the voice capture by pressing an index button that marks the recording in some symbol (e.g., a predefined tune) to indicate that the subsequent name will identify a known personality. In yet another embodiment, a sequence of one or more index marks on the audio recording could be used to identify known personalities to specified sections of the audio recording. These index marks, which are identifiable by the voice recognition software could be recorded either audibly (e.g., "Add Personality") or with a special button on the audio capture device.

In yet another embodiment, a personality button is added to a video capture device (e.g., video camera) or display device (e.g., television). Similar to the audio capture device, one or more personality buttons can be used to apply one or more personalities to the video capture device or to the display using personality buttons on the device or a remote of the device while content is being captured and/or displayed.

In yet a further embodiment, video and/or audio is annotated directly or used to annotate textual content. For example, audio can be compared to other audio tracks. In identifying a similar audio track, the similar audio track can be used to annotate the audio to which it is being compared. Similarly, textual content, whether or not derived from audio data, can be annotated with audio and/or video tracks to further enrich the textual content.

In the case of video capture, video image data is matched against stored images, or decoded to identify the video from which the image was drawn. For example, screen credits can be captured and decoded by an OCR (Optical Character Recognition) program, and then the names matched against a database of movies and the video identified.

In the case of display, if the video is broadcast on a publicly available channel, the image can be matched against videos shown on those stations at the time of data capture. Alternatively, time and channel information of public broadcasts can be used to identify a video at the time a user selects a personality to apply to the video. Personality buttons in one embodiment can be part of a television remote control. Such personality buttons can be turned on and off while viewing to create index points associated with video content that associate one or more personalities to different intervals of the program. In one embodiment, the video is not captured but instead is identified using the title of the video, and the text of the video thereafter enriched. Alternatively, the audio of the video production can be processed as set forth above using a voice input capturing device with personality buttons.

Once the video is identified, the text of the audio from a video recording is accessed in one embodiment from a script or subtitle database. The selected personality along with any index points (specifying particular sections to which one or more personalities are to be attached to the video) are associated with the retrieved text (at indexed points if specified) and stored in the meta-document server 200 for enrichment. For example, if the video is a film of a Shakespeare play, then the personality might be a play critic personality that would link up references in the play text to footnotes, glossaries, analyses, or liner notes. It will be appreciated by those skilled in the art that if the video is recorded with multiple personalities selected using index points, then the index points and text must be synchronized. In addition, it will be appreciated by those skilled in the art that in addition to audio from a video recording, images can be reduced to textual content using OCR programs.

D. Creating and Modifying Personalities

This section pertains to the formation and/or customization of individual or groups of personalities. It will be appreciated by those skilled in the art that the different methods described herein for forming and/or customizing personalities may be used on their own or in combination.

Figure 10:
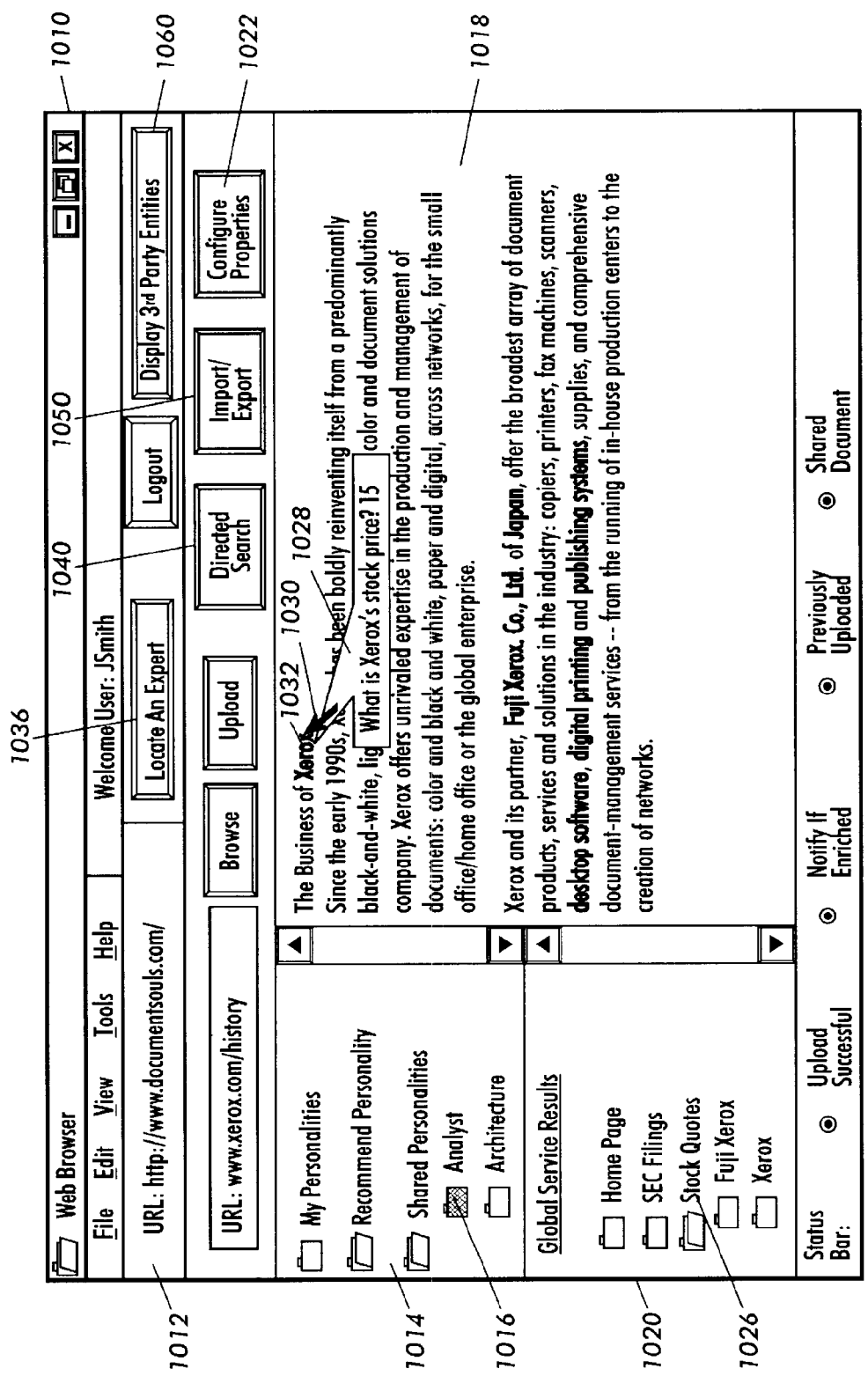
FIG. 10 illustrates a client interface for accessing the meta-document server shown in FIG. 2.

FIG. 10 illustrates a client interface 1010 for directly accessing the meta-document server 200 shown in FIG. 2. Such a client interface can operate at a user computer 226 or mobile computing device 219. In one form, the client interface 1010 is invoked by specifying an address (e.g., URL) of the meta-document server 200 in any conventional Internet or web browser. Other forms of the interface may be for example accessed using an application specific program.

After logging in on a login screen (not shown) through user manager 214, a user is given the ability to specify a location of a document to be uploaded and stored in meta-document database 202 at 1012. After the specified document reference at 1012 is uploaded and stored in the document database 202, a personality 1016 is selected from personality window 1014.

Once the personality 1016 is selected, the meta-document server may immediately and/or at a later point in time, depending on the document services specified in the personality, enrich the uploaded document content as described herein. In the event document content is immediately annotated with document services set forth in the selected personality, results are displayed in window 1018 and global service results in window 1020.

The personalities in window 1014 can be arranged in a variety of views that can specify private, shared, or public personalities. These personalities are recorded in the personality database 212 shown in FIG. 2. Shared personalities may be given different access permissions (e.g., some users may be able to read or modify a personality while other may only be able to read a personality).

Figure 11:
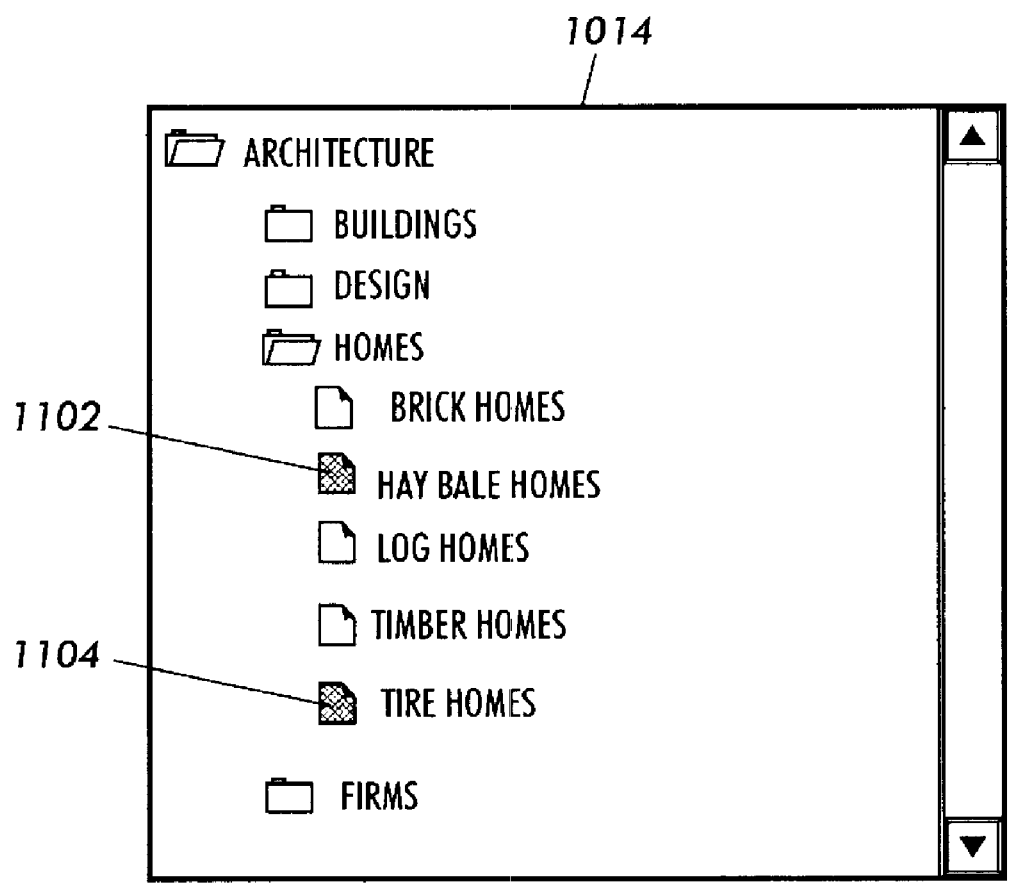
FIG. 11 illustrates a blow up of the window 1014 shown in FIG. 10 for an architecture personality in which hay bale homes and tire homes personalities are selected.

In addition, the window 1014 allows one or more personalities to be selected and simultaneously applied to enrich an uploaded document. In one embodiment, this is accomplished by selecting a single personality or a folder of personalities, as shown in FIG. 10 at the analyst personality 1016. Alternatively, specific personalities can be selected to be applied to uploaded document content. FIG. 11 illustrates a blow up of window 1014 shown in FIG. 10 for the architecture personality in which hay bale homes and tire homes personalities are selected, at 1102 and 1104 respectively.

Figure 12:
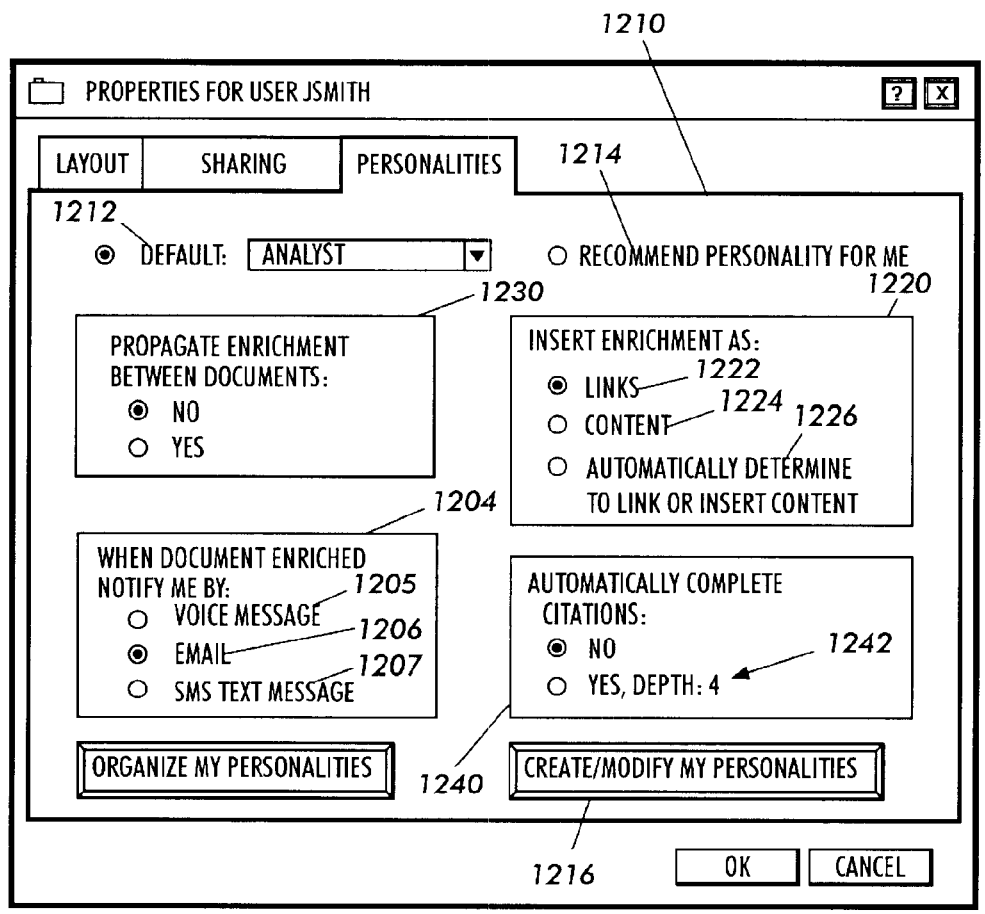
FIG. 12 illustrates an example of a properties window 1210 that is displayed when the properties configuration button 1022 is selected in FIG. 10.

Invoking button 1022 on interface 1010 brings up a properties window for a user. FIG. 12 illustrates an example of a properties window 1210 that is displayed when the properties configuration button 1022 is selected in FIG. 10. In window 1210 a user is able to specify a default personality at 1212 or to have a personality recommended when a document is uploaded to the meta-document server 200 at 1214. A default personality at 1212 available to a user is "none", which if selected requires a user to specify a personality manually from the window 1014 after uploading a document. In addition, properties window 1210 allows a user to create and/or modify specific personalities by selecting button 1216, the details of which are discussed below in section D.1.

D.1 Generally

Figure 13:
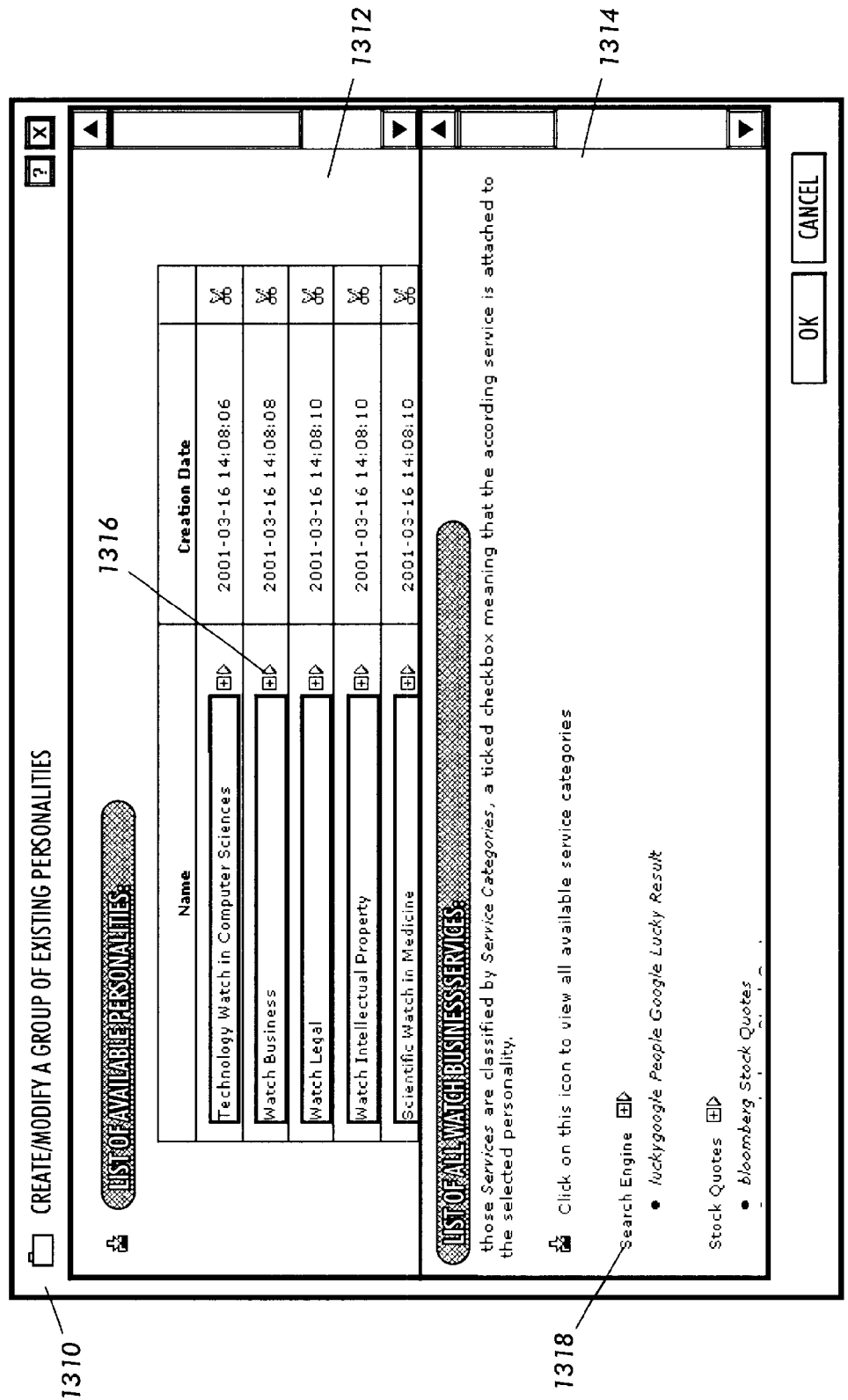
FIG. 13 illustrates one embodiment of a client interface for creating and/or modifying personalities.

In one embodiment to create and/or modify personalities, a window 1310 shown in FIG. 13 is revealed with two sub-windows 1312 and 1314 after selecting button 1216 shown in FIG. 12. The first sub-window 1312 presents a list of all available personalities, while the second sub-window 1314 presents a list of categories of available services for a personality selected from sub-window 1312. In the example shown in FIG. 13, the "watch business" personality is selected at 1316. Each category of services shown in sub-window 1314 is selectable to permit a user to specify one or more specific document services (e.g., information retrieval service 1318).

FIG. 14 illustrates a window 1400 with the information retrieval service 1318 in which searches can be selected for specific categories. In the example shown in FIG. 14, the categories of computing and people are selected at 1404 and 1408, respectively. In operation during enrichment, only those services that are selected are invoked. In addition, the searches performed by services will be limited to specified categories. That is, searches performed by a selected service can be limited to a specified category in the information provider's directory (e.g., Google™) of information content. For example, the service 1408 is limited to the "people" category of content of the information provider "Google".

In addition, FIG. 14 illustrates that selected services can be updated or refreshed at 1450 on a periodic bases such as either a daily, weekly, monthly, or automatic bases at 1452–1455, respectively. The period of automatic updating at 1455 is determined using for example: (a) the history or access log of a browser (e.g., how recently the address of the services has been accessed by a user); and/or (b) monitoring results received from the service over a period of time and if they change at a frequent rate then set the refresh period to be frequent. Alternatively, a selected service can be specified to be updated never (i.e., to perform a single act) or until the end of a predefined period (e.g., until 2003), as illustrated at 1451 and 1456, respectively. In another embodiment not shown, the selected service can be specified to be updated until a specified purpose expires (e.g., as long as a person is a minor). In yet a further embodiment not shown, the selected service can be specified to be updated until it no longer returns relevant results. Also, FIG. 14 illustrates that cost can be defined for each service at 1440 as free at 1442 or for payment at 1444 for which a maximum amount may be defined.

Figure 15:
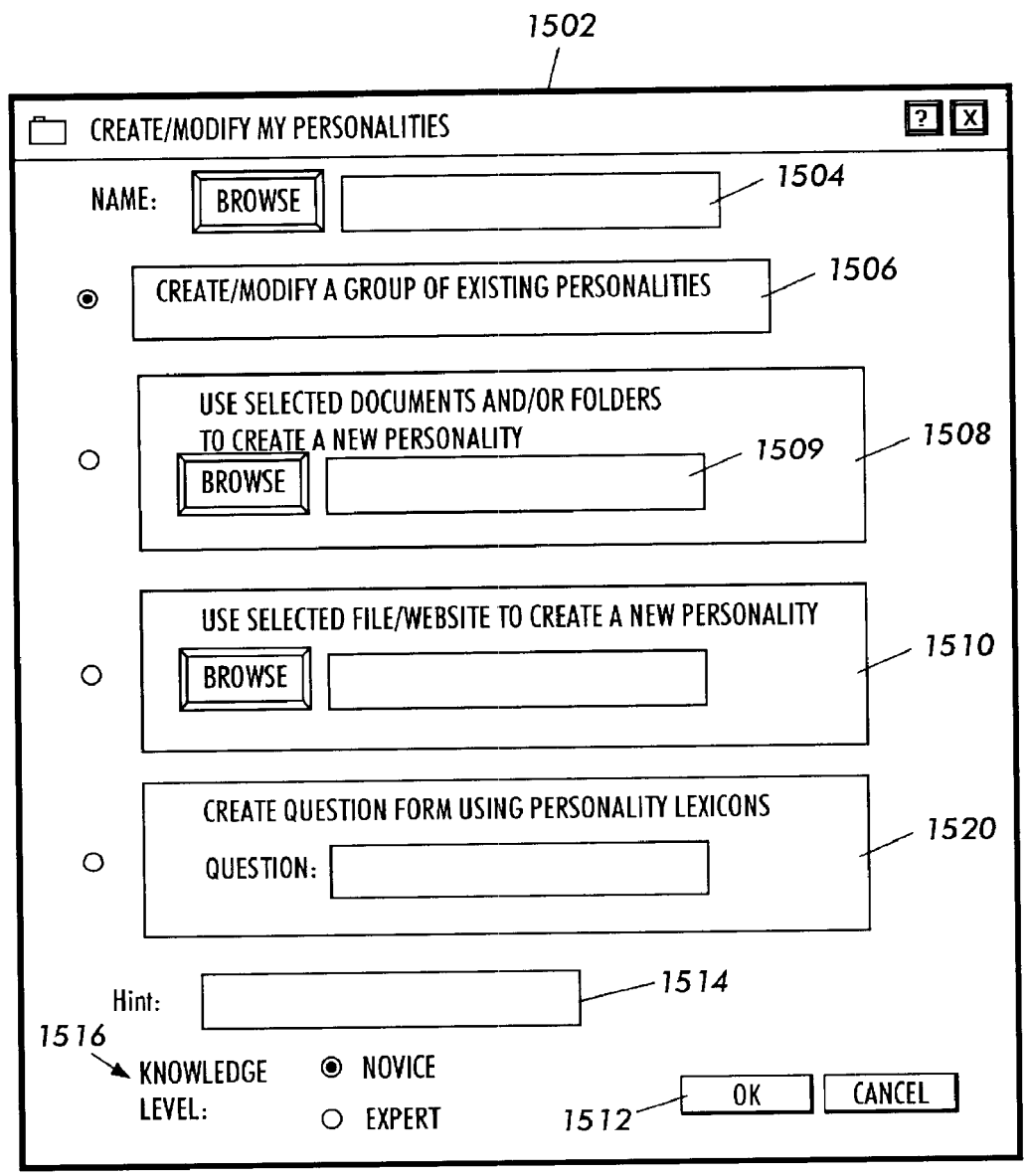
FIG. 15 illustrates another embodiment of a client interface for creating and/or modifying personalities.

In another embodiment to create and/or modify personalities, a window 1502 is revealed as shown in FIG. 15 when the button 1216 is selected in FIG. 12. In this embodiment, a user is given the ability to specify a name of a personality at 1504 and create it by either (a) modifying existing personalities at 1506, (b) using a selected set of files and/or folder with files at 1508, or (c) using content from a selected file or website at 1510.

D.2 Using an Algebra

Figure 16:
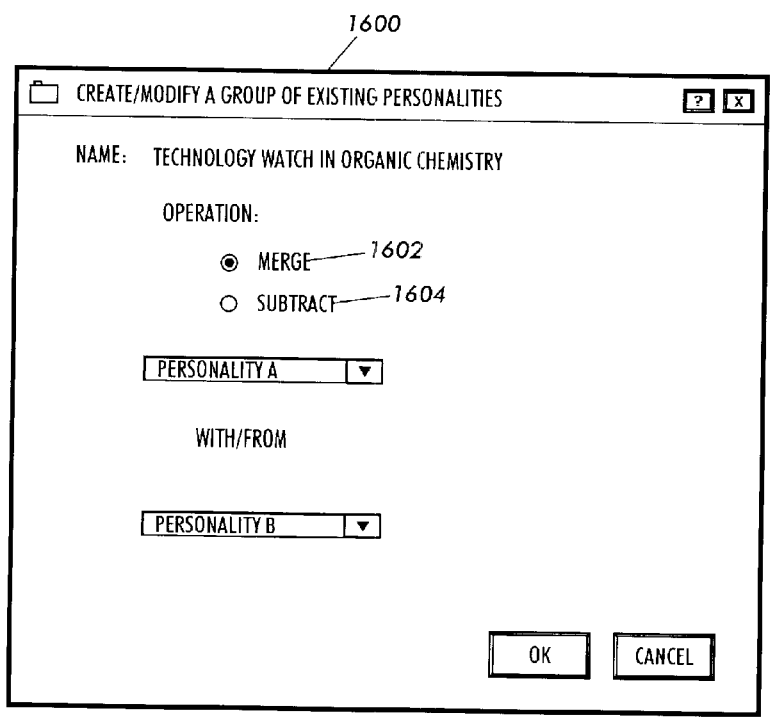
FIG. 16 illustrates a client interface for creating and/or modifying personalities by performing operations to groups of personalities.

In one embodiment, personalities can be specified through modification at 1506 in FIG. 15 by tailoring existing personalities using an algebra. A specific personality can be tailored using an algebra that merges, adds, subtracts, composes (i.e., personalities that are composed together using a composition operator allow the results of one personality to be used as input of another personality), or intersects sets of two or more personalities. For example, it may be desirable to eliminate any references to computer science in a very general "tech watch" personality. FIG. 16 illustrates an example of a user interface 1600 in which personalities are either added together or subtracted from one another, at 1602 and 1604 respectively, to form a new or modified personality.

In one embodiment, personalities are defined using a collection of tuples (i.e., set of ordered elements) of services S and lexicons L $[S_I, L_J]$. A first personality A and a second personality B are merged by forming the union of their tuples $[S_I^A, L_J^A]$ and $[S_K^B, L_M^B]$, respectively. If any of the services $S_I^A$ or $S_K^B$ in either personality are the same then the new service consists of $[S_I^A, L_N]$ where $L_N$ is the union of $L_J^A$ and $L_M^B$. In addition, a first personality A can be restricted by removing an existing personality B from it by creating a new personality by: (a) removing any services that are the same in both personalities A and B, and/or (b) subtracting the lexicon $L^B$ from the lexicon $L^A$ corresponding to that service. Alternatively, the techniques outlined in section D.3 can be applied to the services in selected personalities to select and/or organize the services of the new personality.

D.3 Using a List of Links

In another embodiment, the meta-document server automatically generates on demand a personality using a specified set of documents or references thereto. For example, the set of documents could be defined using all of the files in a folder of a personal computer, where the set of files could contain textual content that is linked to or references other content (e.g., using hyperlinks). Alternatively, the set of documents could be identified using a predefined query such as an SQL query. In yet another embodiment, the set of document can comprise all of the documents in the meta-document information space 4200 (shown in FIG. 44), which is described in detail below in section G.2.

Figure 17:
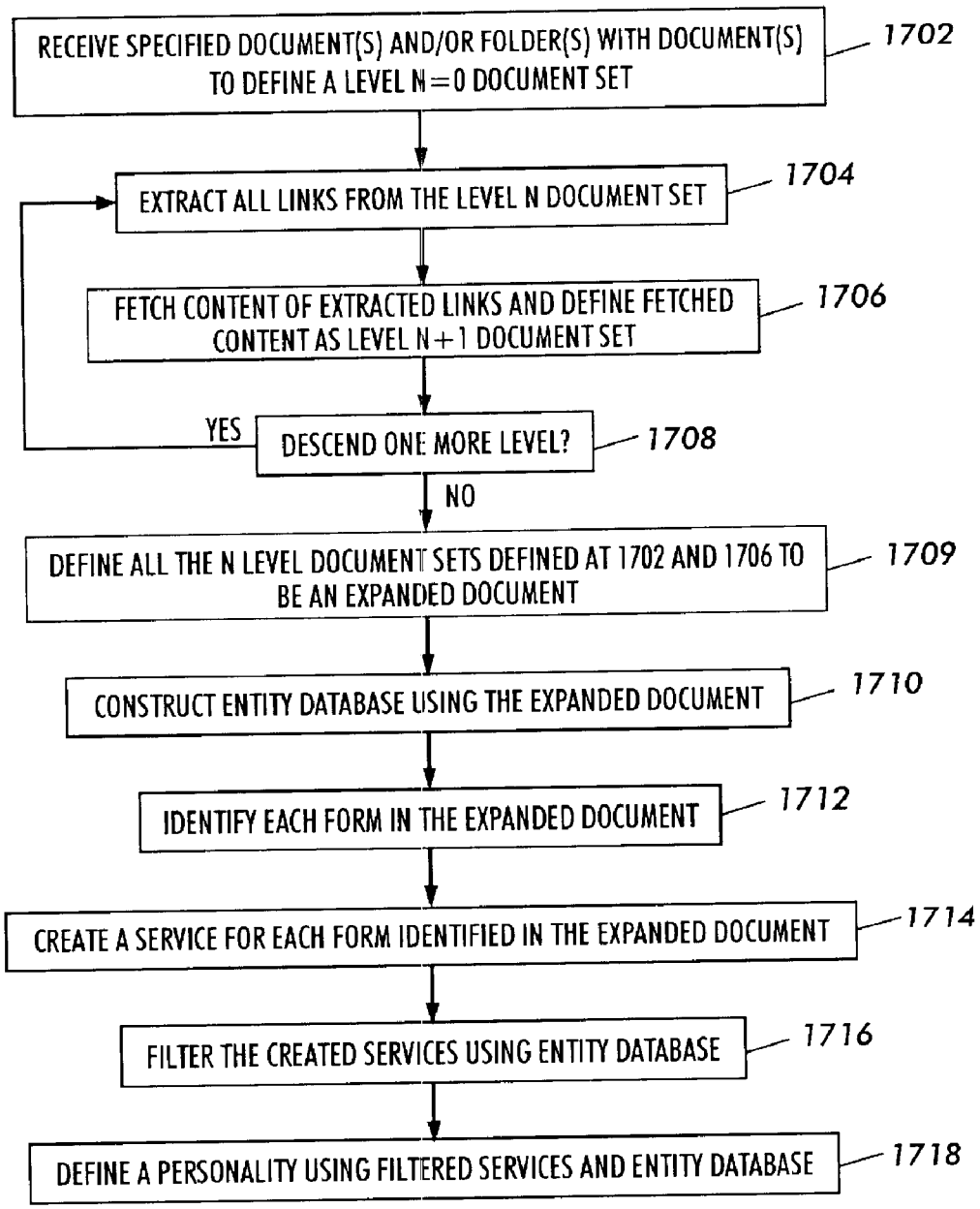
FIG. 17 is a flow diagram illustrating steps for generating a personality.

Advantageously, the personalities generated are user-centric since they build on information that is explicitly selected by a user. In one embodiment, this service for automatically generating personalities is invoked in the window 1502 at 1508. Once a user specifies a set of documents at 1509 and initiates a request for the service at 1512, a process set forth in the flow diagram depicted in FIG. 17 is performed by the meta-document server for generating a personality. It will be appreciated that in an alternate embodiment, the meta-document server uses this process on its own given a collection of documents identified by, for example, a search.

Initially at 1702, the personality creation process receives a specified set of documents and/or folders containing a set of documents. This set of documents is defined as a level N=0 document set. At 1704, all links are extracted from the level N document set. At 1706, content pointed to by the extracted links is fetched and used to define a level N+1 document set. At 1708, if additional levels are to be descended then the action at 1704 is repeated; otherwise, an expanded document is defined using the N document sets defined at 1702 and 1706.

Figure 18:
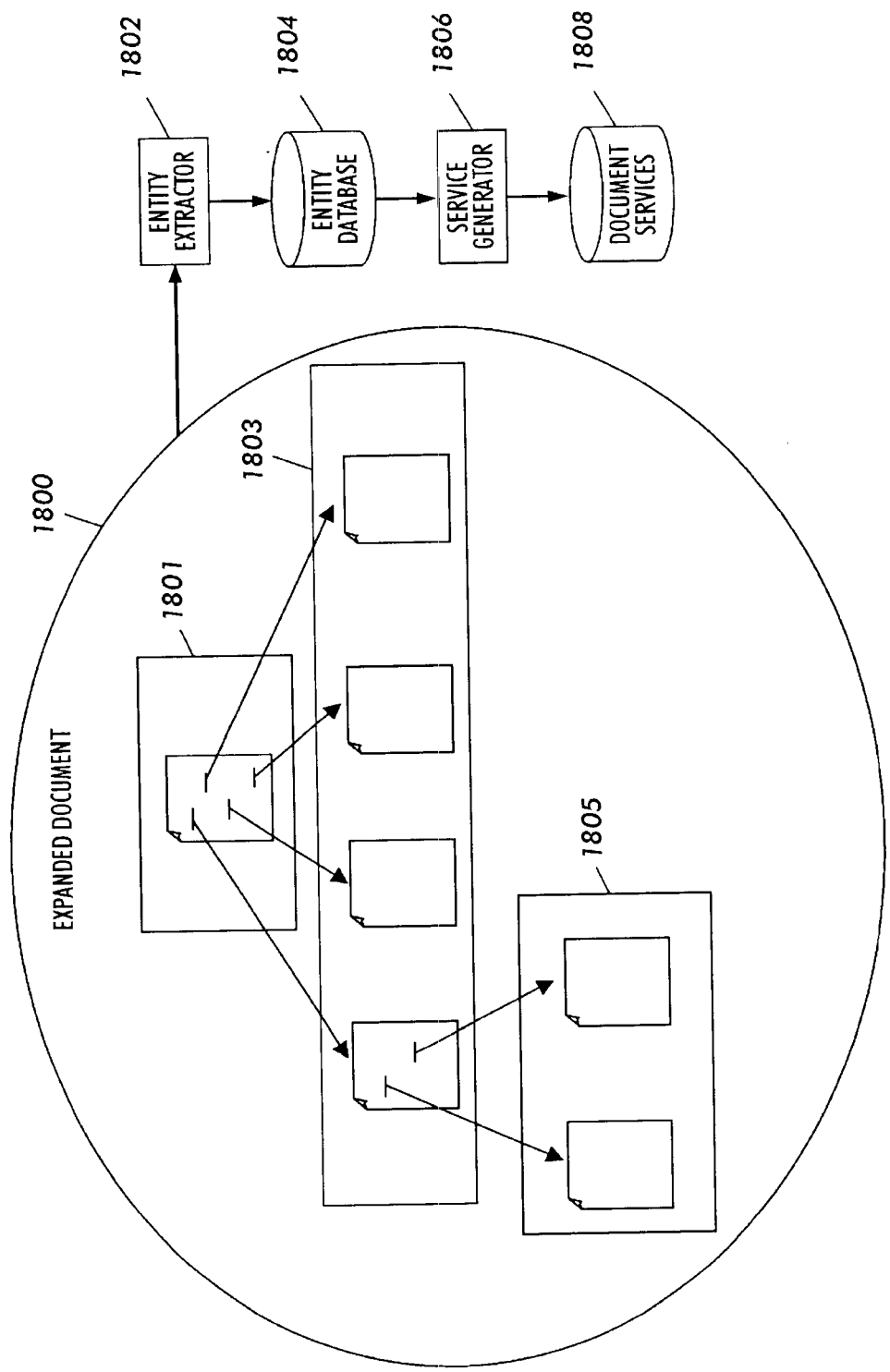
FIG. 18 illustrates an example of an expanded document 1800, developed by descending two levels.

More generally, the collection of N documents sets are referred to as an expanded document. The expanded document, which can be viewed as a list of documents, consists of documents selected by the user and the documents linked to those selected documents. FIG. 18 illustrates an example of an expanded document 1800, developed by descending two levels from a level N=0 document set 1801. That is, the expanded document 1800 consists of the level N=0 document set 1801, a level N=1 document set 1803, and a level N=2 document set 1805. In this example, the level N=0 document consists of a single document with three links, that reference the documents in the level N=1 document set 1803.

Referring to FIGS. 17 and 18, an entity extractor 1802 constructs an entity database 1804 using the expanded document 1800 (which in one embodiment the entity extractor created), at 1710. The entity extractor 1802 includes generic rules for extracting entity types such as names of cities, people, products, dates, noun phrases, etc. These generic rules do not specify entities per se. Instead they specify generic entities that are capable of detecting that a capitalized noun is likely to be a person's name rather than a name of a city, which can be performed by using the context surrounding the identified noun.

Further details of entity extraction are described below in section G.2. In addition, an entity that is extracted is indexed to point back to the location at which it referenced. In addition, the entity database includes contextual information related to the use of the entity. An example of an entity database is shown in FIG. 33 and described in more detail below.

Subsequently, the entity database 1804 is used by a service generator 1806 to generate document services or document service requests 1808. The combination of the entity database 1804 and document service requests 1808 are then used to define a new personality. This new personality can thereafter be applied to a document uploaded to the meta-document server and enriched as described above.

Initially at 1714, the service generator 1806 identifies and extracts all queryable forms in the expanded document 1800. Queryable forms can be identified by, for example, one or more tags. In one embodiment, each page of the expanded document 1800 is scanned for XML (EXtensible Markup Language) and HTML (HyperText Markup Language) forms. Typically, a form consists of input fields, choice fields such toggle buttons, menus, etc. HTML forms are described for example in "XForms 1.0" by World Wide Web Consortium (W3C) published on the Internet at http//www.w3.org/MarkUp/Forms.

At step 1716, the service generator 1806 creates at least one service for each form identified therein. In the event a page contains multiple forms, the service generator will generate multiple services to account for the different possible combinations of queries that could result. Further details of the act of creating services is set forth in section D.3.1 below.

At 1716, the service generator 1806 filters the services created at 1714 that likely provide little added utility. Services that add little or no utility return no results or irrelevant results. Methods for measuring the utility of incorporating a service (that was induced from a form) into a personality is set forth in section D.3.2 below. Both approaches rely on a Boolean or vector space retrieval model, a brief description of which is set forth in section F.1.4 below.

Finally, at 1718 a personality is defined using the filtered services and the entity database. The entities in the entity database are limited to the types of entities that provide utility as measured through the service to which they are associated (e.g., by measuring the utility of a word). As a further refinement, services are limited in scope to entity types for which they provide added value (i.e., return relevant results). Determining relevant results or added utility can be accomplished by filtering and ranking results after running a service that for example queries an information provider.

In one embodiment, filtering and ranking of results of a query returned by an information provider related to document content to which a personality is attached with the service is accomplished by: acquiring a list of hyperlinks and summaries ordered by relevance from the information provider; performing a similarity measure between the summaries and the context surrounding entities in the document content to which the query is directed; ranking the results based on the computed similarity measure; and filtering out only the highest ranked results.

In an alternate embodiment, the similarity measure is performed using document content referenced by the hyperlinks in addition to the summaries. Also, a Cosine distance metric or a correlation measure can be used to measure the similarity between the content acquired from the information provider and the related document content.

It will be appreciated by those skilled in the art that before using a Cosine distance metric the document content are converted to features (e.g., word, word phrases, etc.) and stemmed. In addition it will be appreciated by those skilled in the art that distance measurements can be performed on originally extracted features that are remapped to define a reduced feature space using latent semantic indexing (LSI).

In one embodiment, a personality created at 1718 by packaging the services filtered at step 1716 is ranked and organized hierarchically into groups using the hyperlinks of the specified services. Such ranking and organizing can be performed using known ranking, (agglomerative) clustering or hyperlink techniques. An example of hyperlinked techniques is disclosed by Kleinberg, in "Authoritative Sources In A Hyperlinked Environment," IBM Technical Report RJ 10076, May 1997.

In an alternate embodiment, the organizational structure of the documents with hyperlinks specified at step 1702 is used to create one or more personalities at step 1718 (e.g., a personality for each branch in a hierarchical collection of documents is created). These personalities could be organized as shown in FIG. 11. It will be appreciated by those skilled in the art that the steps set forth in FIG. 17 may be partially or entirely automated.

In another embodiment, the expanded document 1800 is further developed by attaching a generic personality thereto. The generic personality could be applied to one or more levels of the expanded document and only depending on whether there exists a need for further expansion of the information space surrounding the original document content at level N=0. For example, in one instance the generic personality is applied only if the expanded document references less than a predetermined threshold number of documents.

D. 3.7 Creating Services

In one embodiment, each service created at step 1714 is created with the following properties: (a) the service is specified such that it takes as input a new text segment identified for example by a document reference (e.g., URL); (b) the service includes methods for recognizing entities and their offsets in the new text segment or accepting recognized entities and their locations from another service; (c) the service includes methods for associating the recognized entities from the new text segment with (i) the concepts in the retrieved content of the N level document sets, (ii) an instantiated query (i.e., a concrete instance defined therefor) involving the recognized entity and a form, and/or (iii) a result (possibly reformatted or filtered) of the instantiated query (ii) with the recognized entities at (b); and (d) the service includes methods for returning a list with the recognized entities and their original offsets at (b) and the newly associated information at (c). In an alternate embodiment if a service for a specified hyperlink already exist then no new service is created and the existing service is used.

In cases c(ii), a form may be instantiated as follows. If the form contains one input field and one or no submit buttons, then the input field is filled with the recognized concept or entity, and the form submission protocol (e.g., GET or POST as disclosed in XForms 1.0) is followed with the filled-in input field. In case the form contains more than one field, then either all possible combinations of fields and recognized entities or concepts are created for submission, with only those producing non-null results being returned. Alternatively, the form may be filled in using automated techniques such as those disclosed on the Internet at www.roboform.com.

Figure 19:
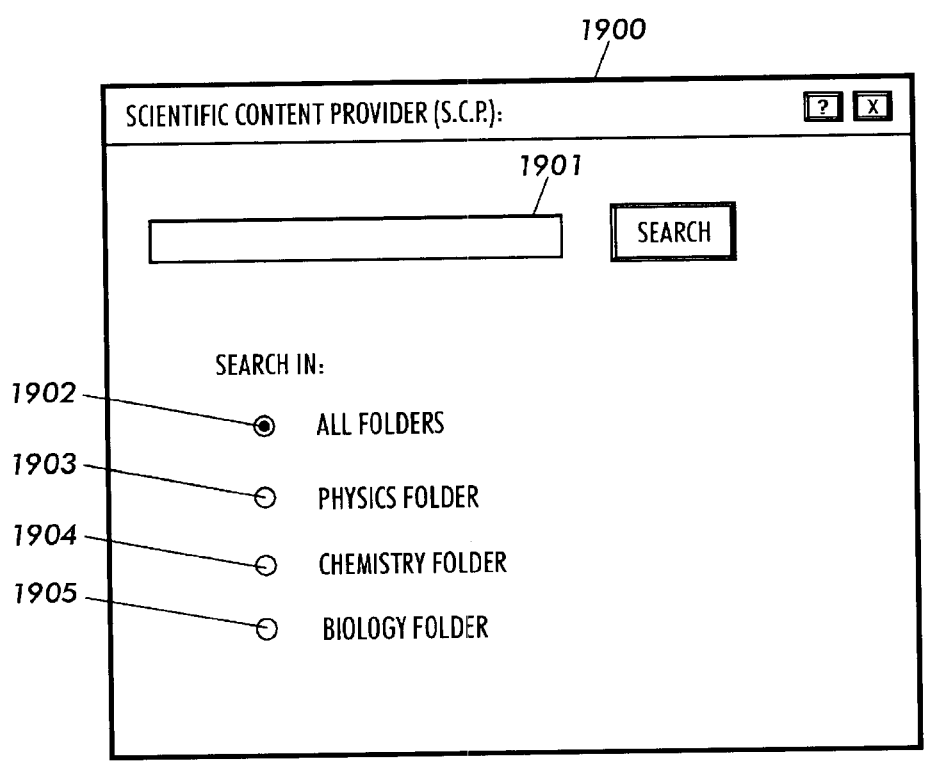
FIG. 19 illustrates a form that can be used to create services.

By way of example, consider form 1900 with input field 1901 and toggle buttons 1902–1905 depicted in FIG. 19. In this example, the form 1900 is a front end for a content provider of scientific material. The form is composed of a text field 1901, where the user is expected to input one's query and toggle fields 1902–1905, where the user can indicate to the system, in which folder the query should be executed (e.g., by selecting the all-folders toggle button 1902, the system will search the entire content of the content provider). In this example, the following four different services shown in FIG. 20 would be generated. Each service includes the input field 1901 and one of the four toggle buttons 1902–1905 in an activated state. Each service is associated with a particular type of entity, which is determined using method disclosed below in the following section D.3.2.

D.3.2 Filtering Services

The purpose of filtering as set forth above is to remove services that have been created but that have little or no utility. More specifically, given an entity database and a list of extracted services, three different utility measures are set forth below to determine the utility of a list of services. It will be appreciated by those skilled in the art that one or a combination of the three utility measures can be used. Generally, each utility measure ranks the services according to their potential usefulness for entities in the entity database.

Figure 21:
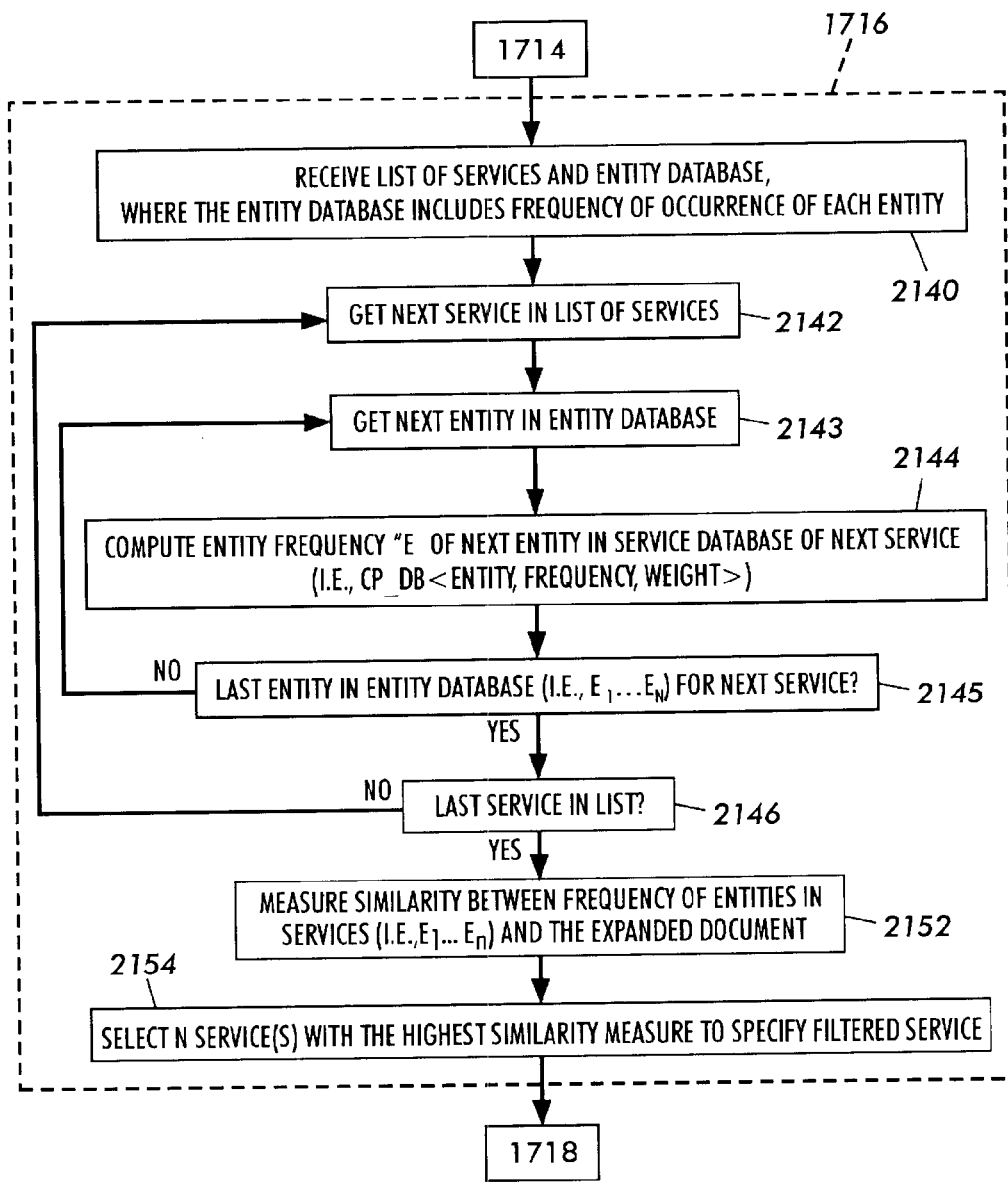
FIG. 21 is a flow diagram that depicts one method for filtering services at act 1716 in FIG. 17.

A first utility measure is set forth in FIG. 21, which depicts a flow diagram of the act at 1716 of filtering services created at 1714 using the entity database created at 1710. Initially at 2140, a list of services and an entity database are received. It is assumed that the entity database includes the frequency of occurrence of each entity in the expanded document.

Each service provides means for accessing an information service provided by a content provider. The frequency of entities in the entity database of the databases provided by content providers accessed by each service in the list of services is computed at 2142–2146. More specifically at 1242–2146, the following statistics relating to the frequency of each entity in a service are computed: (a) $f_{ij}$ the number of documents in the database of content provider $CP\_DB_j$ that contain entity (or feature) $f_j$; and (b) $w_{ij}$ the sum of the weights of each feature $f_j$ over all documents in the database of content provider $CP\_DB_j$. At 2144, each content provider is represented as a list of tuples of the form <entity, frequency, weight>, where frequency and weight are as "f" and "w" defined above. The expanded document is represented using a similar list but in this case f denotes the number of documents in which the entity occurs and w denotes the sum of the weights of each entity over all documents.

In one embodiment, information relating to the frequency of entities in services can be acquired for each service by running periodically a system that constructs a query for each feature $f_j$ that are executed at content provider $CP\_DB_j$ and subsequently extracts the values $f_{ij}$ and $w_{ij}$ from the returned results of the query. Extractors for values $f_{ij}$ and $w_{ij}$ can be constructed automatically using wrapper approaches or Hidden Markov Models (HMMs).

Approaches for generating wrappers is disclosed in U.S. patent application Ser. No. 09/361,496, which is incorporated herein by reference. Additional information regarding wrapper generation is disclosed by Chidlovskii et al. in: "Automatic Wrapper Generation for Web Search Engines", Proc. 1st Intern. Conf. on Web-Age Information Management, WAIM'2000, LNCS Series, Shanghai, China, June 2000; and "Wrapper Generation via Grammar Induction", 11th European Conference on Machine Learning, ECML'00, Lect.Notes Comp. Science, Vol. 1810, Barcelona, Spain, May 2000.

In another embodiment, the STARTS protocol is used to export summaries from the content provider to provide information relating to the statistics of entities in services. STARTS is a protocol proposal for Internet searching coordinated by Stanford University, that involves private and public organizations. STARTS specifies that content providers should export summaries that include entity statistics $f_{ij}$ and $w_{ij}$. Details of the STARTS protocol are described by Gravano et al., in "STARTS: Stanford proposal for Internet meta-searching", Proceedings of the 1997 ACM SIGMOD Conference, 1997.

At 2152, any of a number of well-known similarity measures can subsequently be used to measure the similarity between each service and the expanded document. For example the Cosine distance metric can be used. Alternatively, a correlation measure could be used at 2152 to measure similarity. For more background relating to the computation of distance metrics see "Foundations of Statistical Natural Language Processing" by Manning and Schutze, MIT Press, 1999. In addition, see section F.1.4 herein that describes a correlation measure in terms of entities and associated frequencies and weights.

In yet another embodiment, the entities and associated frequencies (i.e., similarity for entities and weights) could be remapped to define a reduced feature space using latent semantic indexing (LSI) (for background relating to LSI see articles authored by Dumais available on the Internet at http://www.cs.utk.edu/~lsi/), thereby overcoming problems associated with synonyms and polynyms (i.e., same word has different interpretations depending on the context). Subsequently in this alternate embodiment, similarity measures can be carried out in this reduced feature space.

Figure 22:
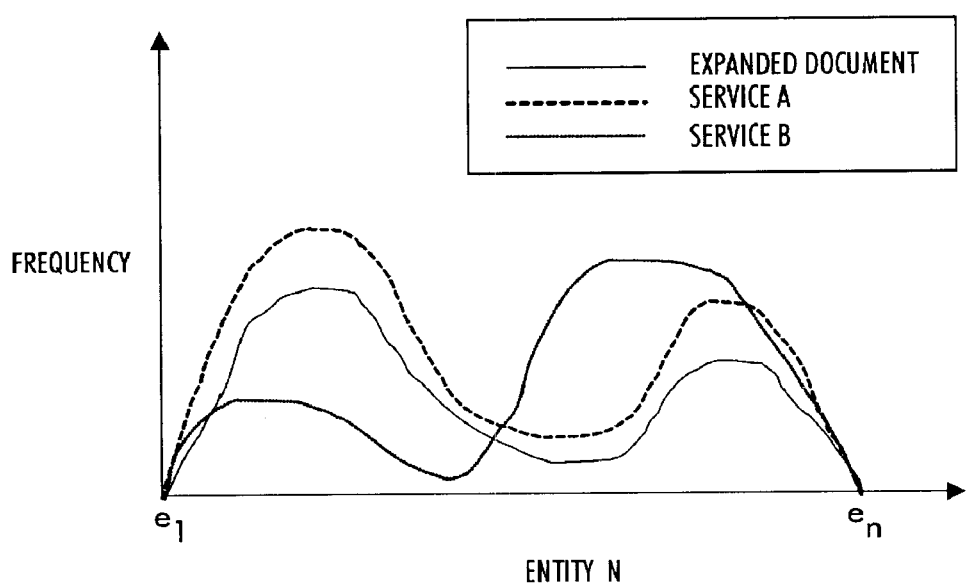
FIG. 22 illustrates a graphical representation of a selection process for selecting services with the highest similarity measure.

At 2154, the top N services (i.e., with the highest similarity measures) could then be selected as the services and incorporated into the new personality. FIG. 22 illustrates a graphical representation of this selection process with an expanded document and two services A and B. The horizontal axis of the graph sets forth each entity in the entity database (i.e., $e_1 \ldots e_n$), and the vertical axis sets forth the weighted frequency of occurrence of each entity. In the example shown, service A has a greater degree of similarity than service B to the expanded document.

Figure 23:
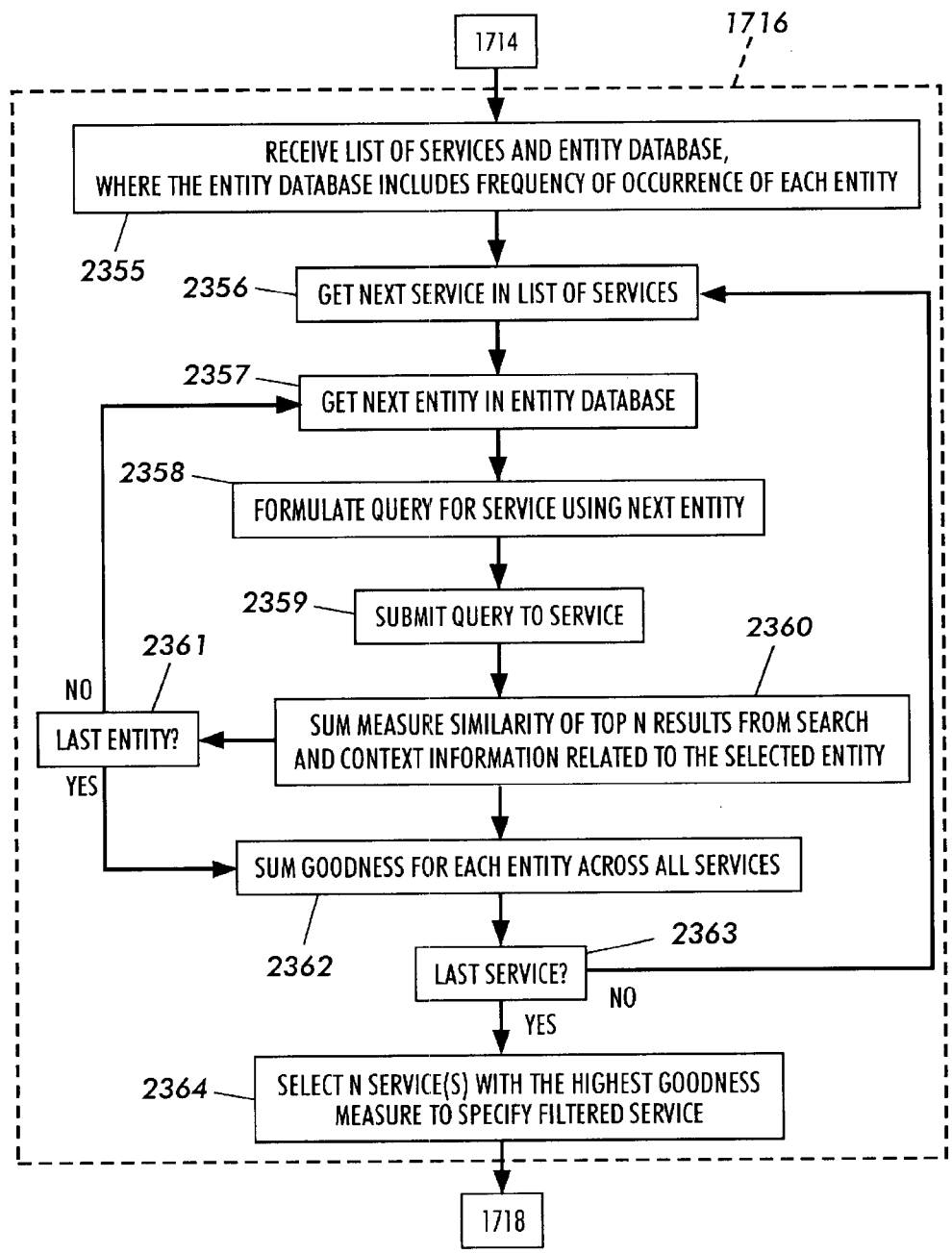
FIG. 23 is a flow diagram that depicts another method for filtering services at act 1716 in FIG. 17.

Another utility measure ranks the list of services after acquiring entity statistics using a utility measure as set forth in the flow diagram show in FIG. 23. FIG. 23 sets forth a method for filtering services at 1716. Initially at 2355, a list of services and entity database are received. At 2356 a next service in the list of services is selected, and at 2357 a next entity is picked from the database of entities. At 2358, a query is formulated for the selected service using the selected entity as set forth above. At 2359, the query is submitted to the service. Using the top N results of the service at 2359, a similarity measure between the entity and contextual information related to the selected entity and each of the top N results is computed at 2360, as follows:

where "entity" is one of the entities in the entity database; "service" is a service; and "doc" is one of the N top results.

More specifically, "entity" in the equation denotes both an entity string and a surrounding context. For simplicity it may be assumed that an entity only occurs in one location in the expanded document. The surrounding context for an entity can be determined in a number of ways using known parsing techniques that delimit sentences, paragraphs, etc. For example, techniques for determining the context surrounding an entity include: (a) letting the context be the textual content of the whole document, which forms part of an expanded document, be the context; (b) letting the context be the sentence in which the entity string occurs; (c) letting the context be the paragraph in which the entity string occurs; or (d) letting the context be the topic text in which then entity string occurs as detected by known topic detection techniques.

Also in the equation, "doc" refers to either the document summary that appears (as an element in a result list) in the results page of the service or alternatively to the entire document, from which the summary was derived. The similarity measure can be performed using either resulting form. In this equation a similarity measure is generated for each entity (represented as the entity plus a context) and result document "doc" (represented as a summary or the entire document content).

In order to compute such a similarity measure both the entity and the result document are first processed as follows: (a) stop words are eliminated; and (b) each word is stemmed using known stemming techniques such as Porter's stemmer. Subsequently, a similarity measure such as the Cosine measure could be used to calculate the degree of similarity between the entity and the result document based upon text features (for details of text features see U.S. patent application Ser. No. 09/928,619, entitled "Fuzzy Text Categorizer" which is incorporated herein by reference).

In an alternate embodiment, the text features are transformed using LSI into a reduced features space. This LSI transformation is calculated using entity and entity frequency database that is extracted as described above. Having transformed the features using LSI, a similarity measure such as a Cosine distance measure can be used to calculate the similarity between the entity (and its context) and the resulting document "doc".

In the instance in which an entity occurs in multiple contexts exist for an entity (i.e., the entity exists in multiple locations in a document or expanded document), each location of the entity and its associated context are treated separately (i.e., as different entities).

At 2361, if it is determined that the last entity in the entity database has been examined, then the measured similarities are summed for all the entities related to the selected service at 2362 as follows:

where E is an entity in the entity database, and service is a service. At 2363, if this is performed for all services, then the top N services are selected with the highest service utility measure to specify the filtered services; otherwise, the process continues at 2356 with the next service in the list.

Services can be organized in a number of ways such as flat or hierarchically. The services as represented in these ways could be clustered and a representative service could be selected from each cluster. In this embodiment, a multi-dimensional graph is defined with one dimension for each entity in the entity database. The frequency of each entity occurring in the expanded document and the services are plotted against each other. Clusters are formed and associated with a service. These clusters can then be used to hierarchically organize the services.

In an alternative embodiment, a generic service is applied to the expanded document subsequent to act 2363. The generic service uses the contents of the expanded document to query a general purpose information provider instead of an information provider that specializes in a specific subject. In yet another embodiment, a service utility is computed for an entity type instead of for all entity types as described above. In this alternative embodiment, the utility of services can be evaluated for particular types of entities. For example, a service utility is computed for the entity type biology 2002 for the service 2004 shown in FIG. 20.

D.4 Using Predefined Personalities And Knowledge Levels

In yet a further embodiment, a relative ability or existing knowledge level in a field may be specified as shown at 1516 in FIG. 15. The specified knowledge level 1516 can be used for example to create new personalities that access different levels of service providers from predefined personalities specified at 1504. For example, with a personality directed at medical information, if knowledge of someone is novice (i.e., a layman) then more basic information providers are specified and more basic definitional services are specified in the personality. In addition, the knowledge level can be used to either include or exclude entities from an entity database that is used to create a personality (as set forth above in section D.3). For example, a expert in the medical field may not be interested in the same entities that a novice in the medical field would be.

Besides providing a knowledge level of desired personality, a hint (i.e., subject hint) is given to the type of personality that is desired as shown at 1514 in FIG. 15. Upon receiving a hint, the meta-document server relates the hint of the desired personality to a set of actions that are specifically related to subject matter of the hint. Generally, the hint 1514 can be used to improve any of the methods for creating personalities that may be specified in FIG. 15. The hint 1514 and knowledge level may be used individually or in combination.

In one specific example, if a hint 1514 of a medical personality is specified to the meta-document server along with document content referenced by the hyperlinks at 1508 or name at 1510, then the meta-document server 200 creates a personality by identifying services that enrich the identified content relating to the following: (a) an access to a general pharmaceutical guide for drugs mentioned in the document content; (b) medical records related to the user and to the items mentioned in the document content; (c) images, video clips, etc., associated with items mentioned in the document content from a medical database; (d) links to a community of sufferers for any illnesses mentioned in the document content; (e) alternative products to those mentioned in the document content; (f) connections to online drug stores; (g) connections to current research in any of the areas mentioned in the document content; (h) information on any companies mentioned in the document content; and (g) any other medical information related to the items found in the document content.

In another specific example, given a hint 1514 that is a construction personality, the personality is created by the meta-document server 200 by identifying document content referenced by the hyperlinks at 1508 or name at 1510, and identifying services that enrich the identified content relating to the following: (a) building codes, zoning laws, property evaluations and other legal documents concerning the items (e.g. addresses) identified in the document content; (b) images (photos, diagrams, blueprints) of the items (e.g., buildings, materials) mentioned in the document content; (c) history (e.g., social, constructor, tenancies, etc.) relating to the document content; (d) similar buildings in the world, architects building such buildings; (e) neighboring buildings, tenants, etc.; (f) simulations of the areas/ buildings, mentioned under certain conditions (e.g., earthquake, fireproof); (g) maps of the areas mentioned in the document content; (h) sensor devices (e.g., web cams, thermometers, etc.) of the areas mentioned in the document content; and (i) costs, suppliers, retailers, delivery rates, technical specifications, tutorials, etc. for materials mentioned in the document content.

D.5 Using Information Extraction Techniques

The meta-document server as described above enriches (e.g., marks up) document content with results from different services. Typically these results are list of documents, lists of summaries, extracted information typically of a very simple structure nature. For example, results may include stock quotes and biographic entries. In this section a method is described that extracts information of a more sophisticated nature from unstructured text. This is achieved using information extraction techniques such as question answering.

In one information extraction technique, personalities can also be created and/or modified using predefined questions that can be used in conjunction with a lexicon or lexicons associated with a personality to create one or more question forms. Each question form is used to create a new document service request that is satisfied using a known question answering system that uses a combination of information retrieval and syntactic or pattern matching techniques.

In one embodiment, question forms are created automatically using an input question defined by a user at 1520 in FIG. 15. For example, if the question is "What is the procedure for ablation of the liver?" and the specified personality at 1504 includes a lexicon that is body organs, which includes the word "liver", then the meta-document server would identify the body organ found in the question 1504 (e.g., liver) and replace it with a generic symbol representative of the identified lexicon. In this specific example, the word "liver" would be replaced with the generic symbol <BODY_ORGAN> to produce the question form "What is the procedure for ablation of the <BODY_ORGAN>?" Alternate question forms can be defined using the same question for the example given above depending on how many alternate lexicons are defined in the specified personality. Thus, with the same question, but with a different lexicon, for example of surgical procedures, the question form can be defined: "What is the procedure for <SURGICAL_PROCEDURE> of the liver?"

Yet another question form can be produced using the same question if the personality included both lexicons for body organs and surgical procedures. This would produce the question form: What is the procedure for <SURGICAL_ PROCEDURE> of the <BODY_ORGAN>?" Once all possible question forms are generated, each question form is added to the personality as a new document service. Each document service added instantiates (i.e., creates a specific instance of) the question form with any entities found in the document content 102 or markup 108 that is also in the lexicons identified by the generic symbol in the question form. For example, assuming the document content included the entity "kidney", which was also part of the body organ lexicon. The instantiated question in this instance would be: "What is the procedure for ablation of the kidney?" In one embodiment, these resulting question forms are evaluated for their usefulness.

When a document is enriched with a personality that includes an instantiated query, the document service request that includes the instantiated query satisfies it with a question answering technique to produce an answer or result. The answer in the example above would be "a nephrectomy". An example of a question answering technique is described by Cooper et al. in "A Simple Question Answering System," published in proceedings of the Ninth Text REtrieval Conference (TREC-9) held in Gaithersburg, Md., Nov. 13–16, 2000, which is incorporated herein by reference.

Once the document service satisfies an instantiated query with an answer, the document service enriches the document by linking the entity in the document with the instantiated query and the answer. In the example given above, the entity "kidney" is linked to the instantiated query (i.e., What is the procedure for ablation of the kidney?) and the answer (i.e., a nephrectomy). In one embodiment, the instantiated query and the answer are displayed in a pop-up window 1028 as shown in FIG. 10 when a user locates a pointer 1030 in the vicinity of a recognized entity 1032 (e.g., recognized entity Xerox and the instantiated query of "What is <COMPANY NAME>'s stock price?").

In the event multiple generic symbols can be added to a question specified by a user, the user may be given the option that only a document service request be specified for only the most generic question form (e.g., What is the procedure for <SURGICAL_PROCEDURE> of the <BODY_ORGAN>?). Alternatively, the user may be given the option that document service requests be specified for all or selected ones of the identified question forms. In addition, the user may be given multiple answers and multiple information sources to select from.

Figure 24:
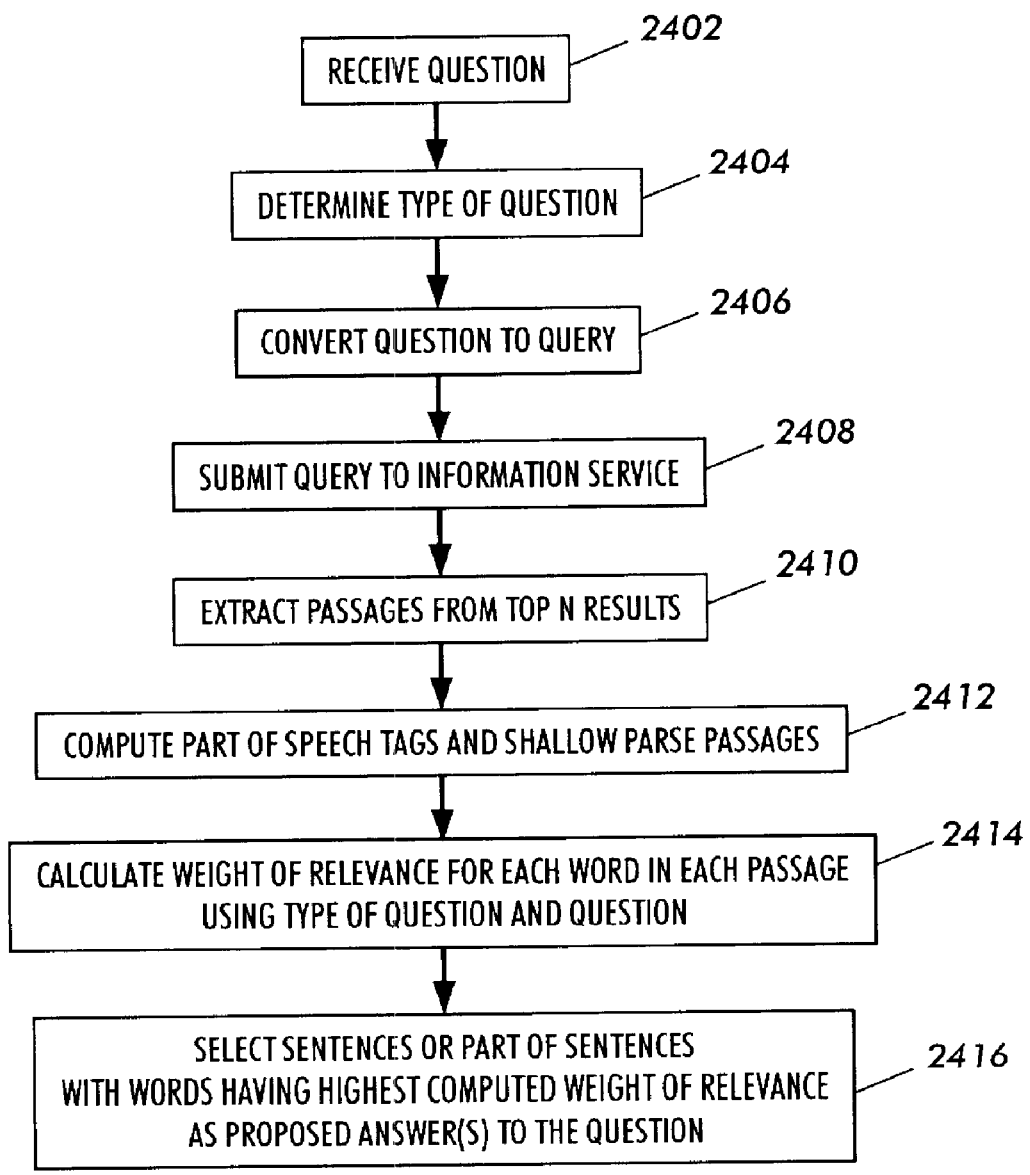
FIG. 24 is a flow diagram that depicts one embodiment for identifying an answer of an instantiated question.

FIG. 24 is a flow diagram that depicts one embodiment for identifying an answer of an instantiated question. Initially at 2402, the meta-document server 200 receives the instantiated question. The type of question is determined at 2404 and converted to a query at 2406. At 2408, the query is submitted to an information service adapted to handle questions of the type identified. At 2410, passages of the top N results of the query are extracted using for example a summarizer. At 2412, the passages of the extracted top N results of the query are assigned part of speech tags and shallow parsed. At 2414, weights of relevance are calculated for each word in the passages of the extracted top N results of the query using the substantiated question and the determined question type. At 2416, sentences or part of sentences of the extracted passages with words having highest computed weight of relevance are selected as proposed answers to the instantiated question.

D.6 Using Learning Personalities

The meta-document server 200 provides an e-learning personality that may for example be available in the personality window 1014 in FIG. 10. When an e-learning personality is applied to a document, each service in the personality analyzes the contents of the document, recognizing entities and concepts and combinations specific to that service. Each service then links these entities, concepts, or combinations to new content found by a possibly web-based database search, or prepares the search and inserts a link, that when activated, performs the search. Personality services are not limited to simple search, but can perform any actions depending on the content analyzed.

FIG. 25 illustrates a list of services 2502 available when an e-learning personality is selected to enrich document content. E-learning service 2504 and 2506 link words or multi-word expressions found in the document to their definitions and/or translations, respectively. This service may perform lemmatization or stemming before accessing a dictionary. In addition, this service may use the context of the words or multi-word expressions surrounding an element in the content to limit the number of definitions and/or translations displayed. Another e-learning service 2508 links each text unit (i.e., document, paragraph, phrase, word) to a tutorial concerning that element. Yet another e-learning service 2510 links each text unit to a tutorial concerning the text unit. Yet further e-learning services 2512, 2514, and 2516 link each text unit to interactive courses, available online courses, or online resources concerning the subject of the text units, respectively.

Advantageously, personalities prepare and perform a multiplicity of independent language learning tasks on a specified document(s). When the personality is applied to the document content, each selected service in the personality analyses the contents of the specified document(s), recognizing entities and concepts and combinations specific to that service. The service then links these entities, concepts, or combinations to new content found by a possibly web-based database search, or prepares the search and inserts a link, that when activated, performs the search.

Figure 26:
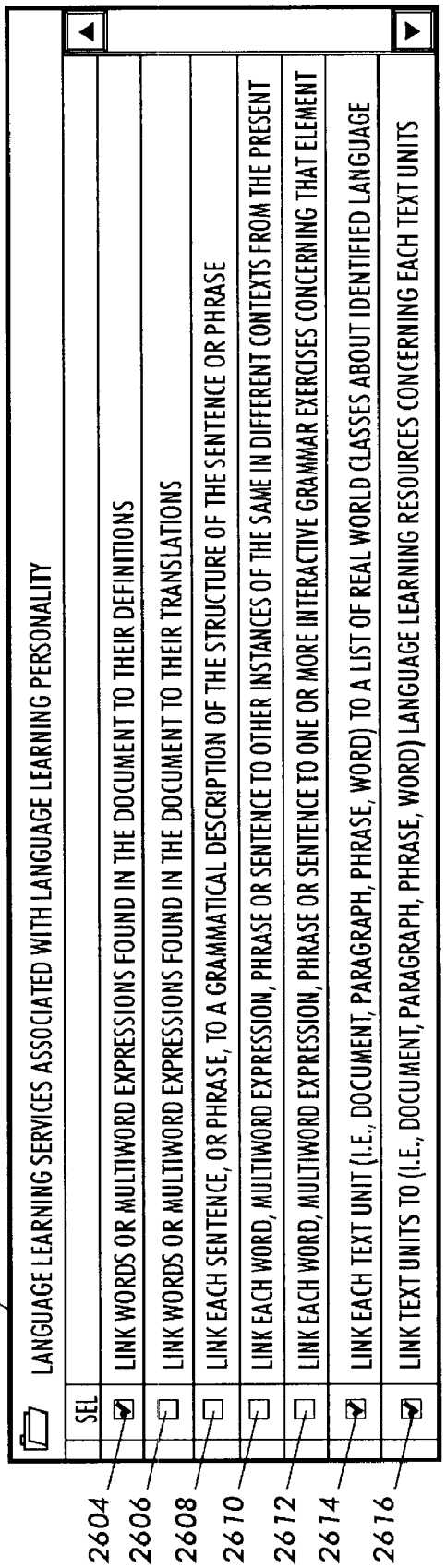
FIG. 26 illustrates an example list of services available when a language learning personality is selected to enrich document content.

In one variation, the e-learning personality may also include a service that tracks the user's past action (or access a user profile) to provide new information when the same entity is linked to other documents. In one specific embodiment the e-learning personality is specifically directed at learning languages. In this embodiment, the meta-document server 200 provides computer assisted language learning through using the herein-described document enrichment mechanisms. FIG. 26 illustrates an example list of services 2602 available when a language learning personality is selected to enrich document content.

More specifically, the language learning personality is defined using a personality that performs two or more of the services defined in FIG. 26, which include: (a) service 2604 and 2606 that link words or multiword expressions found in the document to their definitions and/or translations, respectively (possibly performing lemmatization or stemming before accessing the dictionary and possibly using the context of the element to limit the number of definitions displayed); (b) service 2608 that links each sentence, or phrase, to a grammatical description of the structure of the sentence or phrase (possibly linking to a textual explanation of the structure in the reader's native language, or to a textual, audio or video grammar lesson corresponding to that structure); (c) service 2610 linking each word, multiword expression, phrase or sentence to other instances of the same in different contexts from the present (e.g., by retrieving similar but differing text segments possessing the same word, multiword expression, phrase or sentence; the retrieved elements could be presented, for example, in a format that brings the similar structure to the center of the field of vision of the user for easy comparison of the differing context); (d) service 2612 that links each word, multiword expression, phrase or sentence to a one or more interactive grammar exercises concerning that element; and (e) services 2614 and 2616 that link to content specific language teaching resource that corresponds to the document content. A similar approach can be followed for other topics of learning.

E. User Controlled Enrichment

This section describes additional properties that can be specified for personalities and services. Deciding what to enrich and how to enrich content can vary depending on the personality and/or service specified. In one form, a personality annotates any phrase or word identified in its associated list of lexicons (e.g., sports figures), pattern matching using POS tagging, and/or regular expressions (e.g., proper names, noun phrases), or some linguistic processing variant of the two. In another form, a personality provides a global document service that annotates an entire document with for example citations and related documents. This section describes different techniques for providing users with more control over what and how personalities annotate content in a meta-document (e.g., footnotes).

E.1 Automatically Inserting and/or Linking Content

FIG. 12 illustrates at 1220 a mechanism for selectively specifying at a personality level whether to insert enrichment as links 1222, or content 1224, or automatically determine whether to link or insert content at 1226. In either case, links are drawn from entities recognized in document content 102 to either content or services located at a remote location (in the case of 1222) or content located in document markup 108 of a meta-document.

Figure 27:
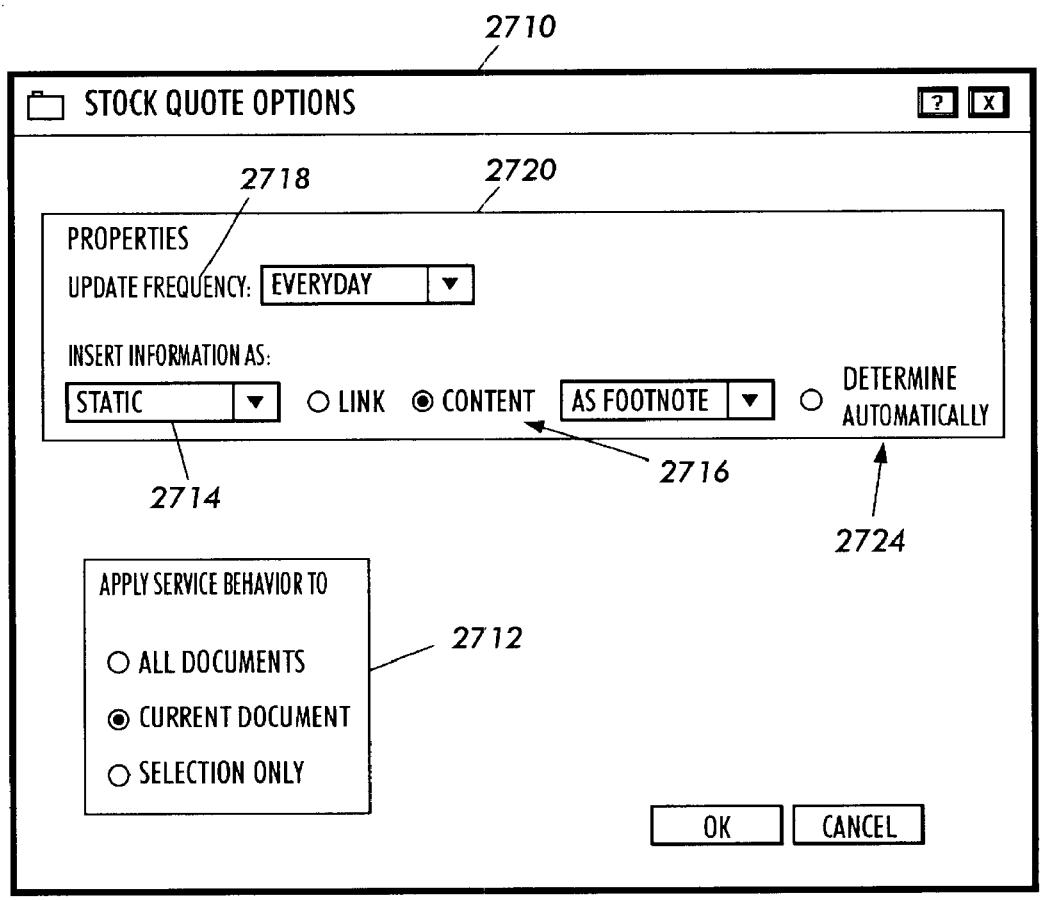
FIG. 27 illustrates a client interface for selectively specifying personality and/or service behaviors to entities recognized in specified content or documents.

In an alternate embodiment shown in FIG. 27, the user is given the ability to selectively specify personality and/or service behaviors to recognized entities in specified content or documents. In this embodiment, a user for example can select a portion of the enriched document 1018 shown in FIG. 10 and select for example the stock quote global service results 1026. This series of actions using known pointer selection techniques causes the display of stock quote options window 2710 shown in FIG. 27.

In the options window 2710, a user may specify that a particular service behavior be applied to all selected documents, a currently selected document, or a selection at 2712. In addition, the options window 2710 permits a user to statically or dynamically update linked information at 2714 that is inserted in a specified form at 2716. For example, information may be inserted as links or content as described above. Content that is inserted can be inserted as for example footnotes or as a list of content at the end of a document. Content that is accessed dynamically is recalculated each time a link or content is accessed (e.g., using Microsoft OLE-like techniques). Content that is accessed statically is done so at a frequency specified at 2718 (e.g., monthly, daily, hourly, etc.).

Advantageously, a user is given the ability to modify a default behavior of a service while specifying whether changes apply to all documents the user controls, the current document only, or the current selection of a document that contains one or more recognized entities. Depending on the level of change, they are either stored as properties of a particular meta-document or as part of a user's profile.

Whether to link or retrieve and insert content in a meta-document may be specified for each personality or it may be performed automatically if specified at 2724 in FIG. 27 or at 1226 in FIG. 12. Determining whether to link or insert content automatically is performed using information from a user's past history of interaction with the meta-document server 200. If specified to automatically link or insert content to a specific personality at 2724 or as a property of a personality at 1226, then the decision whether to insert information as links or content will depend on whether the information is inside or outside a user's interaction history. If outside a user's interaction history, then links are inserted; otherwise, if inside the user's interaction history, the content is retrieved and inserted into a meta-document.

A user's interaction history can be specified using a history of links accessed by the user and/or a list of interesting concepts to the user. A list of interesting concepts to the user can be determined using for example frequently followed links or from a user profile developed by recording email history or using a recommender system such as Knowledge Pump developed by Xerox Corporation. In this mode of operation, information from a user's interaction history from entity browsing patterns is used to determine whether to enrich document content.

Figure 28:
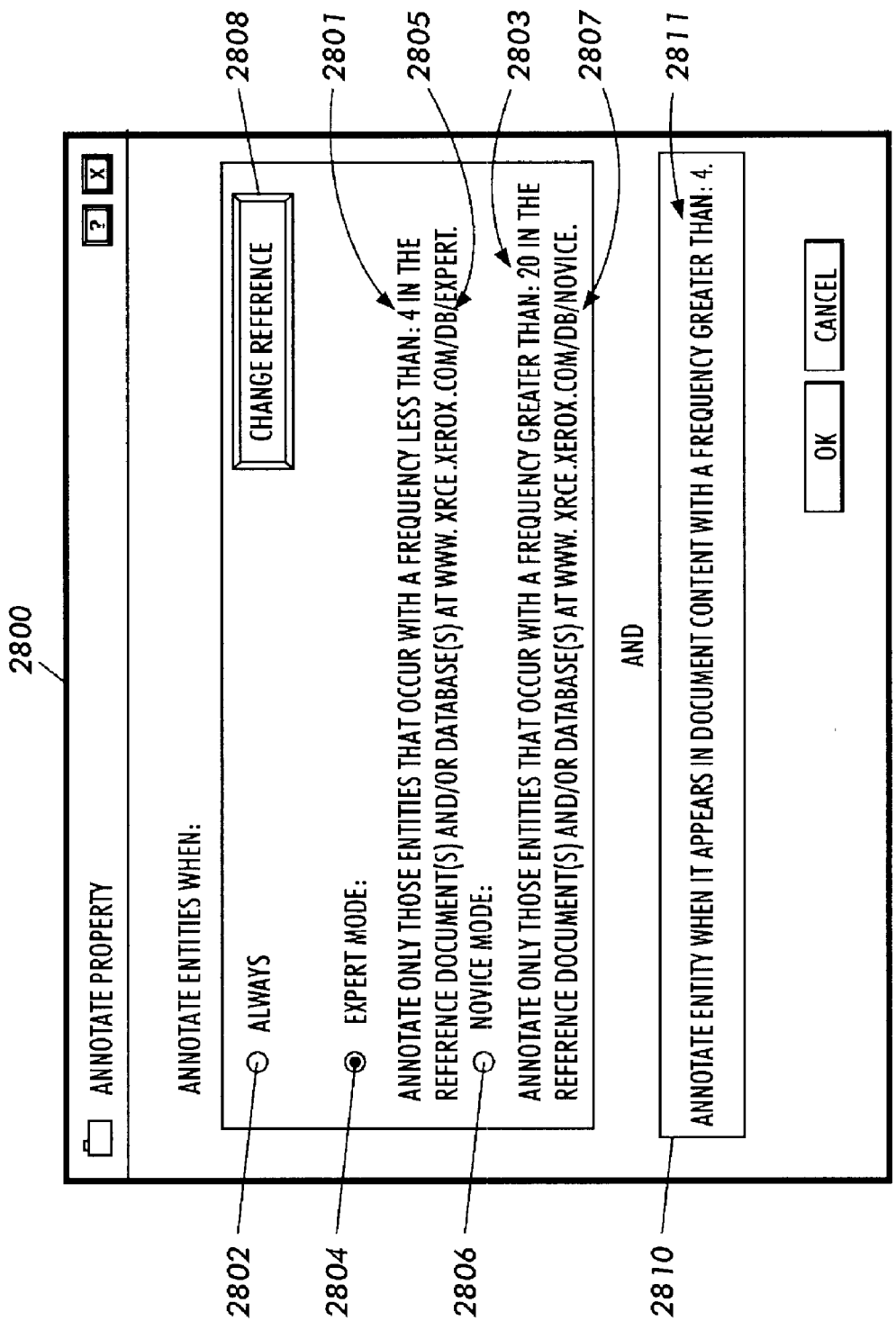
FIG. 28 illustrates a client interface for specifying different modes for determining when to annotate an identified entity.

In yet another embodiment, an annotation property can be set for a specific service as shown or more generally for a personality. In FIG. 14, each service has a defined entity type 1412 with an annotate property 1414. The annotate property operates in one embodiment as defined in window 2800 shown in FIG. 28 that is made available when selecting a specific annotate property for a service. In one mode of operation 2802, any identified entity is annotated according to an annotation that is predefined for a particular entity type.

In two other modes of operation 2804 and 2806, a filter function is applied to a list of words. The filter function determines whether to annotate an entity based on predefined filtering criteria such as the frequency the word is used in a reference document (e.g., a document identified to be linked to an entity) or the usage of the entity in the reference document as compared to the document content in which the entity was identified (e.g., using POS tagging).

In the "expert" mode of operation 2804, only those entities that occur in referenced document(s) or database(s) 2805 with a frequency below a predefined threshold are annotated. In the "novice" mode of operation 1206, only those entities that are identified in referenced document(s) or database(s) 2807 with a frequency above a predefined threshold are annotated. Alternatively or in conjunction with these modes of operation, an entity with few dictionary senses, or synonyms (e.g., as determined from an online thesaurus) might be discerned as a domain specific entity and therefore either annotated or not annotated. In one embodiment, categories in services are used to form a vocabulary to evaluate dictionary sense.

A variation of this embodiment allows a user to specify frequency of occurrence at 2801 and 2803 and the reference document(s) and/or database(s) 2805 and 2807 at 2810 (i.e., referenced corpus). For example, in one embodiment this variation would provide when in expert mode, if the frequency of an entity identified in a document is less than a first predefined threshold and the frequency of the entity in identified corpora is less than a second predefined threshold, then the entity in document content of a meta-document is enriched.

It will be appreciated that the subject of a referenced corpus may relate to a specific subject or a plurality of subjects. Also in this embodiment, the user is also given the ability to specify at 2810 in FIG. 28, whether to limit the annotation of words in the document content 102 and/or document markup 108 to only those words that appear once or more than once in the document. This provides that only terms appearing in the document content 102 more than a certain number of times will be annotated as specified at 2811.

In operation, when a particular document service request 106 is invoked by the meta-document server 200, entities are searched in reference document(s) and/or database(s) and/or document content 102 and/or document markup 108 for their frequency of occurrence. If outside the range of the predefined threshold values, then the entity identified in the document content is not annotated, thereby advantageously limiting document markup in a user specifiable and intelligible manner.

E.2 Propagating Enrichment Between Documents

Enrichment of a document or meta-document can also be controlled by automatically propagating markup there between as each document or meta-document is accessed by a user. This information can be used as a first pass to enrich documents in real-time while at the same time provide enrichment that may be contextually related to a user's current work in process. This enrichment can be distinguished from other document enrichment using formatting such as font color or the like. In addition, since this enrichment can be tagged for later identification, it can be easily removed from or reinserted into a particular meta-document similar to a track changes function in a text document.

In one embodiment, enrichment is propagated between meta-documents in the meta-document server 200 as shown in FIG. 2. The propagation of enrichment between documents is a user settable property that can be selected in personalities window 1210 at 1230 shown in FIG. 12. In operation, if enrichment is selected to be propagated between meta-documents, then entities identified by the meta-document server during enrichment are associated with their annotations and stored together in an entities propagation list. When a new meta-document is enriched by the meta-document server, it first searches through the document content looking for entities that are identified in the entities propagation list. If found, the similar entity is annotated as stored and defined in the entities propagation list. Subsequently, the document service continues with other enrichment functions associated with the service as described above.

In an alternate embodiment for automatically propagating enrichment between documents, functionality for propagating enrichment can be included in a plug-in to any browser and need not be integrally coupled to the meta-document server 200 as shown in FIG. 2. The plug-in in this instance would propagate markup (e.g., hyperlinks) seen on each document during a current session between fetched content (e.g., web pages and/or documents). The markup could be recorded from a predetermined number (i.e., one or more) of previously fetched (or browsed) documents or by session in a markup propagation list that associates strings in fetched content with their markup.

For example, a plug-in to browsers such as Netscape or Internet Explore can be added that marks up document content as a user browses from one document to the next. That is, every page that is viewed on the browser during a current session (e.g., starting from a first identified document) is analyzed and all strings that are marked up (e.g., everything between the HTML <a> and </a>) are stored by a plug-in with an expanded URL (e.g., base URL plus relative URL found in the 'href' field within the <a> tag).

Thus, when <a href=http://www.xerox.com>Xerox</a> is identified in the browser window, then the plug-in would store "Xerox" http://www.xerox.com in its list of seen markups (i.e., the markup propagation list). When the user moves onto a new page, any text segment found in the list of "seen markups" would inherit the annotations found there. For example, if a newly browsed web page contained the string "Xerox" then this string would then be identified by the plug-in in the markup propagation list and annotated with its associated link http://www.xerox.com in addition to any other links it might already possess.

Figure 29:
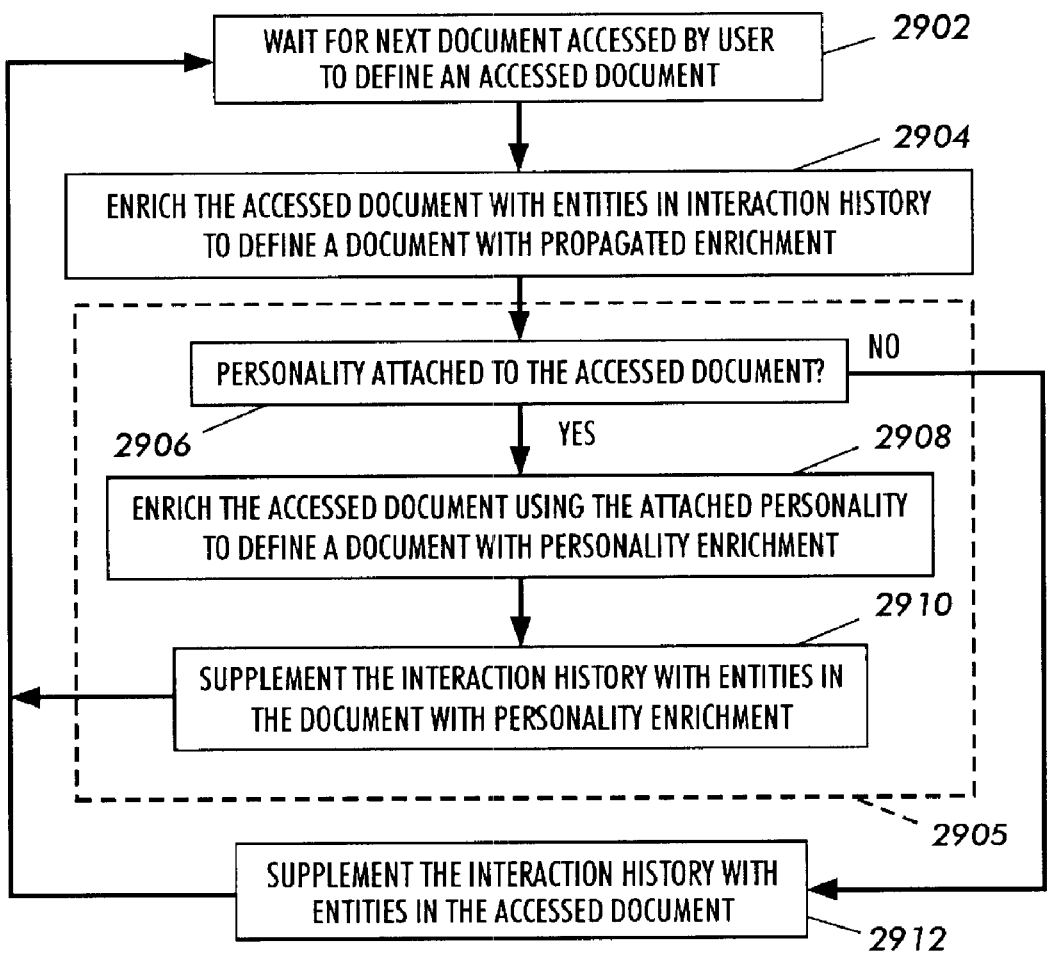
FIG. 29 is a flow diagram that sets forth the steps for propagating enrichment between electronic documents.

FIG. 29 presents a flow diagram that sets forth the steps for propagating enrichment between electronic documents of different embodiments. In the first embodiment, acts at 2902, 2904, and 2912 are performed. In a second embodiment, acts 2902, 2904, and 2905 are performed. In a third embodiment, a combination of the acts performed in the first and the second embodiments are performed.

A system for performing propagating enrichment in accordance with acts in FIG. 29 waits for a next document to be accessed by a user at 2902. Once accessed at 2902, the document is referred to as "the accessed document". The accessing of a document includes any task conceivably performed on a document by the user of a computer. For example, a user has accessed a document when it is displayed (i.e., viewed), printed, emailed, stored, edited, recommended, deleted, processed, had a personality attached to it, etc.

At 2904, the accessed document is enriched with entities in an interaction history. The creation of the interaction history is described below. The interaction history associates each entity therein with information that identifies a link identifying a location of a document for which the entry was created. This may take the form of a link to which it refers, or if no markup, then the document from which it originates. In addition, the interaction history, includes: the purpose for which the document was accessed (e.g., print, store, email, etc.), the time at which the document was accessed, the POS of the entity, the entity type (e.g., personality entity type), and the number of times and the last time the document was visited.

The act of enrichment performed at 2904, defines a document with propagated enrichment. Propagated enrichment can be represented in a form to be distinguished from other content in the document, such as using a different font color, format, highlighting, redlining or the like. In one embodiment, all information concerning any entity in the interaction history that is identified in the accessed document is enriched with the contents of the interaction history. This list can be displayed in chronological order or in a ranked order according to relevancy (e.g., determined using a Cosine similarity calculation using entity and surrounding context). Alternatively, that which is displayed to the user is filtered to identify those most relevant if more than one entry in the interaction history is provided for any one entity. Relevant results can be determined by measuring utility of an entry as described in section D.3.2 above for entities. Others entries can be accessed by the user by requesting additional enrichment results. In another embodiment, a similar result is achieved by displaying only those results that are filtered.

The enrichment information can be filtered using any number of known techniques. For example in one embodiment, enrichment information is filtered with respect to a domain specific corpus using Zipf's Law. Zipf's law, which is known in the art, concerns the distribution of different words in a text object and states that the product of a feature's frequency (where Zipf's law is generalized from words to text features other than and including words) in a text object, f, and its rank, r, is a constant, c(i.e., f*r=c). Bearing in mind this law, words having a low frequency will not be that interesting to the reader. In addition, words that have a high frequency will not be of interest either. Consequently, enrichment information is reduced by eliminating information that occurs frequently or very rarely.

The organization for a user of enrichment information when more than one entry exists in the interaction history for the same entity can be performed using one or a combination of more than one of the following ranking heuristics (i.e., ranking techniques): (a) order information by the most recent time that the document containing the entity was last accessed; (b) order information based on the size of the document to which the markup refers; (c) order information based on whether the document to which the entity refers is an authority or a reference (i.e., hub) as described by Kleinber in "Authoritative Sources In A Hyperlinked Environment," IBM Technical Report RJ 10076, May 1997; (d) order information using a similarity metric to identify the document to which the markup refers and the accessed document; and (e) a ranked list based on actions to the document to which the markup refers. In one embodiment, an equal weight is assigned to each action. Alternatively, higher weights are assigned to certain actions that are deemed important (e.g., printing or recommending). In addition, the ranked information can be displayed in the context of original content. For example, the ranked information can include the closest one hundred words surrounding the ranked information.

If the system performing propagating enrichment is communicatively coupled to an enrichment system such as the meta-document server 200, acts 2905 are performed. At 2906, a determination is made as to whether a personality is attached to the document to which enrichment is being propagated. If a personality is attached then acts 2908 and 2910 are performed; otherwise, act 2912 is performed.

At 2908, the document accessed at 2902 is enriched using the attached personality to define a document with personality enrichment. The personality can be specified to be active for only a specified period of time, after which services of the personality that are persistent cease to operate. A document with personality enrichment is not displayed to the user in this instance; its creation is for the purpose of identifying additional markup to propagate to subsequent markup of documents. Entities from the document with personality enrichment are then used to supplement the interaction history at 2910. If no personality is identified, then entities from the document accessed at 2902 are used to supplement the interaction history at 2910. Upon completing either acts 2910 or 2912, act 2902 is repeated. Documents used to markup the document as determined by the meta-document server can also be examined for markup to update the interaction history. Markup coming from the meta-document server may receive a low weight that is used during ranking.

Figure 30:
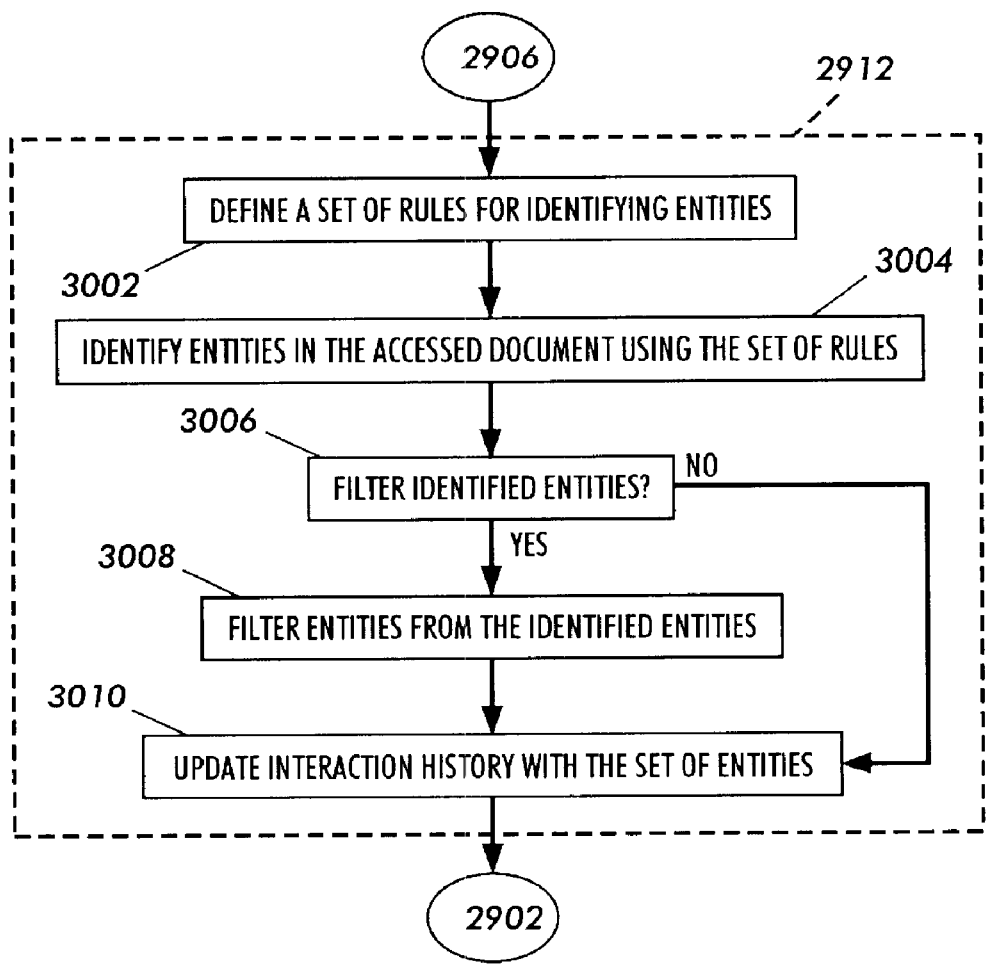
FIG. 30 is a flow diagram for creating and updating an interaction history that are performed at act 2912 in FIG. 29.

FIG. 30 sets forth a flow diagram with acts for creating and updating an interaction history that are performed at 2912. It will be appreciated by those skilled in the art that the acts performed at 2912 are similar if not identical to those performed at 2910 except that the document with personality enrichment is used to supplement the interaction history and not the accessed document.

Initially at 3002, a set of rules for identifying entities in the accessed document is defined. The set of rules in one embodiment identify all of the entities in the accessed document that have links or hyperlinks associated therewith. In another embodiment, the set of rules is used to identify entities with specific part of speech tags such as a noun phrase. In yet another embodiment, the set of rules is defined using a personality of the meta-document server 200. In yet a further embodiment, the set of rules used to identify entities that occur within the accessed document with a predefined frequency.

Using the set of rules defined at 3002, entities in the accessed document that satisfy the set of rules are identified at 3004. At 3006, a determination is made whether to filter the entities identified at 3004. If a determination is made to filter the entities identified at 3004, then those entities are filtered at 3008. Filtering at 3008 involves identifying the overall frequency of entities in the accessed document. Those entities with the lowest frequency pass through the filter. Such a filter assumes that words that occur less frequently are harder to identify (and are therefore more important) than those that do occur more frequently. Finally at 3010, either those entities that exist after acts 3006 (if no filtering is performed) or 3008 (if filtering is performed) are used to update the interaction history for subsequent use at 2904 (shown in FIG. 29) to enrich documents accessed by the user at 2902.

The determination to filter entities at 3006 can be made for example using a maximum threshold number to limit redundant, superfluous, or surplus information. In one embodiment, when an entity has been marked up previously in a document which a user has recently accessed using for example a predefined window of time or usage, or a combination thereof, then the entity should be marked up regardless of any filter.

Exceptions to filters at 3004 prevent removal of information specified by the system and/or user to be the most significant to propagate between documents. While the filtering performed at 3008 is to avoid excessive markup from being propagated between documents, checks should be put in place to ensure that certain of the markup which is deemed most important is almost always propagated.

Figure 31:
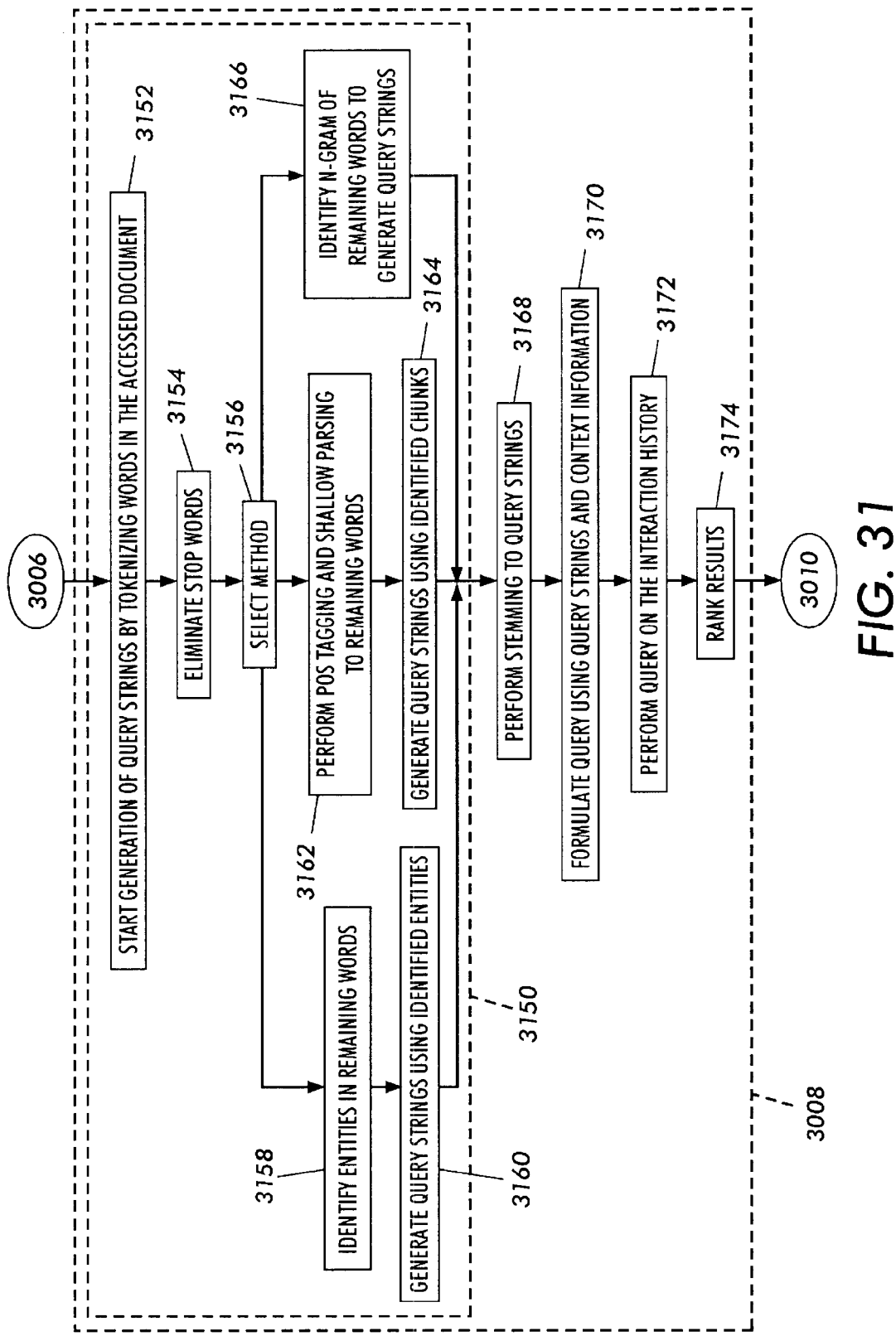
FIG. 31 is a flow diagram for identifying what entities to markup at act 3008 in FIG. 30.

FIG. 31 presents a flow diagram for identifying what entities to markup at 3008. At 3150 actions are performed to generate a set of query strings. Initially at 3152, words in the accessed document are tokenized. At 3154, stop words are eliminated from the tokenized words at 3152. At 3156, one of three methods is selected before continuing using the words remaining ("the remaining words") after eliminating stop words at 3154. In a first method at 3158 and 3160, entities are identified in the remaining words and query strings are generated using the identified entities. In a second method at 3162 and 3164, part of speech tagging and shallow parsing is performed on the remaining words to identify chunks and query strings are generated using the identified chunks. In a third method at 3166, n-gram or n-word (e.g., when the number of words is greater than or equal to one) query strings are generated using the remaining words.

Once the query strings are generated at 3150, they are optionally stemmed at 3168. At 3170, a query is formulated using the query strings (as stemmed at 3168) and context information (e.g., from POS and/or DMOZ categorization information). The resulting query may, for example, be of the form of an SQL type query. At 3172, the query is performed on the interaction history. Finally at 3174, the results are ranked using the ranking techniques set forth herein. A fixed number or a percentage of the highest ranked entities identified are used to markup the identified entity at 3010. Should the query yield no relevant results then the entity is left unchanged.

Figure 32:
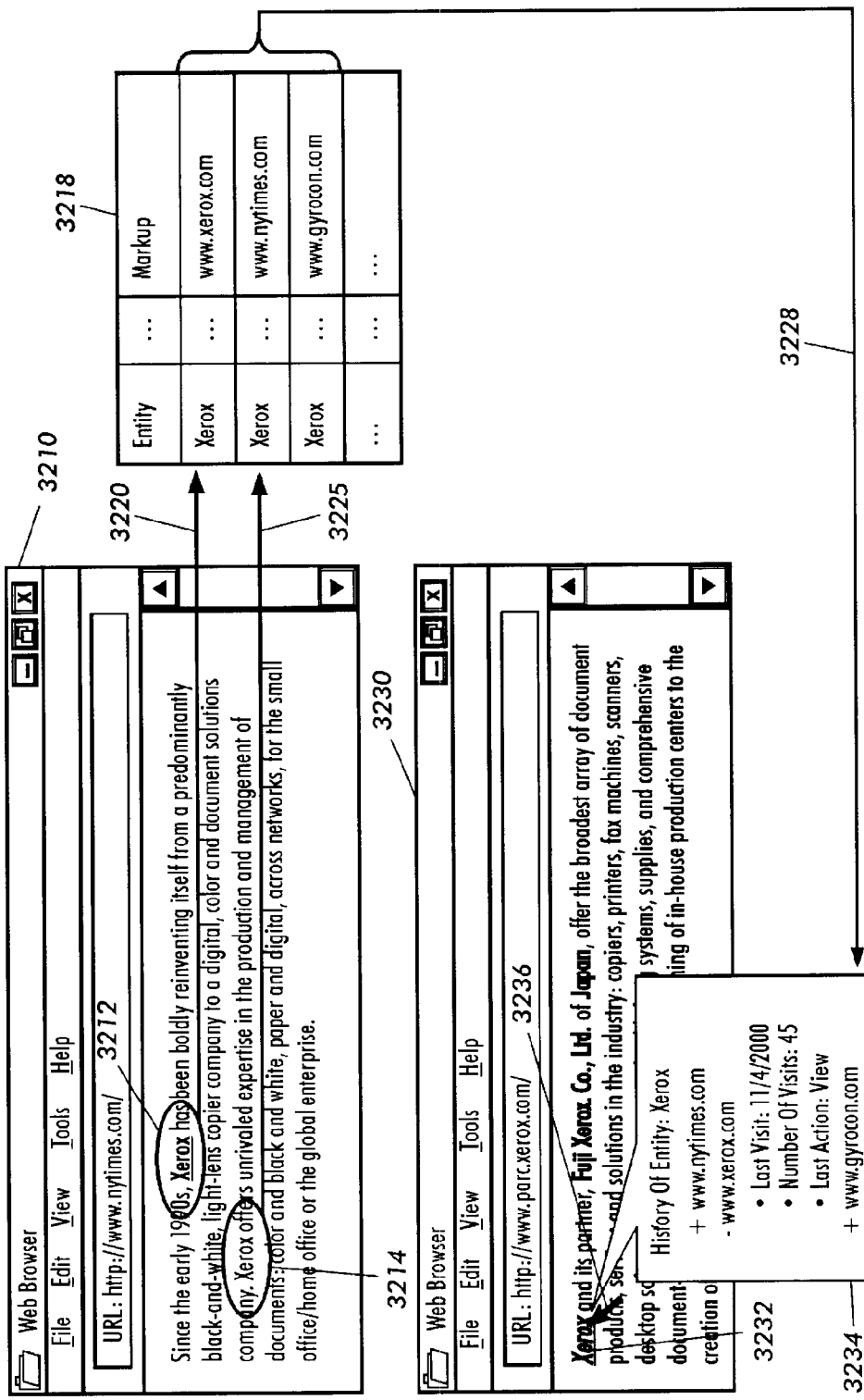
FIG. 32 illustrates the propagation of enrichment between accessed documents.

FIG. 32 illustrates an example in which enrichment is propagated between accessed documents. In the example, browser window 3210 illustrates two entities 3212 and 3214 that have been identified to update interaction history 3218 at 3220 and at 3225 (e.g., act 2912). In this example shown in FIG. 32, entity 3212 is recorded in the interaction history 3218 at 3220 to refer to the markup associated with it (i.e., hyperlink www.xerox.com) and not the document from which it originates (i.e., hyperlink www.nytimes.com), unlike the entity 3214 which is not associated with markup and is therefore linked in the interaction history 3218 at 3220 to the document to which it originates (i.e., hyperlink www.nytimes.com).

The interaction history 3218 which is shown in detail in FIG. 33 records entries in a database that include: an entity column containing the particular entity being referenced; a location column that identifies the location of the entity in the identified document; a POS column for storing part of speech information to help determine what context the markup was applied in the accessed document and what context the entity should be applied when propagating it to newly accessed documents; a text category column that contains for example a DMOZ category categorizing the markup; and an entity type column for use in providing additional context information and for its use in propagating it to newly accessed documents.

In addition the interaction history 3218 includes: a markup column that contains the location of the document that entity refers to (e.g., entity Xerox 3212) or if no markup to the document itself (e.g., entity Xerox 3214); a visits column that identifies how many times the user has accessed the document; a last visit column that identifies the date (and time) the document was last visited; and an action list that identifies an ordered list of actions that have been performed on the document referenced by the link as well as the number of times each action was performed (these statistics may be used for ranking purposes when marking these entities up).

Referring again to FIG. 32 that also shows an entity 3232 (e.g., Xerox) to which enrichment markup 3234 from the interaction history 3218 at 3228 has been propagated to a document accessed using a browser window 3230. The enrichment markup 3234 is displayed, for example, after selecting the entity 3232 by any conventional means such as pointer 3236. Each entry in the propagation markup 3234 can be expanded to show detailed information concerning the entity (e.g., www.xerox.com). Additional entities that are not shown in the propagation markup 3234 can be shown in an expanded selection (not shown) by selecting, for example, button 3238.

In an alternate embodiment, the interaction history can be used to create a personality as defined above in section D.3. Alternatively, propagating enrichment between documents can be performed by a service of the meta-document server.

In yet another embodiment, documents accessed can be used to create an information space as set forth in section G.2 below. The information space can then be used to create the interaction history.

E.3 Automatically Completing Citations

Meta-document enrichment can also be controlled by automatically completing citations set forth in document content 102. In one embodiment, personalities are defined with a property that allows for citations to be automatically included as shown in FIG. 12 at 1240. If a personality is specified to have citations automatically completed (i.e., citation mode) then a document service request 106 is added as part of the personality that references an automatic citation document service in services database 210.

As a result entering citation mode at 1240, the meta-document server will automatically generates a set of citation parentheses ([ ]) and move a cursor to the middle of the generated parentheses when a user edits meta-document content and types a left square bracket "[" (followed by a capital letter, and followed optionally by a string of letters). In another embodiment, the user could enter citation mode through a menu system of a meta-document editor (not shown).

In one embodiment, the automatic citation document service assists with the generation of citations and bibliographic entries (i.e., references) and/or cross-references. Content that is referenced or cross-referenced in document content 102 may be included as part of the document markup 108 or linked through document markup 108. This embodiment may operate in either edit mode or non-edit mode as described below to develop entries in a bibliographic database used for automatically generating citations.

In edit mode and once the system is in citation mode, the user can type the initial letter of the author's name, whom the user wishes to cite, or press a designated key/button, such as the tab key, to indicate to the system to auto-complete the citation from a bibliographic database that meta-document server constructs as a user inputs and/or edits a meta-document. Auto-completion may involve the user selecting from a collection of possible citations or verifying that the proposed citation is actually the citation required by the user. In addition, the auto-completer inserts a bibliographic entry as part of the document markup of a meta-document. The location and style of the entry in the document content is determined from the personality of the document. For example, if the personality is scientific, then the entry will be placed at the end of the document in a standard scientific citation style.

In non-edit mode, entries for citations in the bibliographic database are identified by: (a) scanning meta-document content and markup of a user for bibliographic entries using known techniques such as Hidden Markov Models; and (b) scanning document categorized by the text categorizer described in section F.1 that is categorized as citable material. Citable material can include any document that contains a title, a list of authors, a date and/or place of publication. The documents cited in the bibliographic database are searched for on the Internet or other fee-for-service content providers. Once content of a citation is located, it is referenced in the bibliographic database using a link or by inserting the content directly into the database.

Subsequently, after retrieving document content used to build the entries in the bibliographic database in non-edit mode, entries in the database for this content are identified and the content fetched as set forth above, leading to a new collection of bibliographic entries that are added to the bibliographic database used for auto-filling of citations. This process can be repeated to a pre-specified depth, which depth may be defined as part of a personality as shown at 1242 in FIG. 12.

E.4 Combining And/Or Intersecting Entities

As set forth above, the meta-document server 200 recognizes entities in document content 102 as contiguous strings and annotates them either by linking to content that has or has not been retrieved. This feature of the meta-document server 200 enables annotation of combinations of entities within a meta-document.

In one embodiment shown in FIG. 14, the watch business personality includes two services that combine or intersect a set of entities (i.e., an entity type) at 1420 and 1422, respectively. The service at 1420 uses entities of the entity type products 1424 to identify pairs of entities from an identified entity type. The service at 1422 uses entities of the entity type "companies" 1426 to identify pairs of entities and make available 3$^{rd}$ party entities at for example 1060 in FIG. 10.

Figure 34:
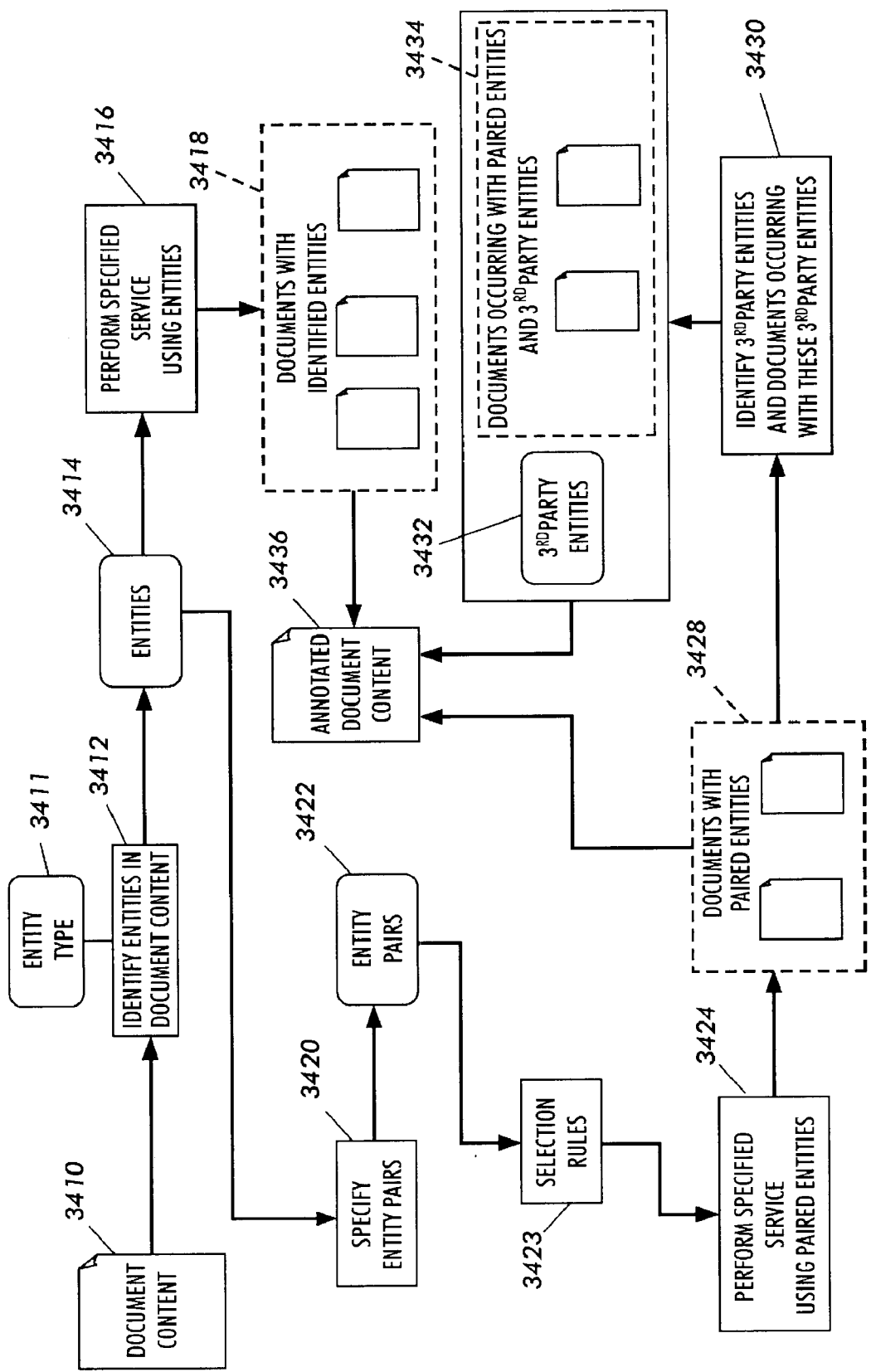
FIG. 34 illustrates the manner in which to apply pairs of entities and in addition identify third party entities.

FIG. 34 illustrates the manner in which the two services 1420 and 1422 are performed. Initially, document content 3410 is processed at 3412 using identified entity type 3411 to recognize corresponding entities using known techniques (e.g., using a list, regular expressions, etc.). Without specifying entity pairs at 3420, entities 3414 identified in the document content 3410 of type 3411 are processed by a specified document service at 3416 that, for example, locates documents 3418 with the identified entities 3414. The document service results at 3418 are then used to annotate the entities 3414 in document content 3410 at 3436.

Unlike typical services 3416, the service at 1420 (shown in FIG. 14) specifies entity pairs 3422 using identified entities 3414 at 3420. Specifically, at 3420 an entity pair $(I,J)$ is created for each entity $(I)$ identified at 3414, which is not equal to any other identified entity $(J)$ at 3414. Subsequently, a specified service, for example, locating documents 3428 is performed using the entity pairs 3422. In alternate embodiments, the entities 3414 are specified in other arrangements than pairs 3422 at 3420.

For example, for any service applicable to the entities 3414 that permits a conjunction of terms (e.g., the information retrieval system Altavista.com allows the prefix "+" to search terms that will be found having at least those terms), a retrieval request is then created that involves all the entity pairs found at 3422. If the entities identified were the proper names "Jack" and "Jill" at 3414 and these formed an entity pair at 3422, a service operating with the entity pair at 3424 may then identify at 3428 documents that refer to the entity pair in some form. The result of the request 3428 is then used to annotate document content 3410 at 3436. In one embodiment, after highlighting an entity from an entity pair in the annotated document content, a pop-up window appears with the entity pair identified with links to the documents 3428 identified as having the entity pair.

Because computational sources may be limited, the number of pairs at 3422 may need to be reduced. Selection rules 3423 reduce an identified set at 3423 by selecting a combination of entities based on frequency of occurrence: (a) in a corpus of documents (e.g., World Wide Web); and/or (b) in documents accessed (e.g., opened, printed, emailed, etc.).

Figure 35:
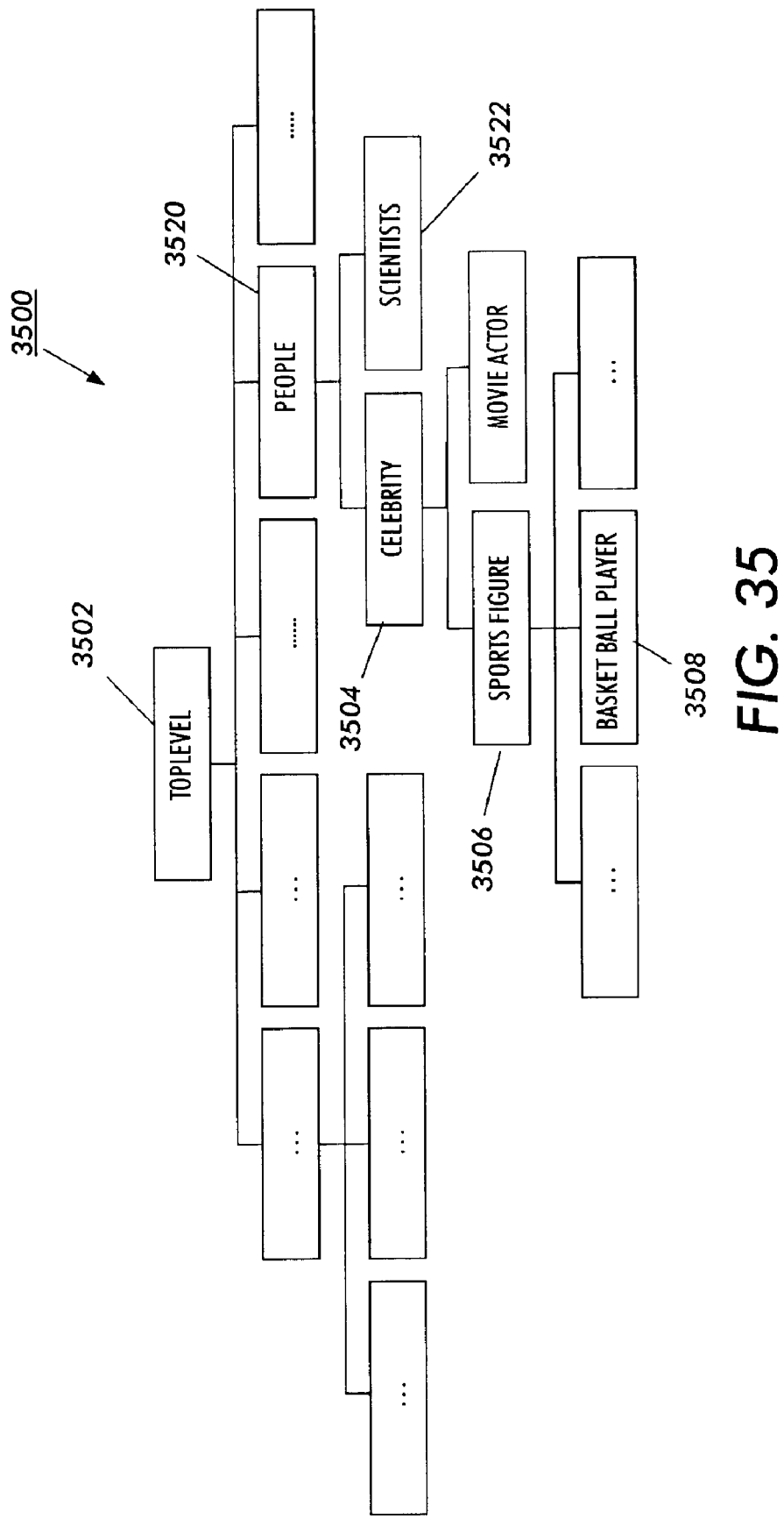
FIG. 35 illustrates entity types organized hierarchically.

A variant of the service 3420 is to specify that entities of the same type are considered if they are predefined in a hierarchical structure, as shown in FIG. 35. For example, if the entity type specified with the document service is "people" at 3520 then entity pairs would only be found for each subclass node such as "scientists" at 3522. Another variant of the service 3420 is to pair only those entities in a specified entity type with entities that appear with those entities that also appear within a selection of text (e.g., 500 characters, 10 words, same sentence or paragraph, etc.). Yet another variant of the service 3420 is to pair only those entities that share a syntactic relation (e.g., subject-object).

Referring now to the service 1422 (shown in FIG. 14) for which a service 3424 has been performed with pairs of entities 3422 that may identify documents 3428 with paired entities. These documents are then analyzed at 3430 to identify (i.e., intersect) documents that occur with third party entities (i.e., entities not identified at 3414). For example, if "Jack" and "Jill" are the entity pair, then those documents 3428 identified with "Jack" and "Jill" involving a third party entity (e.g., John, Bob, Simon, etc.) are identified at 3430. These identified third party entities 3432 (which can be viewed by selecting button 1060 shown in FIG. 10) and their associated documents 3434 resulting from service 1422 are use to annotate document content 3410 at 3436.

E.5 Using Entity Types Defined In A Hierarchy

To permit annotation to be applied at different granularities of content, the meta-document enrichment server 200 may organize entity types in a hierarchy 3500 as shown in FIG. 35. This permits the specification of document service requests 106 to take place at different levels of the entity type hierarchy 3500. To formulate the hierarchy 3500, entity types are classed in an ontology. The ontology can be formulated using for example the DMOZ ontology (published on the Internet at dmoz.org). The ontology may be global (i.e., available to any user of the system) or local (i.e., available only to a select set of users of the system).

In one mode of operation, a document service request is applied to selected document content. Associated with that service is an entity type. When an entity in the entity type is recognized in the selected document content, that service activates all services related thereto in the hierarchy 3500 from the node at which it is classified up to the root 3502. That is, all parent nodes of the entity type with the recognized entity are identified, and services associated with each node are applied to the selected document content.

In this mode of operation, each entity type in the hierarchy has associated therewith a service. For example, if "Michael Jordan" were identified by a "Player Statistics" document service request that referenced the entity type at the level 3508 of the hierarchy 3500, then different services would be invoked for each of the entity types at levels 3506 (e.g., a Team Statistics document service request), 3504 (e.g., a Web Page document service request), and 3520 (e.g., a Vital Statistics document service request).

In another mode of operation, a user is given the ability to modify each service to set a depth 1430 to which a service identifying an entity type 1412 in the hierarchy 3500 should rise as shown in FIG. 14. By right clicking on a depth 1430, a menu 1432 allows the viewing and editing of the hierarchy 3500 shown in FIG. 35. In addition, the menu 1432 allows a user to set the depth 1430 to which different services in the hierarchy should be invoked.

In an alternate embodiment, the hierarchy 3500 shown in FIG. 35 defines all the services that are associated with a node at which an entity type is found in the hierarchy along with the respective depths at which each associated service is found. In this alternate embodiment, a user is given the ability to modify the service applied to each entity type in the hierarchy as well as what entities define each entity type. In yet another embodiment, the ontology is organized using a lattice instead of a hierarchy.

F. Services and Utilities Using Text Categorization

Figure 36:
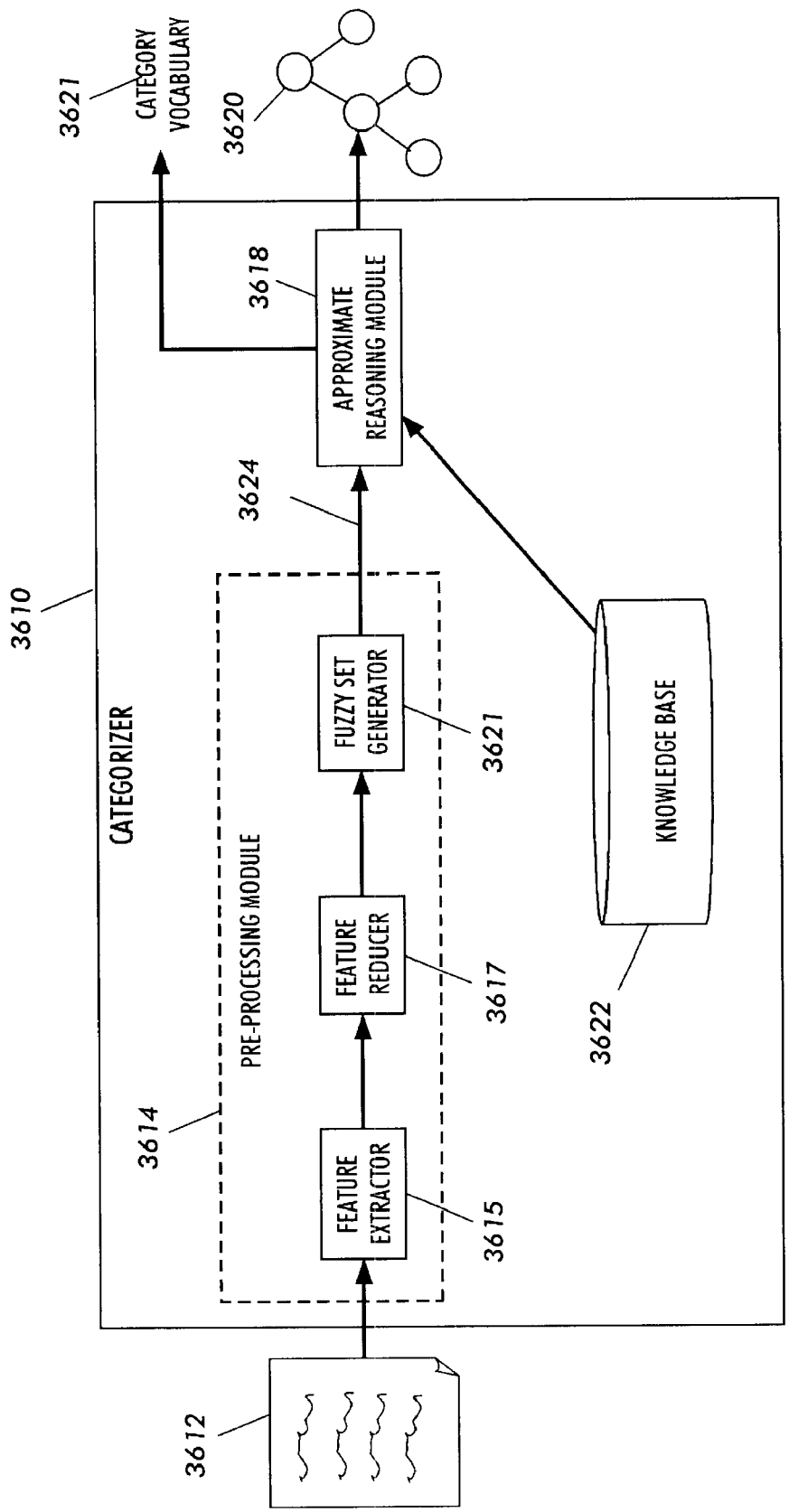
FIG. 36 illustrates a text categorizer.

Services in the services database 210 and utilities such as personality recommender 216 may perform a variety of functions relating to the enrichment of document content that utilize a text categorizer 3610 shown in FIG. 36 that forms a utility integrated with or accessed by the meta-document server 200.

F1. Text Categorizer

The goal of a text classification system, such as text categorizer 3610, is to classify a document 3612 into a set of one or more classes 3620, which are also referred to as categories. In operation, the text categorizer 3610 assigns a document one or more classes in a set of classes that are defined in an ontology represented in knowledge base 3622. An example of an ontology is the DMOZ ontology (published on the Internet at dmoz.org).

In addition, the text categorizer 3610 includes a pre-processing module 3614 and an approximate reasoning module 3618. The purpose of the text pre-processing module 3614 is to transform the document 3612 into a representation that facilitates the text categorizer 3610 to perform the task of document classification in an accurate, automatic, efficient and effective manner. Document representations 3624 produced by the pre-processing module 3614 include a set of features and associated weights.

Different combinations of known techniques from natural language processing such as translation of HTML to text, tokenization, stemming, stop word removal, parsing techniques, and entity recognition can be used to generate the sets of features 3624. Accordingly, the text pre-processing module 3614 may include a number of components such as an HTML to text converter, a tokeniser, a stemmer, a grammar-based feature generator, a feature generator, a word frequency analyzer, and a noun phrase analyzer (or extractor) to produce a set of features 3616 from the document 3612. A commercial application that may include some or all of these functions is Thingfinder™ offered by Inxight Software, Inc.

The weight value associated with each feature is calculated using any of a number of well known techniques, varying from a normalized frequency count to a more sophisticated weighting scheme which is calculated based upon an aggregation of a number of measures such as the frequency of each term in the document, its location in a document, the frequency of each term in a reference corpus, and the inverse document frequency of the term. The textbook by Manning and Schutze, "Foundations Of Statistical Natural Language Processing", published in 1999, MIT Press, Cambridge, Mass., provides a more detailed presentation of text pre-processing performed by module 3614, the contents of which are incorporated herein by reference.

The approximate reasoning module 3618 processes the categories as represented in terms of rules (or other knowledge forms) stored in the knowledge base 3622, in conjunction with the document representations (e.g., features and associated weights) 3624, to assign a class label 3620 to the input document 3612. In one embodiment, the pre-processing module transforms a document 3612 into lists of tokens that are delimited by spaces, punctuation characters, or the like. Tokens that correspond to stop words (i.e., words that do not improve the quality of the categorization) are subsequently eliminated from this list of tokens. The remaining tokens in the list are then stemmed using Porters stemming algorithm. Then, stop words are removed from the stemmed word list, resulting in a list of terms/words. Finally, this list of terms is transformed to a frequency distribution consisting of <term, frequency> tuples where frequency denotes the number of occurrences of that term in the document to define the set of terms (i.e., document representations 3624).

Subsequently, the approximate reasoning module 3618 accesses a knowledge base 3622 that records variables (i.e., document features and associated frequencies) that are used to define a function that models the mapping from the document 3612, or its transformed representation 3624, to a class in an ontology. One specific embodiment of such a knowledge base is represented using a set of rules that describe relationships between the recorded variables. Typically each class is represented by one rule. In mapping the function, the inference engine 3618 matches the document with each class rule stored in knowledge base 3622 and uses a decision maker for drawing conclusions as to which action to rely on.

The function as represented by the knowledge base 3622 and approximate reasoning module 3618 can be defined using a variety of model types including the following: probabilistic models; fuzzy set/logic models; Booleanvalued logic models; nearest neighbor approaches; and neural networks; some of which are described in more detail below. For background relating to some of these algorithms see the following publications by: Shanahan, "Soft Computing For Knowledge Discovery: Introducing Cartesian Granule Features", Kluwer Academic Publishers, Boston (2000); and Mitchell "Machine Learning", Mc Graw-Hill, New York (1997).

In addition to the elements shown in FIG. 36, the categorizer 3610 can include a learning module. The exact make up of the learning module will depend on the model (e.g., probabilistic, fuzzy, etc.) used by the approximate reasoning module 3618 to map a set of documents to the list of categories. Generally, the learning module takes as input classified document examples for each class and generates a corresponding knowledge base.

F.1.1 Probabilistic Model

In one embodiment, the approximate reasoning module 3618 can use a probabilistic representation. The learning of probabilistic models involves determining the probabilities of various events. These are usually estimated from a labeled training dataset. More formally, a training dataset is a collection of labeled documents consisting of tuples $<D_i, L_i>$ where $D_i$ denotes the document and $L_i$ denotes the label associated with $D_i$.

In describing one specific type of probabilistic model, namely, a Naïve Bayesian model, first it is described below how to represent models and perform inference approximate reasoning in such a framework, then it is described below how to learn Naïve Bayes models from labeled example documents. The Naïve Bayes approach to systems modeling has been demonstrated in a variety of fields varying from text classification to disease prediction as disclosed in: Good (1965), "The Estimation Of Probabilities: An Essay On Modern Bayesian Methods" M. I. T. Press; Duda et al. (1973), "Pattern Classification And Scene Analysis", Wiley, N.Y.; and Langley et al. (1992), "An Analysis Of Bayesian Classifiers", in the proceedings of Tenth National Conference on AI, 223–228.

To simplify the description of the text categorizer 3610, it is assumed that documents 3612 will be assigned to no more than one class. However, it will be appreciated by those skilled in the art that the text categorization method described herein may be readily extended to assign documents to more than one class.

More formally, the problem of text classification can be represented as a text classification system S that assigns a document (or body of text) class labels drawn from a discrete set of possible labels C. Mathematically it can be viewed as the mapping: S:Doc→{label|label∈C} (i.e., the target function c=that models a dependency between a target variable C and a set of input features $f_1, \ldots, f_n$). The target variable C is discrete, taking values from the finite set $\{c_1, \ldots, c_c\}$. The naïve Bayes classifier accepts as input a document "Doc" and predicts the target value C, or a classification, for this tuple. It uses Bayes' theorem in order to perform inference:

Consequently, this problem can be represented in terms of class probability distributions Pr(C) and class conditional probability distributions Pr(Doc|C).

In one specific embodiment, a document Doc is represented in terms of features such as words that occur in the document Doc. Consequently, the above class conditional probability distributions can be rewritten as follows: $Pr(f_1, \ldots, f_n|C)$.

Within the naïve Bayesian framework a simplifying assumption is introduced, sometimes known as the naïve assumption, where the input variables (in this case the terms) are assumed to be conditionally independent given the target classification value. As a result, the class conditionals reduce to: $Pr(f_i|C)$.

Thus, inference (calculation of the posterior probabilities given evidence) using Bayes' theorem simplifies from:

to the following (and hereinafter referred to as "the simplified inference equation"):

Decision making consists of taking the classification value $C_{max}$ whose corresponding posterior probability is the maximum amongst all posterior probabilities $Pr(C_i|<f_1, \ldots, f_n>)$ for all values $C_i \in \Omega_C$. This can be mathematically stated as follows:

Since, in this decision making strategy, the denominator in the simplified inference equation is common to all posterior probabilities, it can be dropped from the inference process. This further simplifies the reasoning process (and the representation also) to the following:

As a result of making the naïve assumption, the number of class conditional probabilities that need to be provided reduces from being exponential in the number of variables to being polynomial. This assumption, while unlikely to be true in most problems, generally provides a surprisingly high performance that has been shown to be comparable to other classification systems such as logic systems (decision trees) and neural networks (see Wiley cited above; and Langley et al. (1992), "An Analysis Of Bayesian Classifiers", in the proceedings of Tenth National Conference on AI, 223–228).

In other words, each class is represented by a series of word conditional probabilities for each word and a class conditional that are used in the calculation of the posterior probability for a class given a new document to be classified.

Naïve Bayes classifiers can quite easily be learned from example data. The learning algorithm operating in a learning module consists of estimating the class conditional probabilities and the class probabilities from a training dataset Train (a labeled collection of documents) for each possible document classification Class, where the class conditionals correspond to the following: $Pr(f_i|Class=c_j)$ "i∈$\{1, \ldots, n\}$ and the class probability distribution corresponds to: $Pr(Class=c_j)$.

The class probability $Pr(Class=c_j)$ corresponds to the fraction of documents having the classification of $c_j$ in the training dataset Train.

Each class conditional $Pr(f_i|Class=c_j)$ can be estimated using the m-estimate (see Mitchell cited above):

where: $Freq(f_i, Doc_j)$ denotes the number of occurrences of the feature $f_i$ in the training document $Doc_j$; |Vocab| denotes the number of unique features considered as the language of the model (i.e., the number of variables used to solve the problem); and $|Doc_j|$ denotes the length of the document $Doc_j$ (i.e., the number of terms, words, or features in the document).

F.1.2 Fuzzy Model

In another embodiment, the text categorizer 3610 uses a fuzzy model to categorize document 3612. In this embodiment, the pre-processing module 3614 includes a feature extractor 3615, a feature reducer 3617, and a fuzzy set generator 3621 as shown in FIG. 36. The feature reducer 3617 is used to eliminate features extracted by the feature extractor 3615 that provide little class discrimination. The fuzzy set generator 3621 generates either fuzzy sets or granule fuzzy sets depending on the fuzzy model used. Associated weights of features generated by the preprocessing module 3614 are interpreted as fuzzy set memberships or probabilities.

More specifically in this embodiment, the approximate reasoning module 3618 computes the degree of similarity (i.e., match) between the unlabelled text object 3612 that is represented in terms of: a feature vector produced by feature extractor 3615, a document fuzzy set produced by the fuzzy set generator 3621, and one or more categories as specified by the approximate reasoning module 3618. The approximate reasoning module 3618, which contains matching, filtering and decision making mechanisms, accesses the knowledge base 3622 to classify the unlabelled text object 3612.

In a first embodiment, the knowledge base 3622 contains rules for each class (i.e., category), where each rule is made up of a class fuzzy set and an associated class filter. During operation of this embodiment, the approximate reasoning module 3618. (1) calculates the degree of match between the document fuzzy set 3624 and a fuzzy set associated with each class (i.e., each class fuzzy set); (2) passes the resulting degree of match through a respective filter function (i.e., class filter); and (3) determines a class label to assign to the unlabelled text object based upon the filtered degrees of match (e.g., the class label associated with the highest degree of match is assigned to be the class label of the text object).

In a second embodiment, each rule is made up of a granule fuzzy set. Similar to the categorizer of the first embodiment that uses fuzzy set models, this categorizer uses granule feature based models. In operation, the categorizer of this second embodiment performs a functional mapping from the set of features to a set of class values. Further details of the a text categorizer that uses fuzzy models is described by Shanahan in U.S. patent application Ser. No. 09/928,619, entitled "Fuzzy Text Categorizer", which is incorporated herein by reference.

F 1.3 LSI Model

In yet another embodiment, the text categorizer 3610 uses LSI (Latent Semantic Indexing) to categorize document 3612. Text classification and learning can be performed using LSI and similarity metrics in the resulting feature space. The LSI model is used to translate feature space into latent concepts space that can be used to explain the variance-co-variance structure of a set of features through linear combinations of these features. Subsequently these transformed features can be used as input to any learning algorithm. In addition, LSI classification can be used with K nearest neighbor and a fuzzy classifier. Having identified the latent concepts they can be used for classification (such as fuzzy classifier defined above or K nearest neighbors) or similarity metrics (Cosine metric that can be used for ranking or re-ranking). Additional background relating to the generation of context vectors is disclosed by Deerwester, in "Indexing By Latent Semantic Analysis", Journal of the American Society for Information Science, 41(6): 391–407, 1990.

F.1.4 Vector Space Model

In yet a further embodiment, the text categorizer 3610 uses a vector space model to categorize document 3612. Under the vector-space model, document and queries can be conceptually viewed as vectors of features, such as words, noun phrases, and other linguistically derived features (e.g., parse tree features). Typically a feature extraction module transforms a document (or query) into its vector of features, $D=<f_1, \ldots, f_n>$, where each $f_i$ denotes the statistical importance (normalized) of that feature. One common way to compute each weight $f_i$ associated for document Doc is as follows:

where freq($f_i$, Doc) represents the frequency of feature $f_i$ in document Doc and idf($f_i$) represents the inverse document frequency of the feature $f_i$ in a document collection DC. The idf($f_i$) factor corresponds to the content discriminating power of $i^{th}$ feature: i.e. a feature that appears rarely in a collection has a high idf value. The idf($f_i$) factor is calculated as follows:

where |DC| denotes the number of documents in the collection DC and DF($f_i$) denotes the number of documents that contain $f_i$. Typically, a normalized document vector, $D=<nf_1, \ldots, nf_n>$ is used in the vector space model of information retrieval, where each $nf_i$ is obtained as:

Queries can also be represented as normalized vectors over the feature space, $Q=<q_1, \ldots, q_n>$, where each entry indicates the importance of the word in the search.

The similarity between a query q and a document d, sim(q, d), is defined as the inner product of the query vector Q and document vector D. This yields similarity values in the zero to one range [0, 1].

Additional background relating to the generation of vector space models is disclosed in U.S. Pat. No. 5,619,709, and by Salton et al., in "A Vector Space Model For Information Retrieval", Journal of the ASIS, 18:11, 613–620, November 1975.

F.2 Recommending Personalities

The meta-document server 200 provides a service for recommending personalities at 216 in FIG. 2. In one instance, personalities are recommended for each document after a user uploads to the meta-document server 200 and the user has selected the personality property 1214 shown in FIG. 12. After a user selects the personality property 1214, the personality recommender 216 automatically recommends a personality for each document uploaded by the user. By recommending a personality, the personality recommender 216 aids a user to decide which of a plurality of document enrichment themes are to be applied to an uploaded document by analyzing document content and other contextual information (e.g., actions carried out on the document) of the uploaded document.

In one embodiment, personalities that are recommended by the personality recommender 216 are automatically attached to the uploaded document without requiring user acknowledgment and these documents are immediately enriched by the meta-document server. Alternatively, the personalities that are recommended by the personality recommender 216 are attached to a meta-document only after the user provides an acknowledgement that the recommended personality is acceptable to the user.

Figure 37:
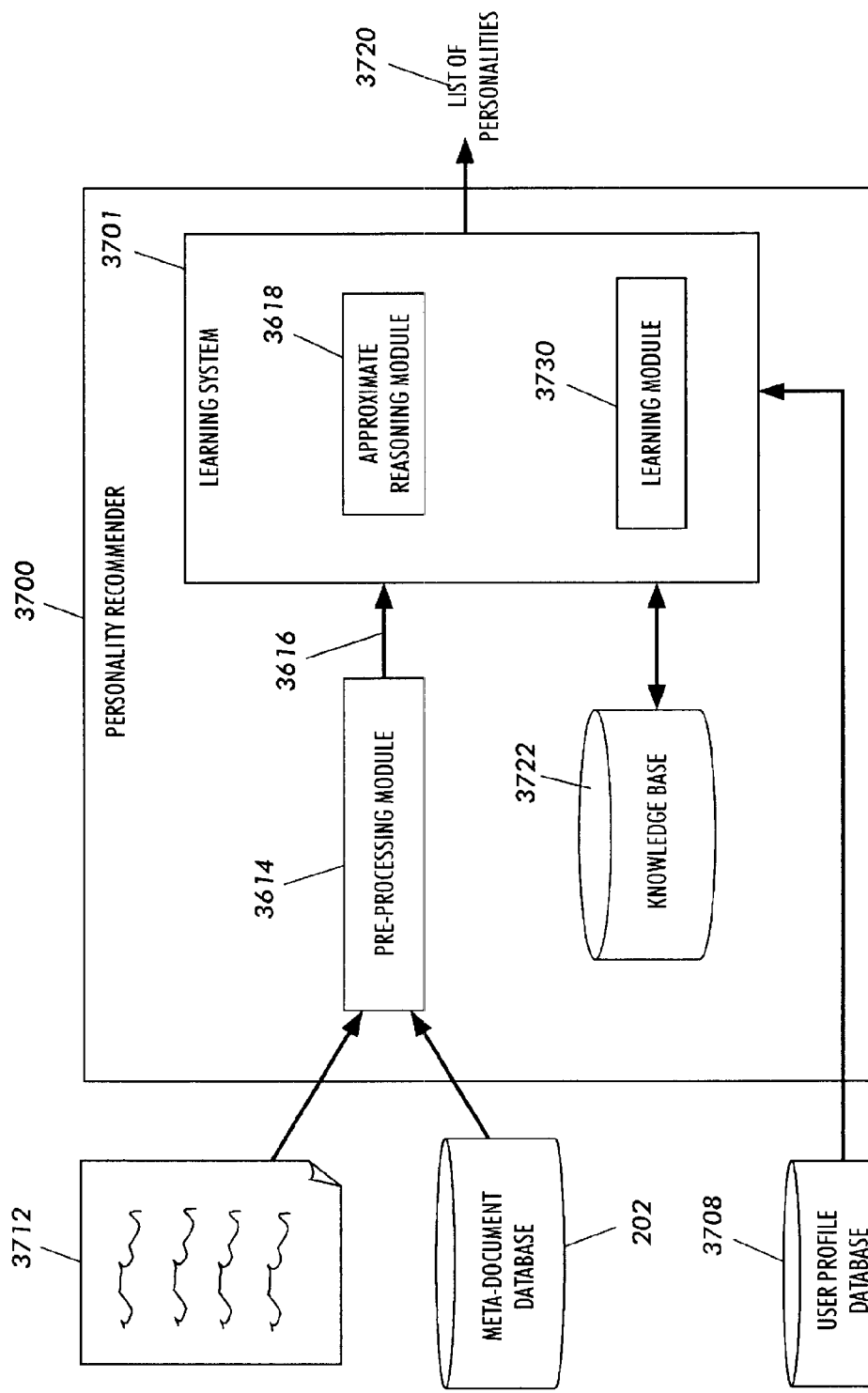
FIG. 37 illustrates a personality recommender.

In order to decide which personality (or personalities) to recommend to attach to a document, the meta-document server 200 uses an uploaded document 3712 as input to the personality recommender system 216, an embodiment 3700 of which is shown in detail in FIG. 37. Generally, the personality recommender system 3700 shown in FIG. 37 is similar to the document categorizer 3610 shown in FIG. 36 except that the personality recommender assigns a list of one or more personalities 3720 instead of a list of one or more categories as specified in section F.1 for the categorizer. The personality recommender 3700 can learn rules for recommending personalities and for developing a personality ontology using documents previously uploaded to the meta-document server 200 and assigned a personality by a user.

More specifically, the personality recommender system 3700 shown in FIG. 37 is a variant of the text categorizer described above in section F.1 and shown in FIG. 36. The knowledge base 3722 can be defined manually using data from personality database 212, which may contain user specific personalities or generally available personalities (e.g., using features and weightings chosen manually for each personality that could be applied) and documents that were previously assigned to those personalities in the meta-document database 202.

Alternatively, the knowledge base can be defined semi-automatically or automatically using features and weightings chosen by machine learning techniques. In the case of automatically learning the features and weightings, the learning module 3730 may use meta-documents existing in the meta-document database 202 to train the knowledge base 3722. Subsequently, the learning module 3730 validates the knowledge base 3722 using user profile database 3708. The user profile database 3708, which includes portions of the meta-document database 202 and the personality database 212, includes references to meta-documents that users have already applied a personality thereto.

In operation, the pre-processing module 3614 (described above in section F.1) of the personality recommender 3700 extracts features 3616 from an uploaded document 3712. Subsequently, the approximate reasoning module 3618 (described above in section F.1) derives a list of personalities 3720 using knowledge base 3722. These extracted features would then be exploited, again using standard techniques (using for example, Bayesian inference, cosine distance, as described above), to classify the new document and rank the possible list of personalities 3720 to recommend enriching specified document content. Every personality ranking above a certain threshold or just the top N (N>=1) personalities can be recommend by the approximate reasoning module 3618.

In a variant of the personality recommender 3700, the personalities ranked for a new document are re-ranked using the profile of the user. For example, if the approximate reasoning module 3618 attaches to a document a business and a sports personality, but the user's own profile in 3708 reveals that this user has never applied a business personality then the ranking can be altered in 3701 so that only the sports personality is proposed, or applied with greater priority, before the business personality. Accordingly, personality recommendations can be tailored for a particular user using the user's interaction history with the meta-document server 200 (e.g., an example interaction history is shown in FIG. 33 and described in section E.2).

F.3 Generating Queries Using Identified Entities

Traditional searches for information are invoked when an information need exists for an identified task. From this information need a query is formulated and a search performed, generally directed by a user. In accordance with searches performed by services of the meta-document server 200, one or more documents relating to a task are identified and uploaded to the meta-document server 200. From these documents queries are generated for specified services automatically (and optionally as specified by a user).

As set forth above, a document service request in a personality associated with an uploaded document identifies entities that are used to perform other document service requests such as queries. The manner in which to automatically formulate queries given an identified entity and its associated document content is the subject of this section. This technique for automatically formulating a query aims to improve the quality (e.g., in terms of precision recall) of information retrieval systems.

Figure 38:
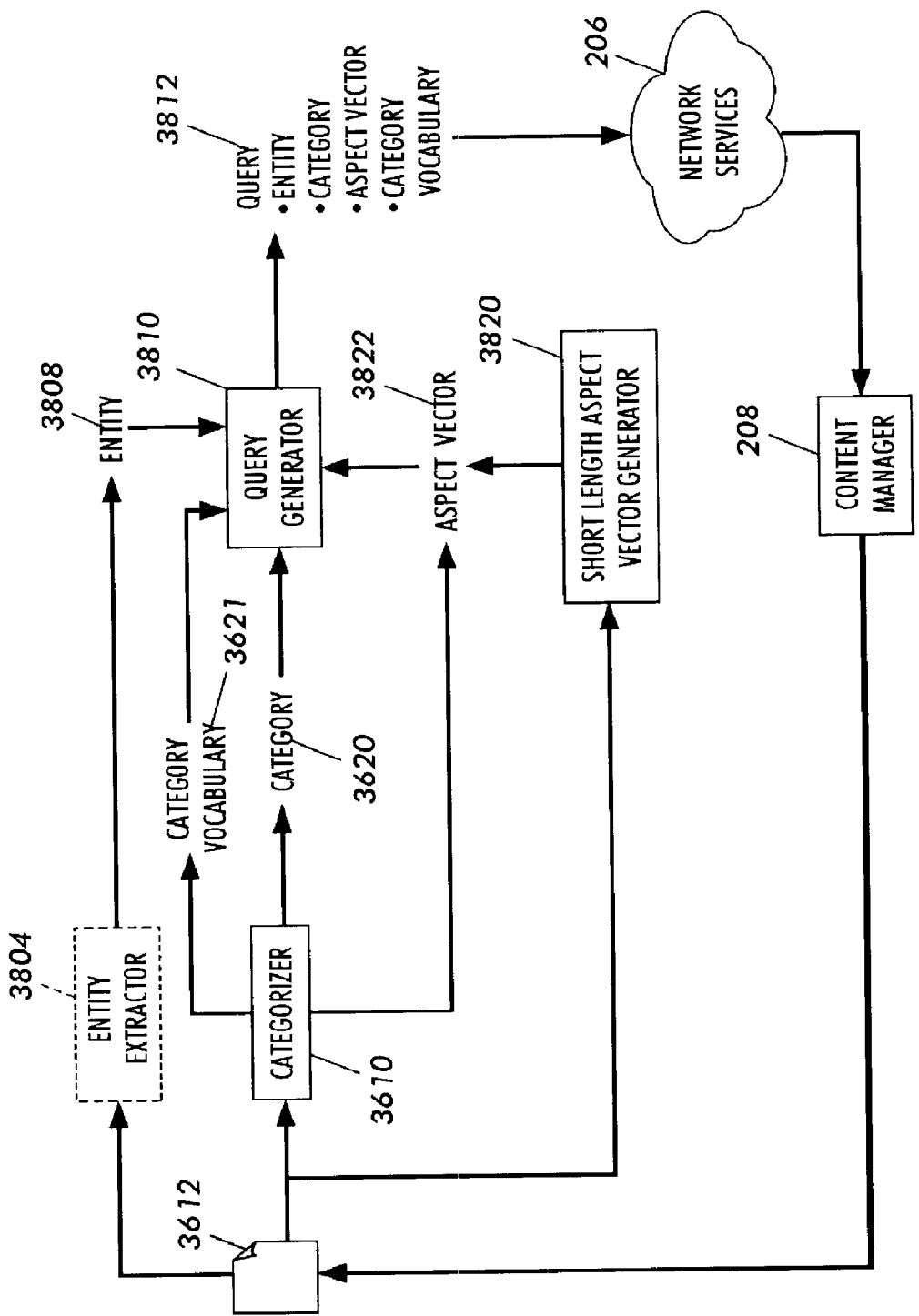
FIG. 38 illustrates the elements and flow of information for generating a query.

FIG. 38 illustrates the elements and flow of information for generating a query 3812 by query generator 3810. The query generated may include some or all of the following elements as discussed in more detail below: (a) a set of entities 3808 identified by, for example, a document service request 106 performed by entity extractor 3804 or manually by a user, (b) a set of categories 3620 generated by the categorizer 3610 (as described above in further detail while referring to FIG. 36), (c) an aspect vector 3822 generated by categorizer 3610 or short run aspect vector generator 3820, and (d) a category vocabulary 3621 generated by the categorizer 3610.

In operation as shown in FIG. 38, the document content 3612 or alternatively limited context (i.e., words, sentences, or paragraphs) surrounding the entity 3808 is analyzed by categorizer 3610 to produce a set of categories 3620. It will be appreciated that although the description is limited to document content it may in also include enriched document content. In addition, the document content 3612 is analyzed by short length aspect vector generator 3820 to formulate a short length aspect vector 3822. In an alternate embodiment, the aspect vector generator 3820 forms part of the categorizer 3610.

In one embodiment, the query generator 3810 coalesces these four elements (i.e., entity 3808, category 3620, aspect vector 3822, and category vocabulary 3621) to automatically formulate query 3812. Advantageously, the query 3812 may be contextualized at different levels: first, the query is set to be directed in a specific category of an information retrieval system that may, for example, be hierarchically organized; second, the query may be augmented with additional terms defined in aspect vector 3822; third, the query may be further augmented with additional terms related to the category vocabulary 3621. In alternate embodiments described below a query can be contextualized using just one of the category 3620 and the aspect vector 3822.

After generating the query, in one example embodiment, it is used by the meta-document server 200 to access content provided by networks services 206 (introduced in FIG. 2). The content provided as a result of the query can then be used by the content manager 208 to enrich the original document content 3612. In another embodiment, the content is provided to a user as a result of performing a search on a specified entity 3808.

F.3.1 Category Generation

In generating the set of categories 3620, the categorizer 3610 classifies input document to generate classification labels for the document content 3612. Terms and entities (i.e., typed terms, such as people organizations, locations, etc.) are extracted from the document content. For example, given a classification scheme such as a class hierarchy (e.g., from a DMOZ ontology that is available on the Internet at dmoz.org) in which documents are assigned class labels (or assigned to nodes in a labeled hierarchy), a classification profile is derived that allows document content to be assigned to an existing label or to an existing class, by measuring the similarity between the new document and the known class profiles.

Document classification labels define the set of categories 3620 output by the categorizer 3610. These classification labels in one embodiment are appended to the query 3812 by query generator 3810 to restrict the scope of the query (i.e., the entity 3808 and the context vector 3822) to folders corresponding to classification labels in a document collection of an information retrieval system. In an alternate embodiment, the classification labels are appended to the terms in the aspect vector to formulate a more precise query. Adding terms in the aspect vector adds constraints to the query that limit the search to a set of nodes and/or sub-nodes in a document categorization structure (e.g., hierarchy, graphs). In yet a further embodiment, the classification labels are used to identify the characteristic vocabulary (i.e., category vocabulary) 3621 associated with the corresponding classes. The terms of the characteristic vocabulary 3621 in this embodiment are appended to the aspect vector to again formulate a more precise query.

After processing the query by submitting it to an information retrieval system (e.g., Google, Yahoo, NorthernLights), the query can be refined by filtering and/or ranking the results returned by the query mechanism using the classification labels or its associated characteristic vocabulary in a number of ways. For example, results can be ranked from most relevant to least by matching returned document profiles against the classification labels or the characteristic vocabulary of the predicted class by: using a categorizer; or using a similar metric in the case of the characteristic vocabulary, such as the cosine distance or similarity measure base on an LSI transformation of the original feature space. The results of these more precise queries are used to enrich original document content. In one embodiment, documents are enriched by the meta-document server 200 described above, the operation of which involves automatically executing the query, for example, on the Internet, and retrieving the query results and linking these results to the original terms and entities in document content.

Figure 39:
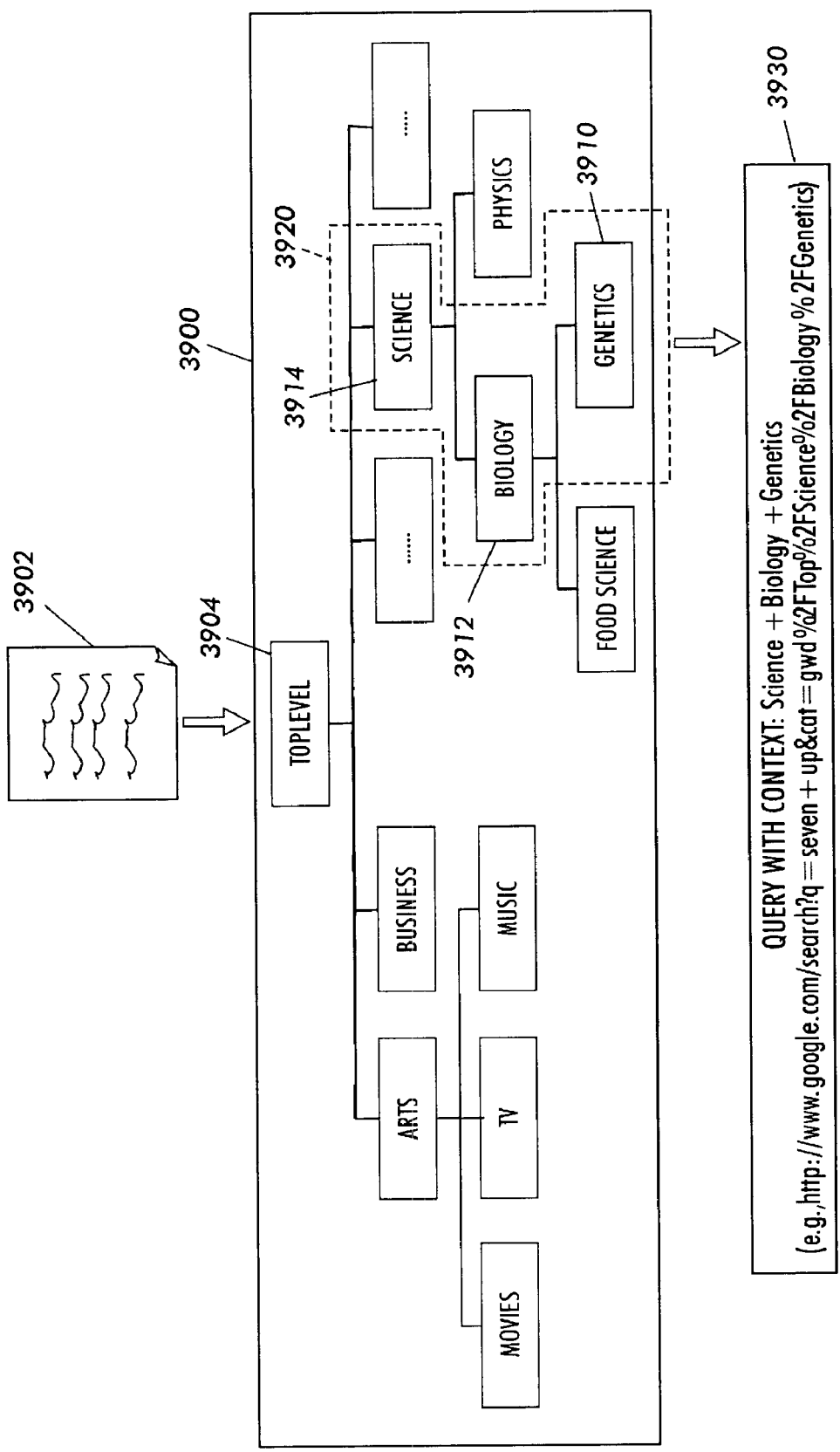
FIG. 39 illustrates an example of a query contextualized using classification labels of document categorization hierarchy.

FIG. 39 illustrates an example of a query 3930 contextualized using classification labels 3920 of document categorization hierarchy 3900. Using document content 3902, the categorizer 3610 identifies classification labels 3920. These labels identify nodes 3910, 3912, and 3914 of the top-level node 3904. Specifically in this example, the entities "seven" and "up" are determined by categorizer 3610 to relate most appropriately to the class of documents found in the directory science>biology>genetics. As specified at 3930, the search is focused on documents found in the single node of the document hierarchy genetics, at 3910.

F.3.2 Aspect Vector Generation

As set forth above, personalities recognize certain entities in a document and search for information concerning them in personality-specific data sources. Aspect vectors add a small amount of context to the entity to restrict a search for information, thereby making the search more precise.

In operation when an entity is found in document content by a document service request, that entity will be used by another document service request to gather and filter information concerning that entity. Producing an aspect vector contextualizes queries related to the entities by examining a portion of the document content that may range from all of it to one or more paragraphs and/or segments around the entity.

The aspect vector is produced by analyzing a document's textual content using natural language processing in order to extract different facets of the document. In one embodiment, three facets of document content are examined (i.e., tokens (i.e., words), phrases, and rare words) to identify terms to retain. The retained terms are added to the recognized entity, in order to increase the precision of the query.

Tokens from the document are identified using words that are normalized using, for example, techniques such as mapping uppercase characters to lower case, stemming, etc. These tokens are divided into two parts: words appearing in a list of stop words (e.g., in, a, the, of, etc.); and all other words. Tokens identified in the list of stop words are discarded and the remaining words are sorted by decreasing frequency to define a sorted list of words. From the sorted list of words, the N (e.g., N=3) most frequent words are retained. In addition, some of these N (e.g., N=2) words are specially marked so that their presence becomes mandatory in documents retrieved by the query.

Phrases in document content are defined either using a language parser which recognizes phrases, or approximated by some means (e.g., taking all sequences of words between stopwords as a phrase). Only phrases consisting of two or more words are retained. These remaining phrases are sorted by decreasing frequency. The top M (e.g. M=3) most frequent phrases, possibly fulfilling a minimum frequency criteria (e.g. appearing more than once in the entire document), are retained.

Rare words are defined as those (non-stopwords) appearing with a low frequency in some reference corpus (e.g. The British National Corpus of 100 million English words). All non-stopwords are sorted by their frequency in the reference corpus in ascending order. The top P least frequent words (e.g. P=3), possibly fulfilling a minimum frequency criteria (e.g. appearing more than three times in the entire document), are retained.

Variants of this method include limiting the number of context words used by a certain number of words or characters, for example, certain information retrieval systems accept queries up to a length of 256 characters in length, while others information retrieval systems accept queries that have a maximum of ten words. Another variant includes using additional lists of ranked items extracted from other facets of the text such as: (a) proper names (e.g., ranked by decreasing frequency), (b) rare phrases (as with rare words, calculating rareness by frequency in a reference corpus, for example, an image of the WWW), (c) dates, (d) numbers, or (e) geographical locations. Advantageously, mixing terms from different facets of the document content to extracted entities improves precision of query related to marking up the entity.

For example, assume a web page mentions a professor named Michael Jordan. Further assume that the entity identified by the meta-document server 200 is Michael Jordan. Sending the query "Michael Jordan" to an information retrieval system such as AltaVista identifies approximately 1.2 million documents, with the 10 top-ranked documents about the basketball player Michael Jordan. By augmenting the entities "Michael Jordan" of the query with the aspects such as "computer science", "electrical engineering", and "faculty members" extracted from the document content, a more precise query can be formulated for identifying information relating to a professor named Michael Jordan.

F.3.3 Example

Figure 40:
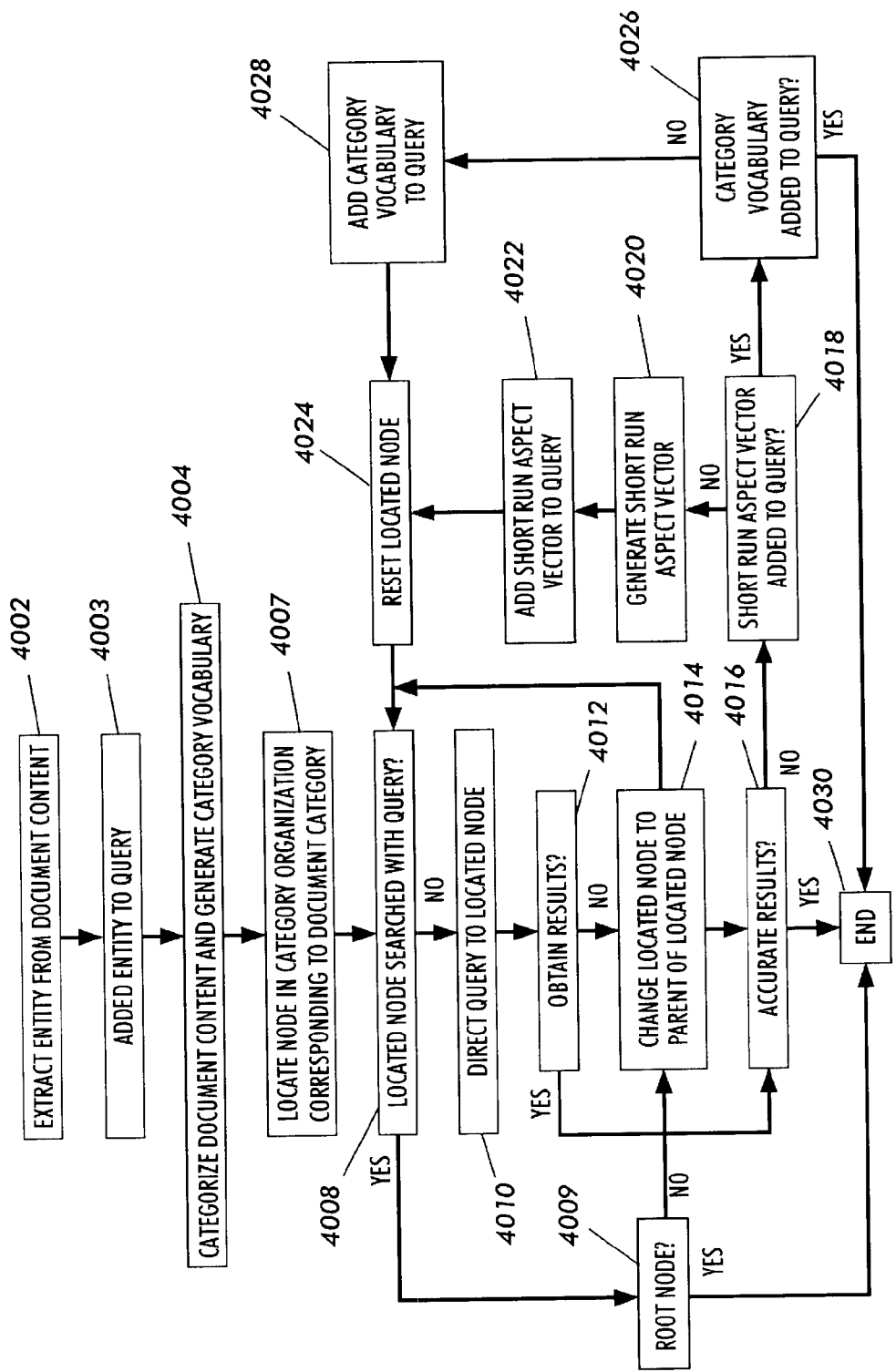
FIG. 40 is a flow diagram which depicts one embodiment in which both categories and aspect vectors can be used to improve the accuracy of an information retrieval system.

FIG. 40 sets forth a flow diagram which depicts one embodiment in which both categories and aspect vectors can be used to improve the accuracy of an information retrieval system. At 4002, one or more entities are extracted from a document. Entity identification or extraction can be performed: (a) manually by a user, (b) automatically by entity extractor 3804 shown in FIG. 38 using for example a method as described in section B.4, or (c) by the categorizer 3610. At 4003, the extracted entity at 4002 is added to a query at 4003.

At 4004, the document from which the entity is extracted is categorized. Categorization involves producing a category 3620 and a category vocabulary 3621. The category vocabulary for a category consists of one or more terms that describe the category. In one embodiment, the category vocabulary is generated a priori and associated with each category in an ontology. At 4007, for the particular category identified at 4004, a node in the organizational structure of the categories is located.

At 4008, if the node located node has not been searched with the query, then the query as it is defined is directed to the located node in the category organization at 4010. At 4009, if the root node has not already been searched using the defined query, then the node in the category organization at which the category is defined is changed at 4014 to its parent node. The parent node in a category organization is generally less descriptive than the child node. The root node defines the least descriptive category in the category organization.

At 4012, if search results are obtained at 4010, then they are evaluated for accuracy at 4016. If no results are obtained at 4012, the node in the category organization at which the category is defined is changed at 4014 to its parent node and act 4008 is repeated. Note that if there is no parent of the located node at 4014, then the node remains unchanged and is by definition the root node.

At 4016, if the search results are determined to be accurate (e.g., by user approval), then the process terminates at 4030. At this point the results of the query may, for example, be displayed to a user or used to automatically enrich document content.

At 4018, if the results are not accurate at 4016, then a determination is made whether a short run aspect vector has already been added to the query. If it has not already been added then a short run aspect vector using the document content and the entity as described above in section F.3.2 is generated at 4020. At, 4022 the aspect vector is added to the query and the node to which the query is pointing in the category organization is reset to the node that corresponds to its original categorization at 4024. Subsequently using this augmented query, act 4008 is repeated.

Furthermore, if the query should need to be further augmented at 4026 with the category vocabulary because of inaccurate results found at 4016, then the category vocabulary is added to the query at 4028, thereby further augmenting the query. The node to which this augmented query is pointing in the category organization is reset to the node that corresponds to its original categorization at 4024 and act 4008 is repeated.

Figure 41:
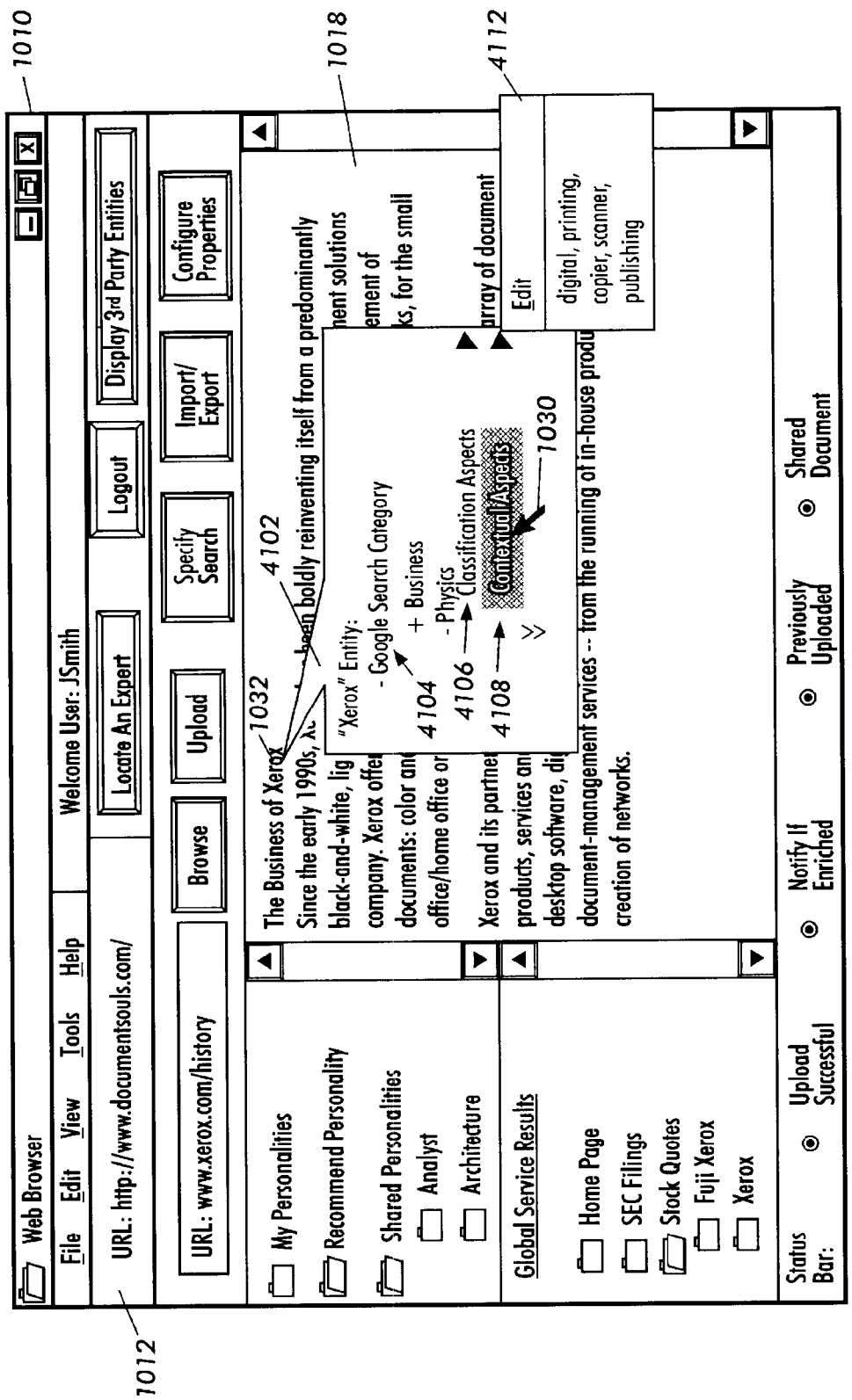
FIG. 41 illustrates a client interface similar to the client interface that illustrates an augmented query that can be performed using a recognized entity.

FIG. 41 illustrates a client interface 4110 similar to the client interface 1010 shown in FIG. 10. Unlike the client interface 1010, the client interface 4110 displays an augmented query that can be performed using a recognized entity 1032 in a pop-up window 4102. The pop-up window 4102 appears when a user locates the pointer 1030 in the vicinity of the recognized entity 1032. The pop-up window 4102 illustrates one or more category organizations 4104 used in defining a query, as well as, classification aspects 4106 and contextual aspect 4108 that are associated with the query, each of which can be viewed and edited as shown in window 4112. To manually invoke a search based on an entity, the user selects the desired level in the category organization and whether one or more aspects should be used to augment the query.

F.4 Finding An Expert For An Enriched Document

In order to help a user understand a document, an expert service provides help finding experts for subjects mentioned in a meta-document. In one embodiment, a user selects button 1036 in FIG. 10 after a document is uploaded. Once invoked, the expert service uses as input whatever content (e.g., text, hyperlinks, graphics) that is available in the current state of the document (e.g., the user may be composing the document) to find an expert about the subject. Advantageously, a document text segment can be used by the expert utility to generate the query to access a database of experts, and manage the exchange of responses or documents, within the context of a the meta-document system shown in FIG. 2.

In one embodiment, the expert utility operates by performing the following steps: (a) the current state of a meta-document is input to the expert utility; (b) a profile is created for the meta-document (or for a document segment selected by the user) either by traditional indexing means, or by creating short query context as disclosed in section F.3 above or by categorizing as described in section F.1 above (Note that the profiles can be created for the entire document or for any segment of the document depending on the number of segments of the meta-document selected by a user.); (c) this profile is used to query a known website for experts (e.g., http://www.exp.com) or by finding the most active rater for topics in that profile in some recommendation system such as Knowledge Pump developed by Xerox Corporation; and (d) pointers to and/or content regarding the experts found are referenced and/or brought back as annotation for the document segment selected.

G. Additional Meta-Document Services

This section sets forth additional services and embodiments that in one embodiment may operate separate from or integral with the meta-document server.

G.1 Notification Of Enrichment

As set forth above, when a personality 104 is attached to document content 102, the personality consists of many document service requests 106 identifying document services that are periodically initiated by scheduler 204 to examine the document content 102 and the document markup 108. By examining content and markup of a document, a document service may recognize a certain number of entities inside the document. The document service also may link these entities to a multiplicity of data sources on the World Wide Web (i.e., WWW) or fetch the content of the link, as provided in section 1220 of FIG. 12. In addition as part of the document service, the service may also filter and/or transform retrieved document content.

If desired, a user may specify whether to invoke a notification service that will notify a user upon completion of a document service. It will be appreciated by those skilled in the art that document services may be able to be performed in real time and therefore not require notification of its completion to a user. In the event notification is required to perform actions that cannot be performed in real time, as part of the properties 1210 of a personality shown in FIG. 12, a user may specify at 1204 whether to be notified by email 1205, voice mail 1206, or SMS (Short Message Service) text messaging over GSM 1207 upon completion of the service. An example of a service that requires significant processing time is a combinatorial search of a list of words.

When a notification mechanism is selected at 1204, a notification document service request is added to the specified personality to alert the user who applied the personality to the document when significant changes appear on the web or in a local database concerning any of the entities mentioned in the document. The threshold amount of change that invokes a notification service can be predefined by the user and/or system. In addition, the user may be provided with a mechanism (not shown) for specifying a specific entity to be watched for changes.

Advantageously, the notification system is not based on specifying a URL or a document repository to be watched for changes. Instead this notification system is initiated by specifying a document service request of a meta-document.

Consequently, the notification of changes to information involves only that information which the user is concerned about. In addition, this form of notification provides a level of indirection, since the user is alerted about new information concerning entities in a document even if the document content 102 or markup 108 never changes.

More specifically, this change alerting document service request is packaged in a personality that can be activated in the meta-document server 200 (i.e., attached to a document) by the user. Initially, document service requests analyze a document by linguistically processing the document to recognize entities within the document. These entities can be strings from a list (e.g., list of medicine names), or regular expressions describing a multiplicity of entities (e.g., a proper name recognizer, a chemical formula recognizer, etc.), or elements recognized by linguistic processing (e.g., noun phrases, words in a subject-verb relations, etc.). Entities may also have keys associated with them in another list or database (e.g., Xerox as an entity with stock key XRX).

Another document service accepts these entities, their associated keys, a procedure for accessing information for each entity, an update period, information about the user requesting the notification and a change significance level (e.g., Any Change, Minor Change, Major Change, etc.) as input. This document service request then performs the information access (e.g., local database access, accessing a content source on the Internet, etc.) for each entity at the beginning of every update period.

The document service request compares the data retrieved for each entity at the current and at the previous update period (i.e., the data retrieved for each entity in the previous update is stored and accessible to the document service request). If the stored information is significantly different, as described below, from the newly retrieved information the user is notified (e.g., via e-mail or any other notification mechanism) that new entity-specific information is available and the user is also given a description of the change. The document service request decides on significance using a change significance parameter that measures how much the new information differs from the stored information (e.g., by comparing the number of characters, etc.).

In one embodiment, the change significance parameter has a plurality of settings (e.g., high, low). For example, if the information retrieved for an entity previously was a web page, and the change significance parameter was set high, then the user may be notified only if the length of the web page length changes by more than 30%. If the change significance was set low, then the user would be notified if the page length changes by more than 5%. If the change significance parameter was set to any change, then any change in the page length would cause the user to be alerted. In an alternate embodiment, the change significance parameter is computed by storing any reduced description of the accessed pages (e.g., hash function, significant words, all non stop words, etc.) in the system and comparing the stored representations of the page to newly accessed representations in order to determine change.

G.2 Document-Centric Suggestions

This section describes a mechanism that uses an information space surrounding a document to provide an improved (e.g., more accurate and more stylish) document-centric auto-completion system and auto-correction system that can be used during content creation. Document auto-completion saves a user from having to retype text (and other document content such as graphics) and related markup such hyperlinks, bibliographic entries etc., by providing suggestions of words that have been used previously in a contextually similar manner. Document auto-correction provides a textual correction system that dynamically updates the information space as corrections are made or accepted.

Figure 42:
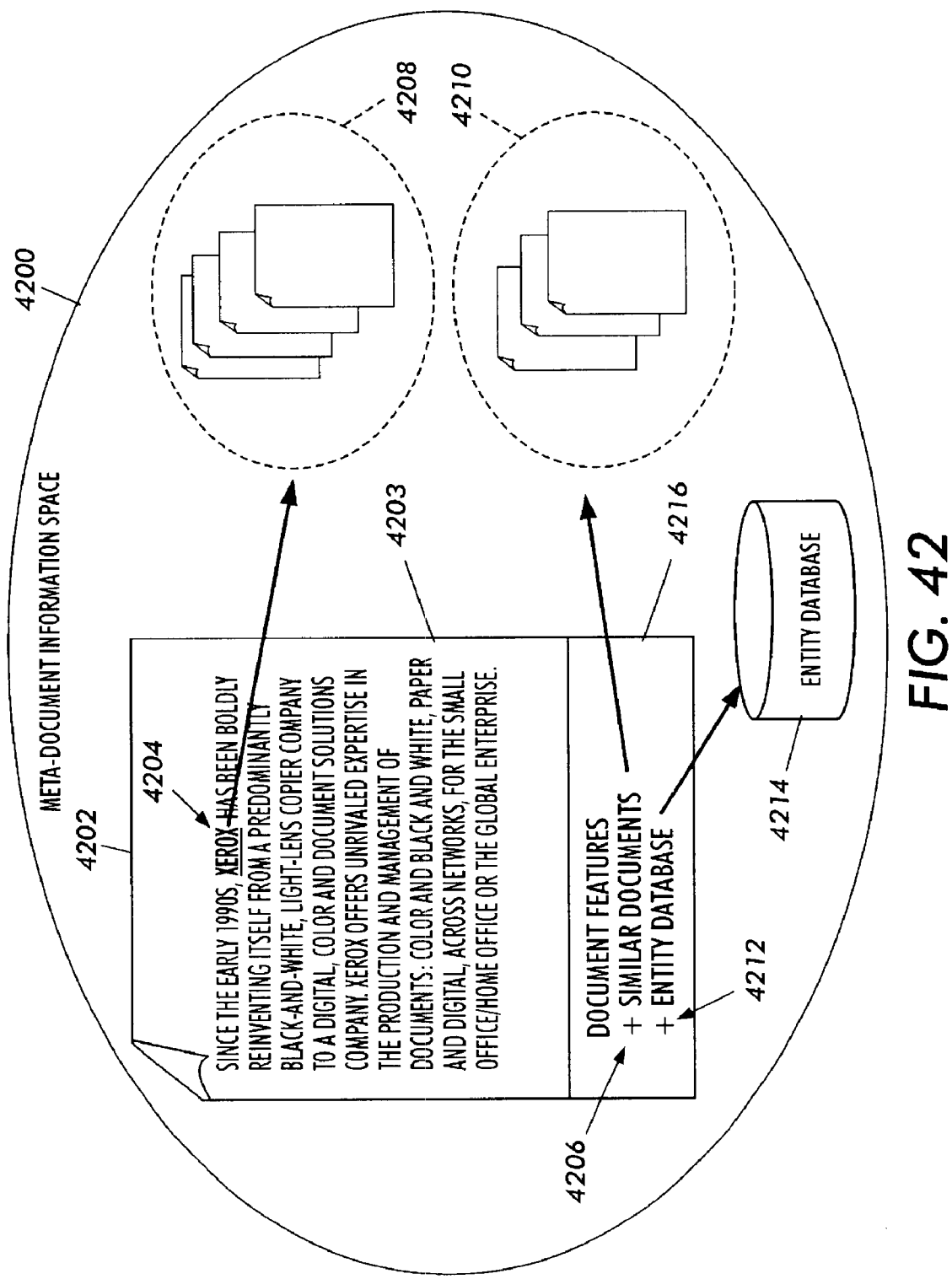
FIG. 42 illustrates an information space that surrounds meta-document (i.e., a meta-document information space)

The meta-document server 200 described above is an example of one embodiment that can be used to create an information space surrounding a document, thereby creating a document-centric view of the world. An information space includes document content, document markup, and information relating to additions and/or changes relating to document content (e.g., additions, changes, keystroke order etc.). For example, FIG. 42 illustrates an information space 4200 that surrounds meta-document 4202. The meta-document 4202 includes content and markup. The markup enriches content of the information space of the meta-document 4202, for example, by linking identified entity 4204 in the meta-document content 4203 to a set of meta-documents 4208.

In addition, the markup of meta-document 4202 grows the information space 4200 on a document level (as opposed to an entity level) at 4216 using similar documents 4206. The similar documents 4206 links to a set of meta-documents 4210 that relate to the content 4203 as a whole and not to any single entity of the content 4203. Also, the document level markup of the information space 4200 includes a reference 4212 to an entity database 4214 of extracted entities, an example of which is shown in FIG. 48 and discussed in more detail below.

It will be appreciated by those skilled in the art that the elements making up the meta-document information space 4200 (e.g., document content 4203, the sets of meta-documents 4208 and 4210, and the entity database 4214) need not be collocated together in a single space and/or machine. Instead, the elements making up the meta-document information space 4200 may be located physically distant from each other on different computer systems and/or file storage systems that operate independently across the network 221 shown in FIG. 2.

The construction of the information space 4200 surrounding a document can begin at document creation time by, for example, creating a document on the meta-document server 200. Once the information space surrounding a document is created, the user or the system can exploit it during the knowledge management cycle. The system in case of an auto-completion service uses the information space of a particular meta-document(s) to aid in creating suggestions for completing input for a user.

Auto-completion involves the process of automatically completing one or more words without manually typing all the characters that makeup that word(s). In one embodiment, the user types the first few characters of a word, presses a special request key to invoke completion, and the rest of the word is filled in. The completed word may also be rejected with the aid of another special key. If multiple alternatives exist, the user may be prompted to select one from a displayed list of alternatives or to reject the proposed completions.

Figure 43:
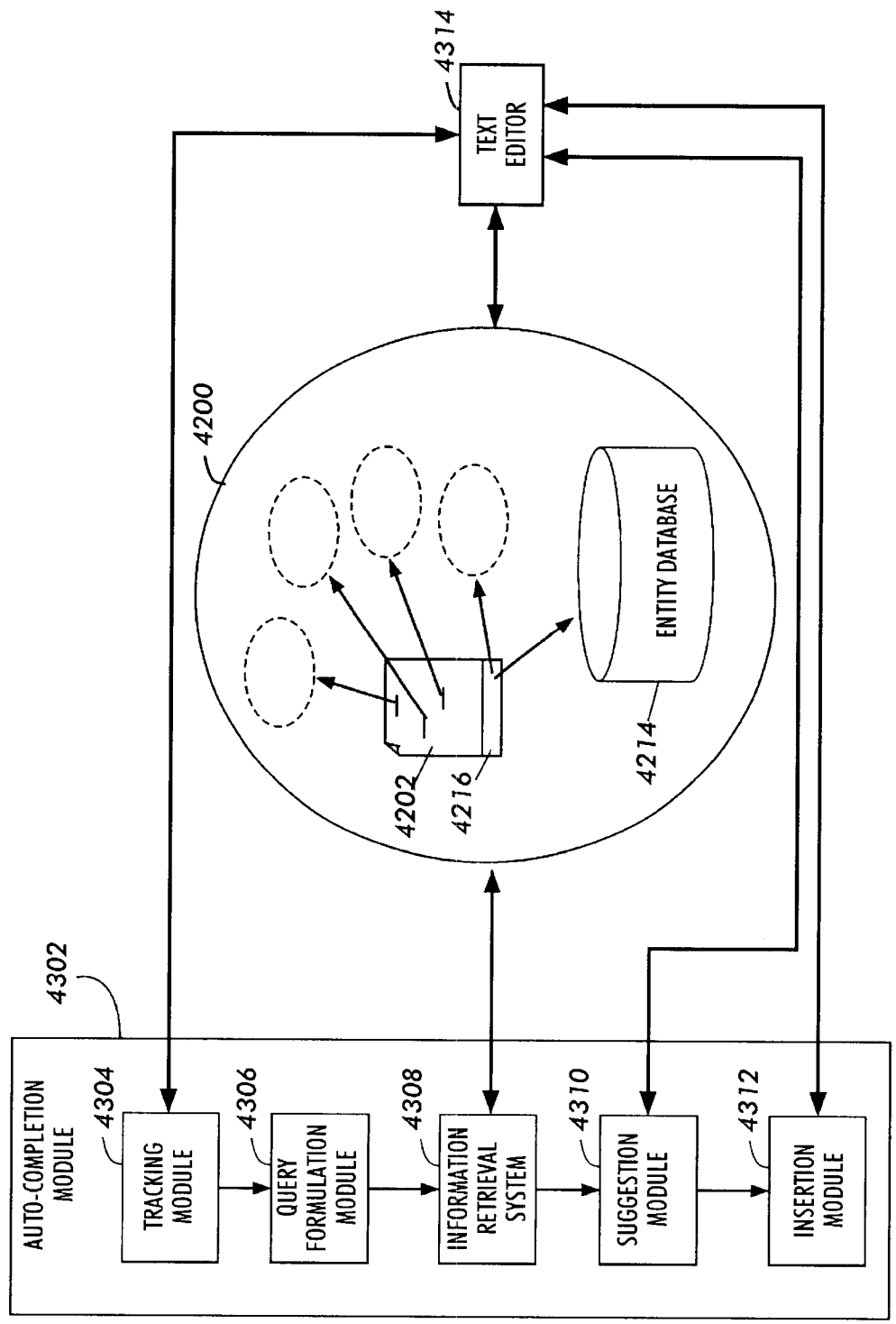
FIG. 43 illustrates an auto-completion module that operates with a text editor and the meta-document information space.

In one embodiment illustrated in FIG. 43, an auto-completion module 4302 operates with a text editor 4314 and the meta-document information space 4200. The auto-completion module 4302 provides document-centric suggestions to entity fragments (e.g., string fragments) added to document content 4203 using the text editor 4314. With the aid of the entity database 4214 in the information space 4200 suggestions for expanding the entity fragments are defined.

As illustrated in FIG. 43 the auto-completion-module 4302 includes a tracking module 4304, a query formulation module 4306, an information retrieval system 4308, a suggestion module 4310, and an insertion module 4312.

In the embodiment shown in FIG. 43, the entity database 4214 in information space 4200 stores one or more text objects (i.e., a word or collection of words that may take the form of a string) that could be used to auto-complete users textual input at editor 4314 destined to form part of document content 4203. Exactly what text objects define the entity database 4214 depends on the content 4203 and the personality used to define the information space surrounding the content.

The tracking module 4304 interacts with the text editor 4314. An example of a text editor is the Microsoft® Word editor. The tracking module 4304 monitors a user's input for auto-completion requests (e.g., via designated keystrokes) or for partially input words (e.g., characters string of 2 or more characters). In one embodiment, the tracking module 4304 is integral with the text editor 4314. In another embodiment, the tracking module 4304 operates independent from the text editor 4314, for example, as an optional plug-in to text editor 4314.

The query formulation module 4306 translates an auto-completion request received from the tracking module 4304 into a query that is passed onto the information retrieval module 4308. The information retrieval module 4308 accepts the query derived from the auto-completion request and searches the entity database 4214 for possible auto-completions that would be best used to auto-complete (i.e., match) the string currently input by the user.

The suggestion module 4310 either selects the most appropriate string match (i.e., high confidence completion) or presents a list that is ranked or otherwise ordered in a predefined form of the most appropriate alternative completions to the user of the text editor 4314. The user subsequently selects one or none of these alternative strings. If one of the alternative strings is selected, the insertion module 4312 takes the selected string for auto-completion and auto-completes the current input string by inserting the remaining characters of the selected string after the string fragment.

Although the example discussed herein is limited to query construction in a text auto-completion context, it will be appreciated by those skilled in the art that a similar analysis can be used for other types of objects that need be auto-completed. For example in alternate embodiments, entity fragments in the auto-completion system may include other objects for completion besides text objects, such as multimedia type objects. Multimedia type objects include any input sequence (e.g., from an input device such as a keyboard, mouse, interaction device such as a gesture recognition system, etc.), graphics object, sound object, and images object.

As such, the database of auto-completions 4302 is no longer just a list of text strings but list of tuples consisting of an access key (e.g., entity fragment), and of an object such as a string of words, a graphics object, and/or an input sequence, that is used to auto-complete a user's input. This object may have associated with it various attribute descriptions that make up other fields in the database tuple. For example, an auto-completion system for graphics would suggest the completion of a fourth side of a square once three or even two sides have been drawn.

Unlike traditional auto-completion systems, which typically use a static database of entities to auto-complete user's input and provide facilities for the user to add one's own auto-completion entities, the auto-completion system 4300 dynamically builds an auto-completion database of entities (text or otherwise) from the information space that can be created around a document using information space creation systems such as the meta-document server 200. Which entities are extracted, how they are extracted, and indexed in the auto-completion database is determined by the personality associated with the document. For example, bibliographic entries may only be important for scientific personalities.

Figure 44:
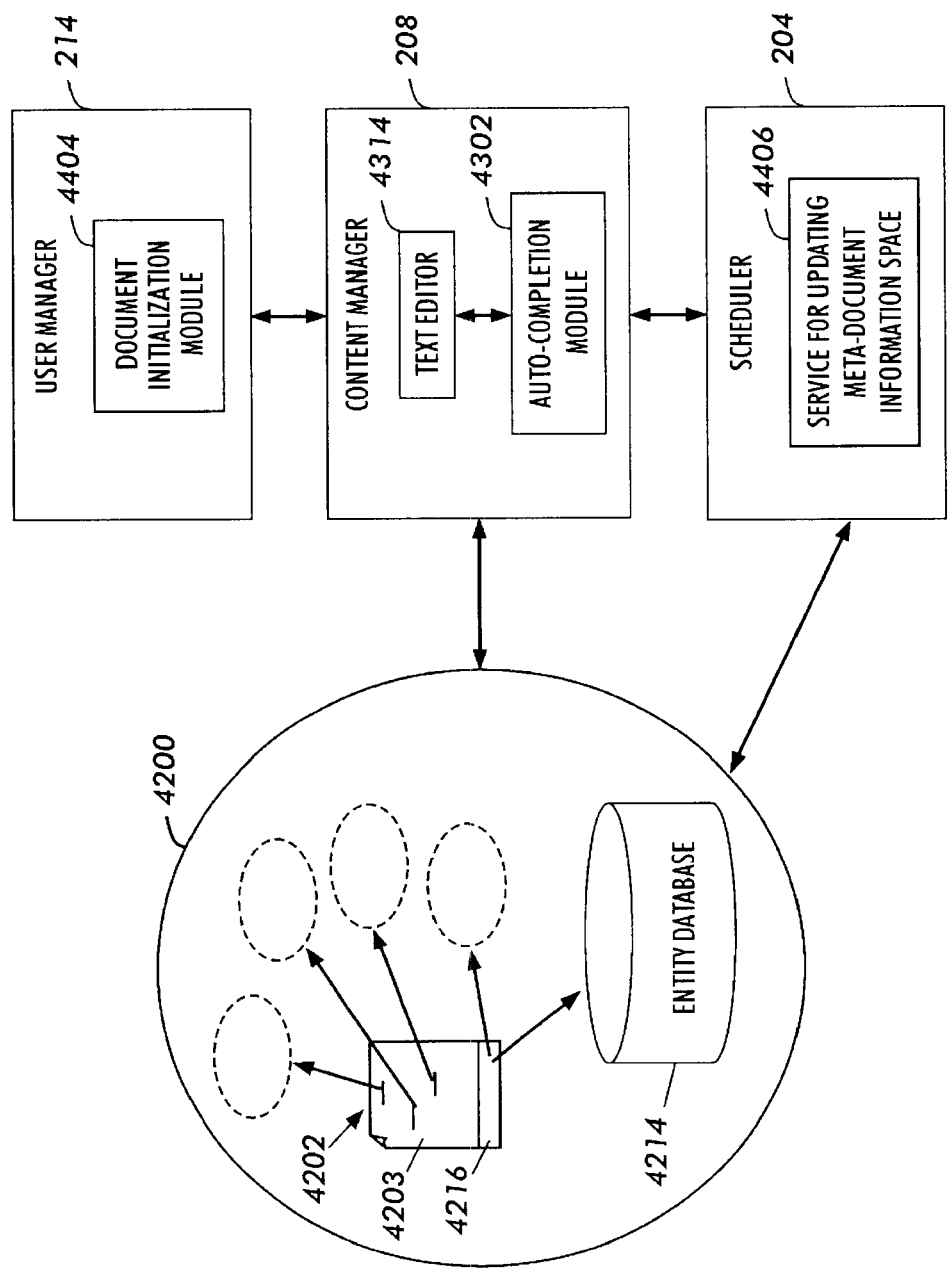
FIG. 44 illustrates an alternate embodiment in which an auto-completion module operates integrally with elements of the meta-document server shown in FIG. 2.

FIG. 44 illustrates an alternate embodiment in which the auto-completion module 4302 operates integrally with elements of the meta-document server 200 described above and shown in FIG. 2. This embodiment includes a document initialization module 4404 in the user manager 214 for initializing a meta-document with a name, a personality and other meta-values (e.g., access privileges etc.). For example, user operating computer 226 inputs and/or edits document content using text editor 4314 that forms part of the content manager 208 (or alternatively, part of computer 224).

While receiving input and/or edits to document content, the meta-document server 200 anticipates the information needs of the user creating and/or editing the document content by creating an information space around the document content that might be useful for the creator (and ultimately the reader) of the meta-document. As described above, this information can be linked to the document or inserted into the document. The meta-document server 200 dynamically maintains the information space 4200 such that newly inserted input by the user causes the system to update the meta-document's information space. Furthermore, some of the services of a personality used to create the document information space maybe be periodically carried out thereby resulting in new markup/content for the document as new content is added to the document.

G.2.1 Creating And Updating Auto-Completion Database Entries

Figure 45:
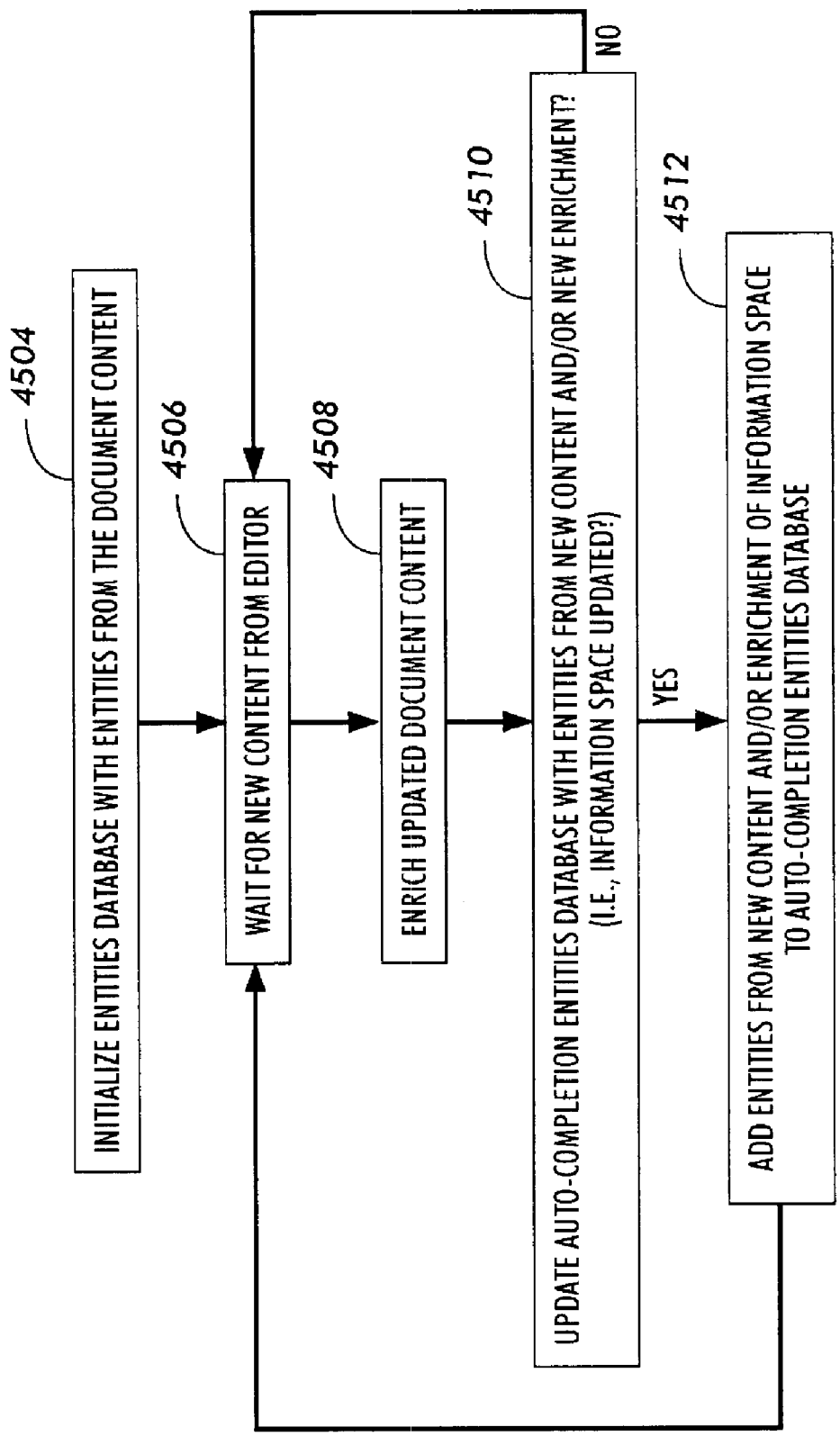
FIG. 45 is a flow diagram for creating and updating an entity database dynamically from the document information space.

In particular, the auto-completion system shown in FIG. 44 illustrates the manner in which the entity database 4214 is used for auto-completion, as well as, service 4406 for carrying out the process set forth in FIG. 45 for creating and updating the entity database 4214 dynamically from the document information space 4200. In one embodiment, the service 4406 accessed by scheduler 204 begins at 4504 by initializing the database with entities from lexicons associated with the personality that has been assigned to the meta-document. In alternate embodiments, the database is either initialized using an empty database or it is initialized using a database of domain specific lexicons. In operation, the lexicons are used to identify entities in the document content that are to be enriched by predefined services (see for example FIG. 4).

Subsequently at 4506, the module 4406 waits for a signal from text editor 4314 that document content 4203 has been added and/or edited. At 4508, the information space is updated based on the added and/or edited document content. At 4510, the updated information space (i.e., added and/or edited document content and enrichment associated therewith) is processed for entities that could potentially be used for auto-completion. At 4512, if extracted entities are deemed to be appropriate for auto-completion, then they indexed and inserted into the database of entities 4214; otherwise, or upon completion of 4512, the service 4406 waits for additional signals from the editor 4314.

As illustrated in the flow diagram shown in FIG. 45, populating the auto-completion database is an ongoing process, which involves scanning the dynamic information space of the document for entities that could prove useful for auto-completion. The process of entity extraction for auto-completion varies according to the type of entity extracted. Considered first is text based entity extraction. A text-based entity is defined as a word or collection of words that appear contiguously in the document information space.

An entry that is inserted into the auto-completion database for a text entity as shown for example in FIG. 48 includes: (a) a key or multiple keys (e.g., all possible n-grams, such as bi-grams or tri-grams, that make up a word or phrase) for specifying entity fragments to be searched; (b) the expanded entity relating to the entity fragment (i.e., word or words making up the entity, which may be delimited by punctuation characters such as spaces, fullstops etc. or using grammar rules which chunk words together into semantic entities such as noun phrases, verb phrases etc.); (c) any markup (such as hyperlinks, cross-references, footnotes etc.) that is associated with the entity; (d) any formatting (such as bold, italic, font size, etc.) that is associated with the entity; (e) the origin of the entity (e.g., location of the document containing the entity, segment containing the entity, etc.); (f) the position of the entity at its origin; (g) an identified part of speech of the entity at its origin; and (h) the context (e.g., categorization) of the entity at its origin.

Other types of information stored in the database that are useful for suggesting more accurate completions include bibliographic entries and related citations. Such entries and citations can be stored in the database as markup and recognized using known pattern recognition techniques and machine learning techniques such as hidden Markov models. Once recognized, this markup can be stored in the auto-completion database in similar fashion as the entities. The key in the case of a bibliographic entry could consist of the authors names, a subset of the characters that make up the authors names, or the citation associated with the bibliographic entry.

In addition, generic objects can also be recognized and recorded in the auto-completion entity database. A generic object can viewed as being made up of a sequence of inputs such as mouse movements, mouse clicks, keyboard inputs, human gestures as identified by a gesture recognition system, and facial expressions as recognized by facial recognition system. Such input sequences can be stored in the auto-completion database and be indexed by the first n inputs in the sequence. For example, consider an input sequence that consists of four straight lines that form a rectangle. This sequence could be retrieved and used for auto-completion of rectangles once the first one or two lines have been input, thereby alleviating the need for drawing the rest of the rectangle. These input sequences could be identified automatically using known data mining techniques, which search for general patterns in the input sequence.

It will be appreciated by those skilled in the art that when using the method outlined in FIG. 45 for populating the auto-completion entity database, the entity database can grow to be prohibitively large, therefore, some entity selection algorithms should be used at 4510 to select which entities will provide the most benefit to the user in terms of time saved through auto-completion of these entities. For example, text based entities could be selected based on the length or the utility of the entity or combination of these.

Alternatively, utility measures such as Zipf's law could be used for entity selection. Zipf's law, which is well know in the art, concerns the distribution of different words in a corpus such as the information space surrounding a document, the online content available through the World Wide Web or some other domain specific corpus or a combination of the aforementioned. Zipf's law states that the product of a word's rank (r) and frequency (f) is a constant (C) i.e. r*f=C. Consequently, words/phrases that occur very rarely may ignored by the auto-completion system. In another embodiment, text terms could be selected based on the part of speech tags. For example, select only noun phrases from the information space.

Also, other factors such as the length of entities, highlighting information (i.e. are headings, bold, hyperlinked, etc.), markup information (such as hyperlinks, footnotes etc.), location of the entity in a document, its frequency in a document (or within a corpus) could used any combination to determine the utility of inserting the entity into the entity completion database.

Additional factors include, heading information, footnoted, hyperlinks, comment. The weights associated with each of these factors in one embodiment be a uniform weight for each factor (i.e., uniform weight=one/number of factors). Alternatively, each weight can be set by a user, or determined automatically using known optimization techniques such as Powell's direction set minimization techniques or genetic algorithms.

G.2.2 Document-Centric Auto Completion

Figure 46:
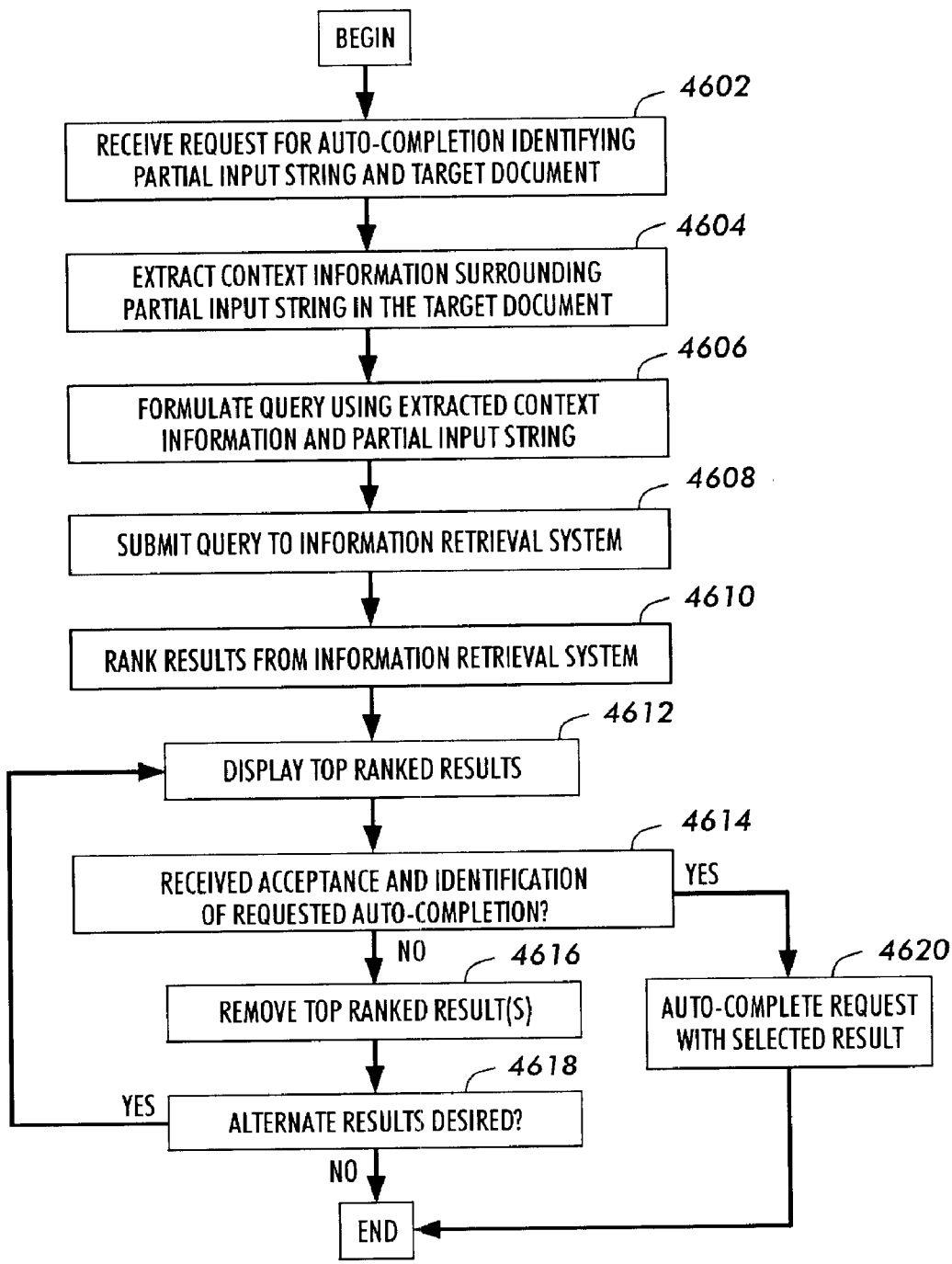
FIG. 46 illustrates a flow diagram for selecting words using the auto-completion system shown in FIG. 44.

FIG. 46 illustrates a logic flow diagram for selecting words using the auto-completion system shown in FIG. 44. In box 4602, a request for word auto-completion is received. In one embodiment, a user types in the initial characters of a word (e.g., the first two, three, four, etc. characters of a word). The user may then invoke an auto-completion process in module 4302 by selecting a request key such as a right arrow key on a keyboard. In alternative embodiments, the system may automatically invoke auto-completion without having to be prompted by a user.

Once the auto-completion process is invoked, the string of characters typed by the user, hereafter referred as the string fragment or more generally referred to as the entity fragment, is used at 4604 to extract context information using content surrounding the entity fragment in the document content 4203 to which the entity fragment is targeted, herein also referred to as the target document. In one embodiment, portions of the target document (e.g., the paragraph preceding the text fragment in the target document, all text currently forming the document content, etc.) are categorized using the categorizer 3610 to define a category (e.g., from a DMOZ ontology) to which content surrounding the text fragment in the target document relates.

Subsequently, a query is formulated at 4606 using the extracted context information and string fragment. In one embodiment, the query can simply be the string fragment. In alternative embodiment, the query can be expanded using various contextual information that may lead to more accurate suggestions for completion. For example, the auto-completion system could process the sentence of which the string fragment is a member using linguistic processing tools such as XeLDA (Xerox Linguistic Development Architecture) described in U.S. patent application Ser. No. 09/221,232, which is incorporated herein by reference.

This linguistic processing could lead to further requirements on the entities that could be considered for auto-completion. For example, linguistic processing could determine that a noun phrase is the most likely word(s) to be input next. This expectation can be incorporated into the query thereby limiting the search to noun phrases beginning with the string fragment. The query could be as follows: key="dig"+Part-of-speech-tag=noun phrase.

As described at 4606, additional information, such as the classification of the document into categories using the DMOZ ontology, could be used also to reduce the search space. For example, if the currently input document is a document about SubjectX then the query can be further refined to stating the classification of the document where these candidate strings occur must be about SubjectX. Consequently, the query in this case could be the following: key="dig"+Part-of-speech-tag=nounphrase+class_of_document=SubjectX.

At 4608, the formulated query is submitted to the information retrieval system 4308 in the auto-completion module 4302. In operation, the information retrieval system 4308 locates matches subject to the constraints specified in the query using known matching techniques. The matched items are retrieved and ranked based on their level of appropriateness for completion (i.e., how well they satisfy the query constraints and possibly additional constraints such how near each matched item is to a previously completed item) at 4612. The top ranked match that contains the same (or similar) initial characters typed by the user is displayed for user acceptance at 4614. In an embodiment, the suggested completion is displayed in a fashion that is distinct from the text that the user has typed. For example, if the user's text is shown in black, the completion will be shown in gray.

If a user accepts the word match offered in decision box 4614, then that word is selected for copying into a target document as shown in box 4620. For one embodiment of the present invention, the user accepts the completion by continuing to type text into the target document. Once the word auto-completion process is completed the user may continue typing into the target document or may repeat this word auto-completion process.

If a user rejects the word match offered in decision box 4614, then the top ranked match is removed from the list of possible completions. For one embodiment of the present invention, the "up arrow" key is used both to reject the present completion and to request an alternative completion. If an alternative match is desired in decision box 4618 after removing top ranked results at 4616, then the alternative word match is displayed for user acceptance in box 4612. Boxes 4612, 4614, 4616, and 4618 are repeated as long as the user keeps rejecting the offered word match and additional matches are available.

Once no alternative word matches are available in decision box 4618, then the auto-completion of the string fragment terminates. The user may stop the system from cycling through the already rejected word matches by selecting an "END" key, or deleting the most recently offered word match.

G.2.3 Examples Of Document-Centric Auto Completion

Figure 47:
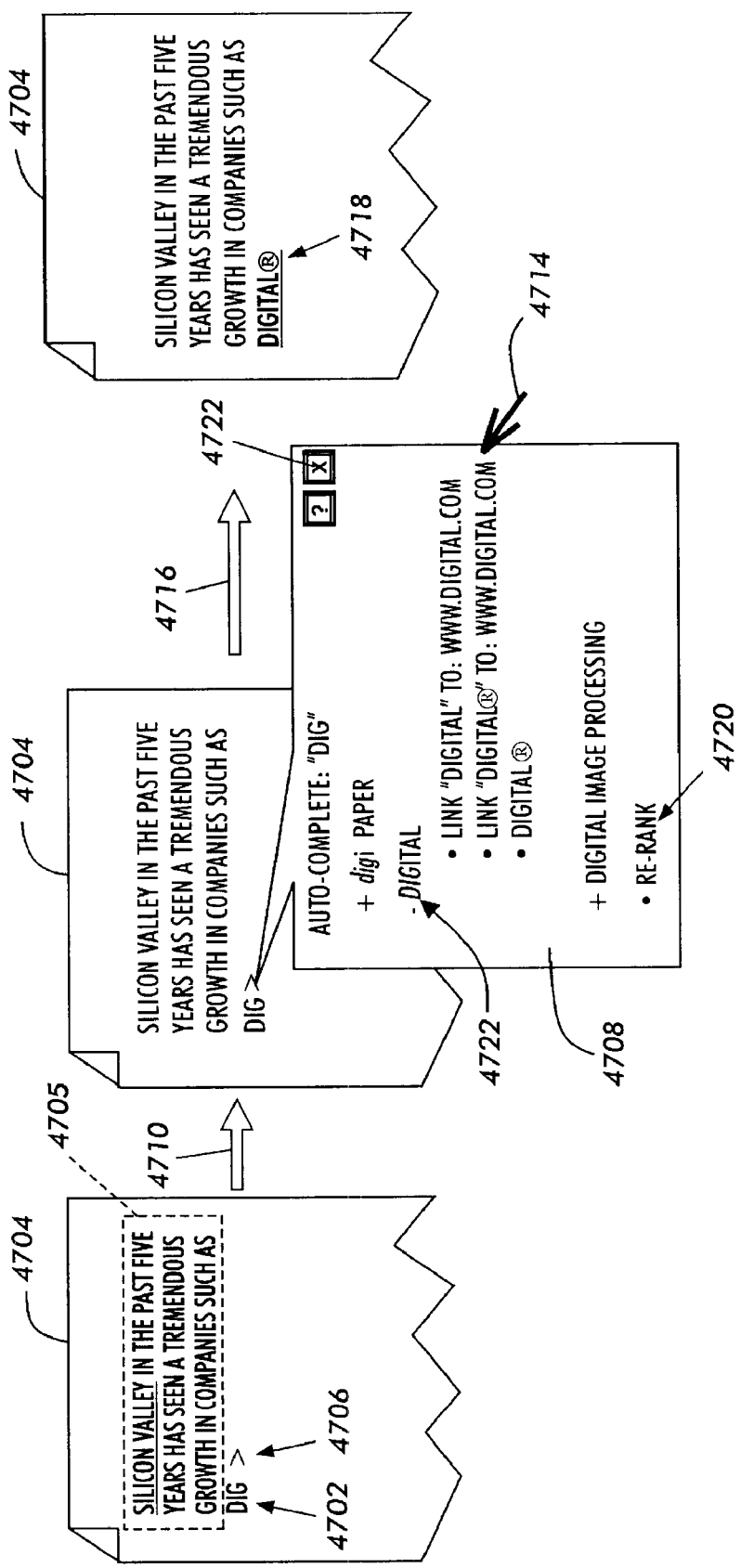
FIG. 47 illustrates an example of the auto-completion process performed using the auto-completion entity database presented in FIG. 48.

FIG. 47 illustrates an example of the auto-completion process performed using the auto-completion entity database presented in FIG. 48. More specifically, FIG. 47 illustrates an example of string fragment "dig" 4702 of a target document typed by a user into a window 4704 in which a text editor operates. Once the user invokes the auto-completion process using the example special character ">" 4706, the system in one embodiment identifies context using document selection 4705. Note that document selection 4705 can either be manually (i.e., by a user) or automatically (i.e., by the system) selected, as specified for example in user preferences of the text editor.

Subsequently as indicated by arrow 4710, a document category is identified using for example a DMOZ ontology using the document selection 4705 and a categorizer to define a context for the string fragment 4702. The context information (e.g., science) is used to limit the search for matches between the string fragment and entries in the key column of the auto-completion entity database shown in FIG. 48. In addition, matches identified in popup window 4708 can be limited and/or ordered by comparing part of speech information relating to the string fragment 4702 using the document selection 4706 and the part of speech information relating to entities in the auto-completion entity database shown in FIG. 48. After the auto-completion system identifies one or more matches, the sorted results are displayed for user acceptance as shown in popup window 4708.

A user may accept an offered word or phrase by selecting one of the available choices in the popup window 4708. In one embodiment, the popup window 4708 contains the highest-ranking matches, where each match can be expanded to find additional specifics on each match. A simpler interface is a popup window that displays only the highest-ranking match. In the example shown in FIG. 47, the entity "digital" 4722 is expanded to include three different possible forms that the entry may take. Each subentry of the entry 4722 is derived from the information in the auto-completion database shown in FIG. 48.

Generally, the entries and subentries in the popup window 4708 may contain a word or a word sequence that are displayed in a unique manner to indicate that it is being offered to the user for acceptance. If the offered word(s) are accepted, feedback is provided to the user that these words were selected for copying into the target document. Note that the entry or entries offered to the user may be one word, a phrase, all words until the end of a sentence, all words until the end of a paragraph, or some other grouping of words.

An alternate embodiment of presenting suggested completions of the entity fragment is to provide snippets/segments of the document from where the suggested completions were extracted using the origin information associated with each indexed entity in the auto-completion database possibly in a separate sub-window. These snippets/segments can be presented in their original format recorded in the auto-completion database or in more standard format such as the format of the target document. Furthermore, the first word/phrase match is displayed with additional emphasis. The first word/phrase match can be displayed with additional emphasis (e.g., highlighted) to indicate that it is being offered for user acceptance.

After a word or phrase is accepted by a user (e.g., simply by clicking with a pointer thereon) in the user in popup window 4708 as indicated by arrow 4716, then feedback is provided to the user in that the word match was selected and copied into the target document with appropriate formatting and/or enrichment (e.g., links to other content). If the user decides to stop the auto-completion process, then the auto-completion process is terminated. Otherwise, additional word(s) may be offered to the user for user acceptance by selecting RE-RANK at 4720. The auto-completion process terminates if the user decides to do so by selecting 4722 or automatically if no new words are offered to the user (e.g., it loops back to the first word matched).

In a variation of the auto-completion system, the auto-completion system is used with a voice recognition system to complete word formulations such as individual names. For example, orally the computer can be asked, please suggest names with first name Bob and last name beginning with the letter "F". In yet another variation, words that have already been auto-completed in the target document can be cached and used for future auto-completions in the target document.

G.2.4 Document-Centric Auto Correction

Figure 49:
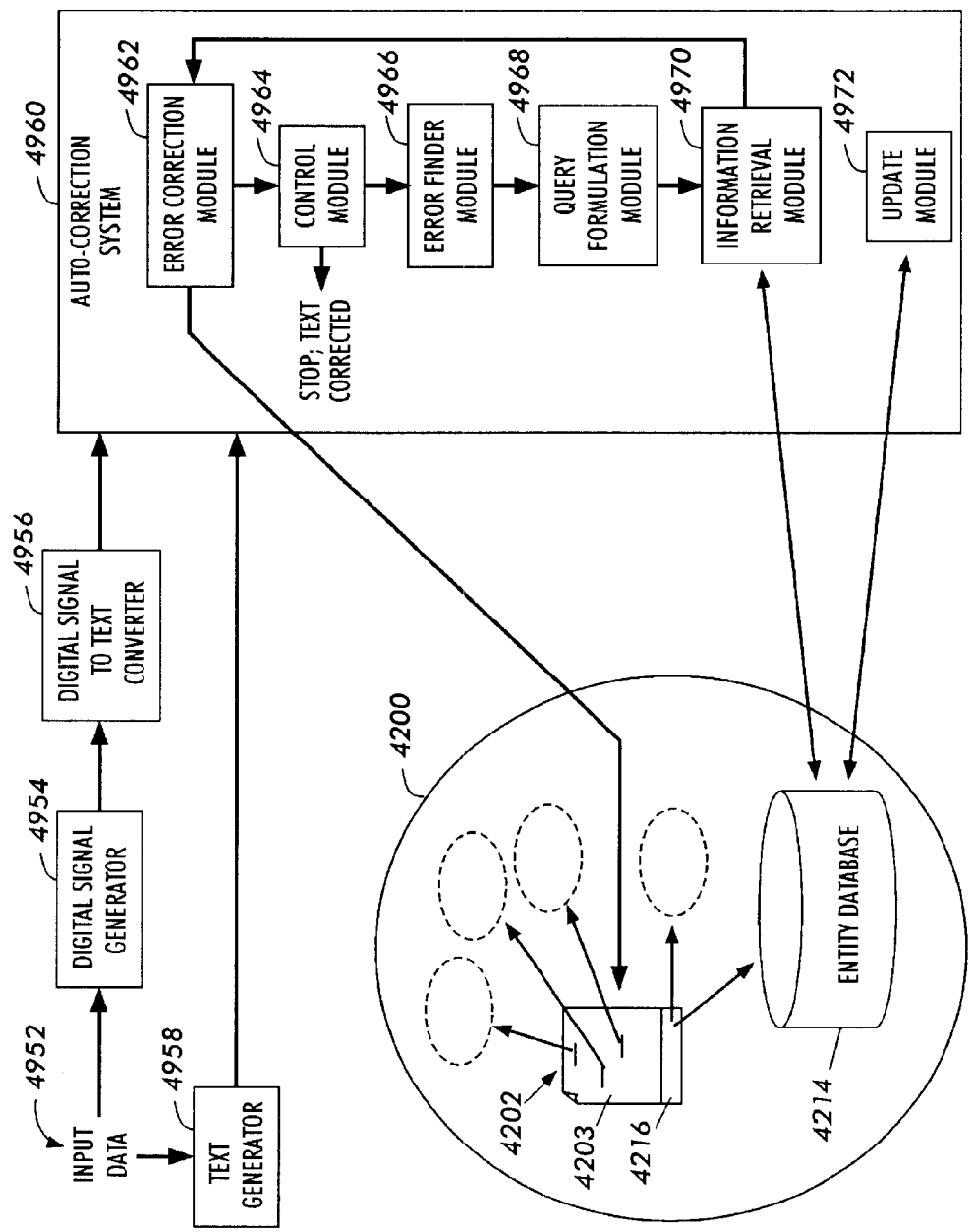
FIG. 49 illustrates a document-centric auto-correction system that iteratively corrects errors in meta-document using a meta-document information space.

FIG. 49 illustrates a document-centric auto-correction system 4960 that iteratively corrects errors in meta-document 4202 using information space 4200. The original (i.e., non-corrected) document content 4203 in meta-document 4202 originates from input data 4952 which may be generated by a digital signal generator 4954 (e.g., scanner) and converted to text by converter 4956 or which may be generated by text generator 4958 (e.g., editor). The converter 4956 may for example perform OCR of scanned text, ICR (Intelligent Character Recognition) recorded handwriting, and speech to text recognition.

The auto-correction system includes modules for performing error correction. These modules operate in accordance with the process set forth in the flow diagram shown in FIG. 50. Initially at 5000, control module 4964 receives a text object either from text generator 4958 or text converter 4956. Subsequently at 5018, the control module 4964 initializes the number of iterations of correction performed to the text object by the auto-correction system 4960 to zero, and in addition at 5020 a personality is attached to the text object.

Once a personality is attached to the text object, the control module 4964 spawns a thread for developing information space 4200 at 5022. The spawned thread runs in update module 4972 concurrent or in parallel with the subsequent action 5024 of waiting a predefined period of time for a signal that the entity database has been updated.

After the spawned thread in update module 4972 initially develops the information space around the attached personality at 5008, the entity database 4214 is extracted from the information space 4200 at 5012. These two actions are performed as set forth above in section for the auto-completion system described in section G.2. Subsequently at 5014, the thread raises a signal that the entity database 4214 has been updated and determines whether the information space has been modified at 5010.

If the information space has been modified at 5010, then the thread repeats action 5008 to further develop the information space 4200 and thereafter repeating actions 5012 and 5014. In the event the information space has not been modified at 5010, then a determination is made as to whether the text object has been corrected at 5002. If the text object has been corrected, then the thread terminates at 5004; otherwise, the action of determining whether the information space has been modified at 5010 is repeated.

After waiting the predetermined period of time for a signal that the entity database has been updated at 5024, errors in the text object (i.e., document content 4203) are identified and corrected at 5026. Subsequently, the number of iterations performed is incremented at 5028. At 5030, if the difference between the number of errors corrected at the current iteration and the number of errors corrected at the previous iteration is less than a threshold value, then the text object is determined to have been corrected at 5032 (which triggers a positive evaluation at 5002 terminating the thread); otherwise, the act of waiting a predefined period of time for a signal that the entity database has been updated at 5024 is repeated.

Figure 50:
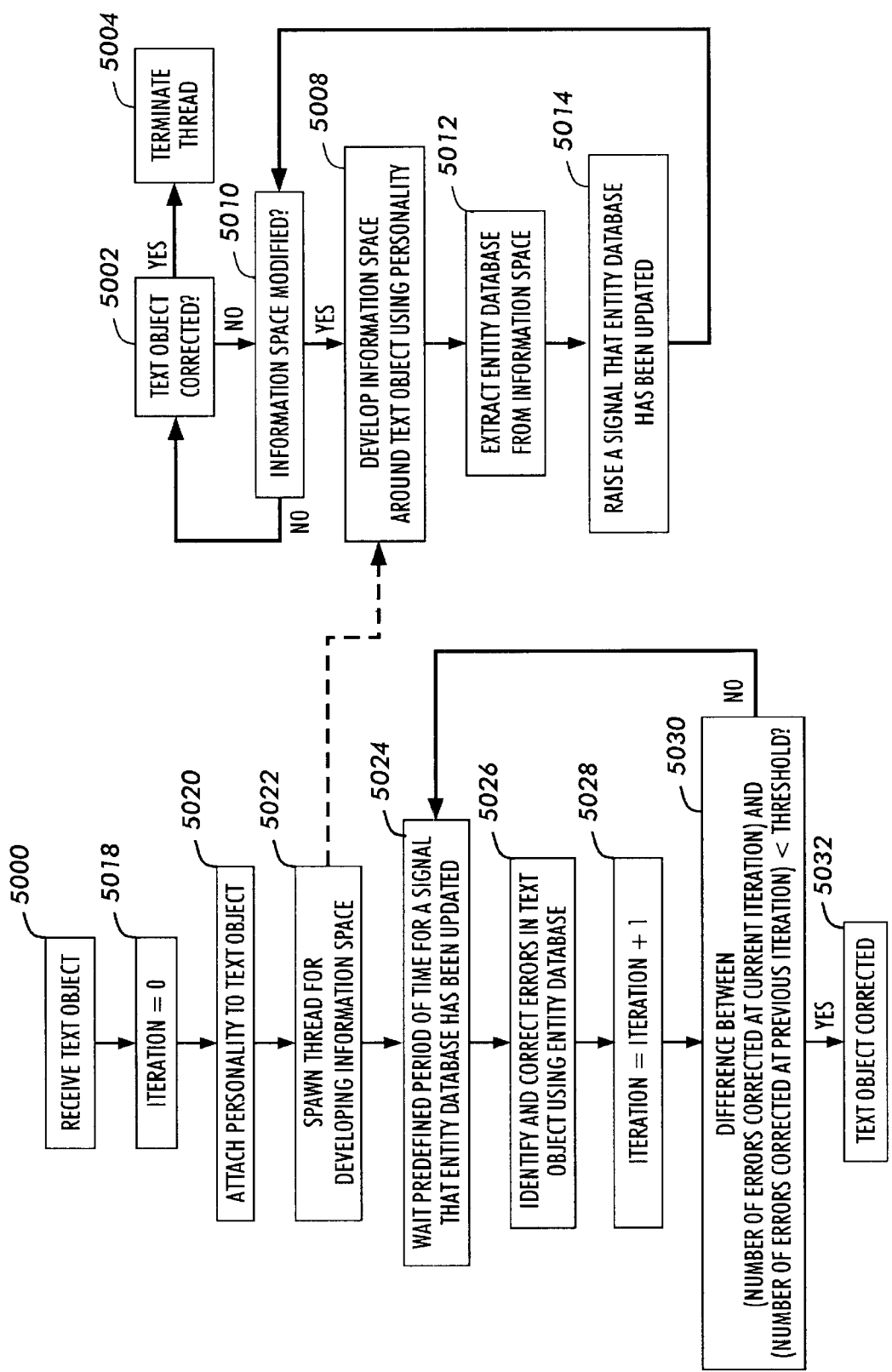
FIG. 50 is a flow diagram for performing error correction using the system shown in FIG. 49.
Figure 51:
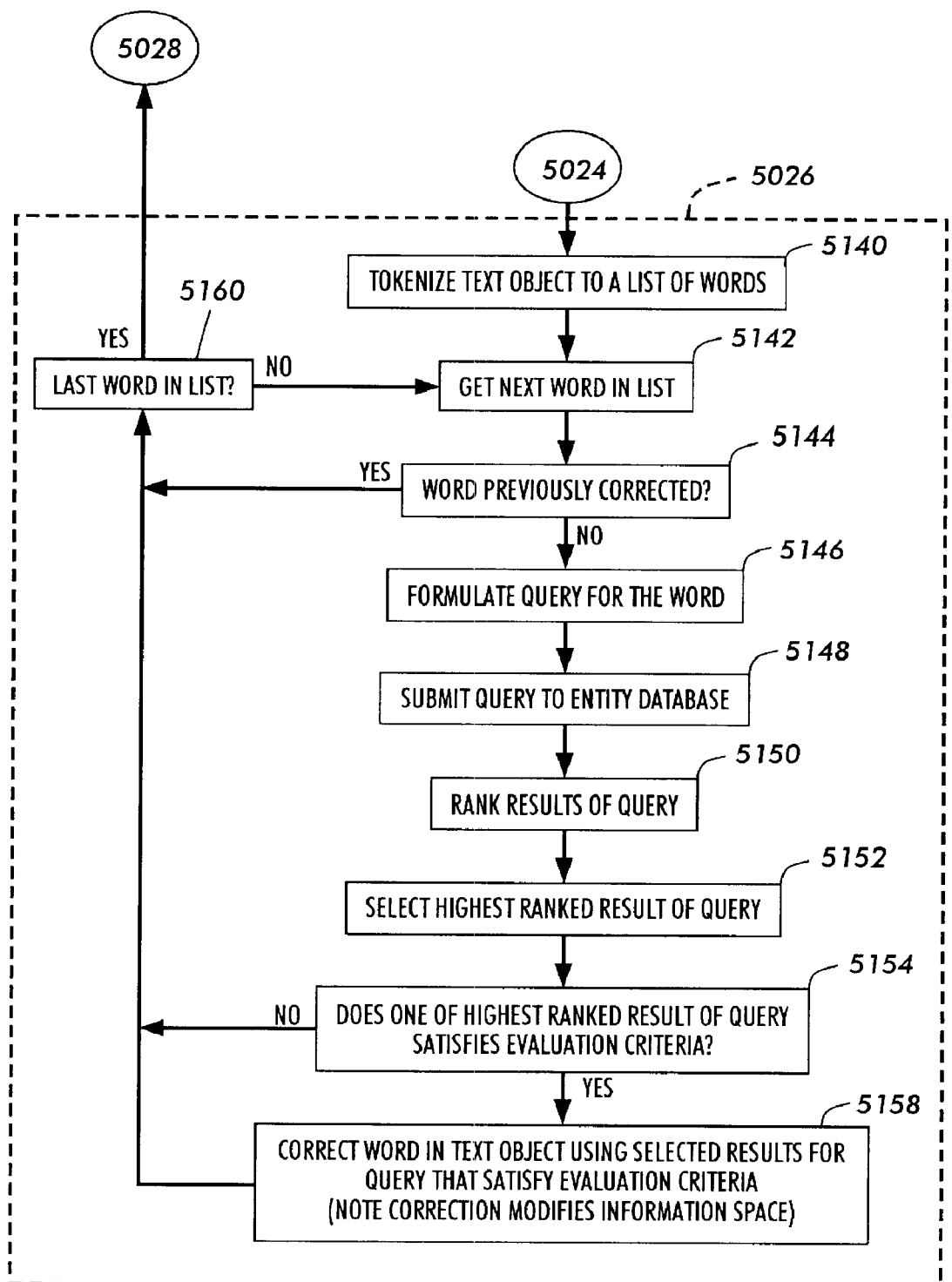
FIG. 51 is a flow diagram depicting a process for identifying and correcting errors in document content for act 5026 shown in FIG. 50.

FIG. 51 is a flow diagram depicting a process for identifying and correcting errors in the text object (i.e., document content 4203) using the entity database 4214, at 5026 in FIG. 50. The process performed in FIG. 51 is performed by the following modules in combination: error finder module 4966, query formulation module 4968, information retrieval module 4970, and error correction module 4962. Initially at 5140, the text object is tokenized to a list of words. For a next word in the list of words at 5142, it is examined to determine whether it has already been corrected at 5144. If it has been corrected, then a determination is made whether the word was the last word in the list at 5160. If it was the last word then this iteration of act 5026 terminates; otherwise, the next word in the list is processed at 5142.

When a word has not been previously corrected at 5144, then a query for the word is formulated at 5146. Formulating a query involves generating a query string that includes context information obtained from content that surrounds the word in the text object. At 5148, the query is submitted to the entity database 4214. The results from the query are ranked at 5150, from which the highest ranked results are selected at 5152. Ranking techniques are described in section E.2 above.

At 5154, the highest ranked results are evaluated to determine whether any or one in particular satisfies or best satisfies evaluation criteria. The evaluation criteria include information associated with the entity or word being evaluated in the entity database 4214. The entity database includes such information at POS information, text category, and entity type, as shown in FIG. 33. This information is matched against results using an evaluation criteria. An example of an evaluation criteria is the following: accept the highest ranking word if the word used in the act 5146 to formulate the query is not found in the first ten elements of the ranked results in 5150. If a result of the query is identified that satisfies the evaluation criteria, then it is used to correct the word in the text object at 5158. If no result of the query is found to satisfy the criteria at 5154 or the object word has been corrected at 5158, then the process continues at 5160 unless it is the last word in the list.

Correcting a word in the text object at 5158 modifies the information space 4200, which in turn causes the thread to determine at 5110 that the information space has been modified. In effect, each time the auto-correction system 4960 corrects at least one word, the text object in document content 4203 is modified. Each time the text object is modified, the information space around the document content can be further developed in accordance with personality attached to it. Modifying the information space in turn causes change to be made to the entity database.

In one embodiment, the information space is developed through multiple iterations, as auto-correction changes are added to it such as spelling corrections and/or content enrichment such as adding hyperlinks, copyright, and citation information to identified entities or words in the corrected textual content.

In an alternate embodiment, the auto-correction system 4960 in addition to textual objects processes image objects, and/or graphics objects. As set forth above, textual objects may be derived from handwriting, scanned textual content, converted audio. Image content may be in the form of scanned images, for example. In such an alternate embodiment, the document-centric auto-correction system performs graphics corrections. In this embodiment, graphics elements that have been drawn are evaluated and determined if they are have errors. Suggestions can be provided in the case when the shape comes close to a predefined shape such as a square. For example, if a four-sided object has three sides that are the same length and a fourth side of different length, the system would suggest that the fourth (shorter length side) should be longer.

In one specific embodiment, a digital copier first scans a document and identifies text, graphic, and/or image content in the scanned document. This scanned information is automatically processed by the auto-correction system 4960 before being rendered on a hardcopy document. This embodiment permits scanned document content to be enriched and corrected before being rendered on a hardcopy document. Such corrections include performing image, copyright, citation, and spelling corrections.

Image corrections include identifying that an image (or any other content for that matter) set forth in the document content 4203 is not original by being, for example, degraded in some form. The auto-correction system 4960 would identify the original image in the information space 4200 surrounding the document content 4203. Once original content is identified, it is automatically put in place to correct the document content 4203.

G.3 User Directed Enrichment

This section specifies a further service offered by the meta-document server 200 after uploading and/or authoring a document thereon. In particular, this section discloses a method for formulating directed searches on heterogeneous sources of information such as the World Wide Web, and proprietary databases while authoring a document. The directed searches provide an alternative mechanism for gathering document enrichment that is formulated by the user. Advantageously, the document enrichment services allow a user to define a parameterized specification of enrichment and where the enrichment is to take place in the authored document content. That is, in authoring document content the service enables a user to request enrichment of identified content so that enrichment identified by the meta-document server may be integrated in real-time as a document is being authored.

Figure 52:
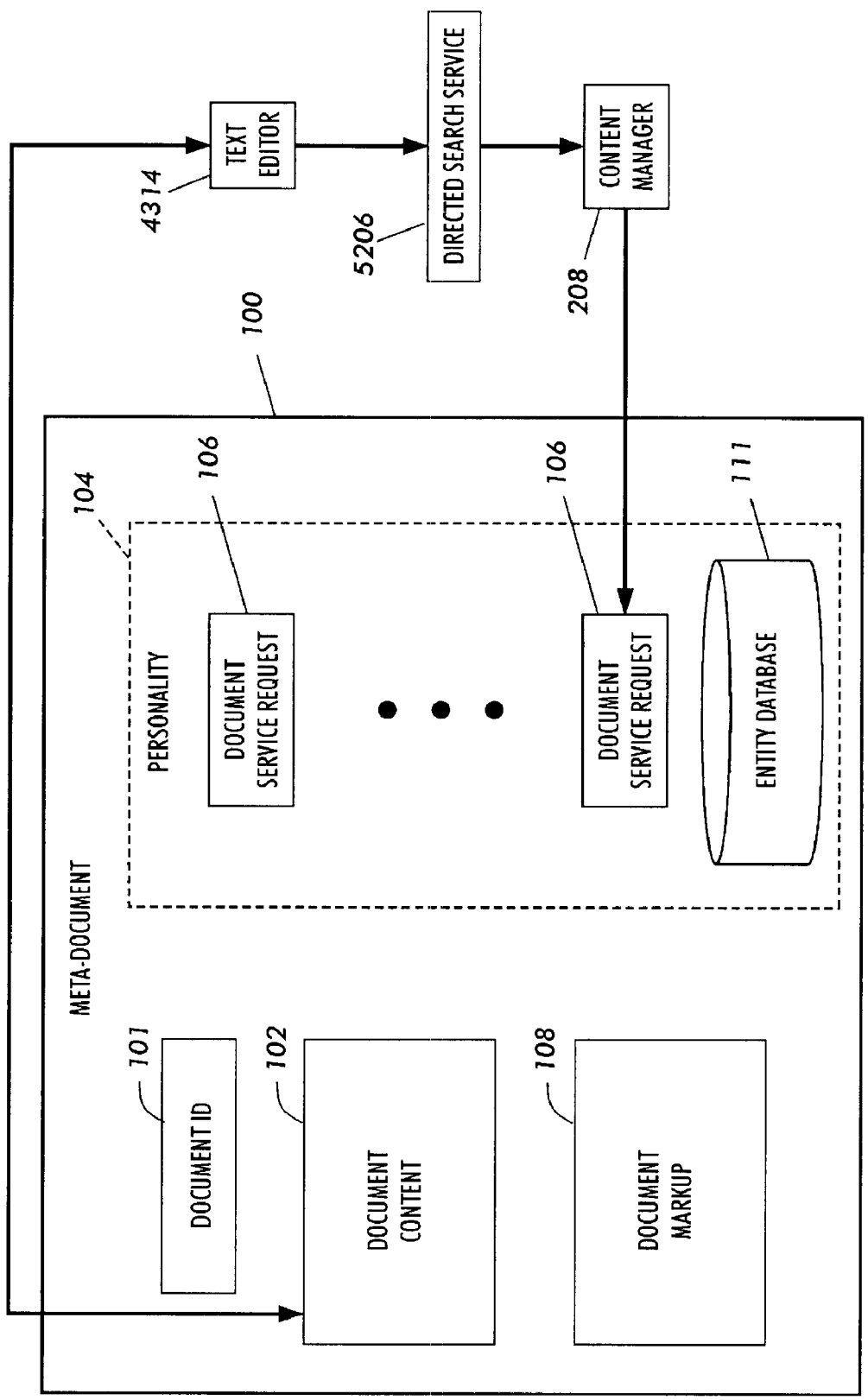
FIG. 52 illustrates a block diagram of the elements for forming a directed search.

FIG. 52 illustrates a block diagram of the elements for forming a directed search. A user authoring the meta-document 100 using the text editor 4314 initiates directed search service 5206 that forms part of services database 210 in the meta-document server 200 shown in FIG. 2 using a control keyboard function key, a window control button, or the like for interrupting the text editor 4314. The text editor 4314 may be any word processor adapted to edit textual content as well as possibly other content such as graphics data and image data. In addition, the text editor 4314 may be integrated with applications that provide and/or perform a variety of functions such as spreadsheet applications and database applications, and need not be strictly limited to word processing.

Figure 53:
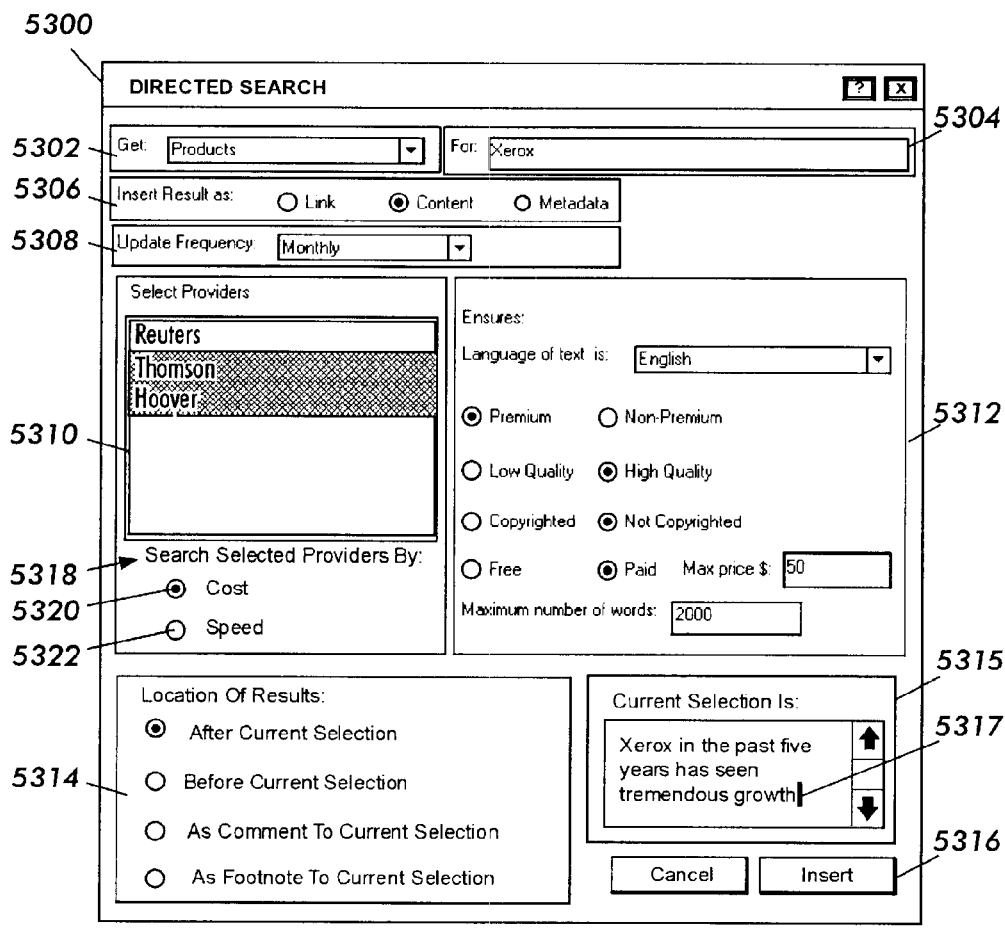
FIG. 53 illustrates an example of a user interface for invoking a directed search.

Once invoked, the directed search service 5206 makes available to the user an interface as shown for example in FIG. 53 that provides the user with the ability to qualitative and quantitative specify criteria for the search. Once specified, the content manager 208 inserts the specified search criteria into a new document service request 106 of the meta-document 100. Scheduler 204 operating in meta-document server 200 as described above then initiates the new document service request 106.

FIG. 53 illustrates one embodiment of a user interface 5300 for specifying a directed search, which can be invoked by selecting window control button 1040 in client interface 1010 (shown in FIG. 10). In the interface 5300, the user is given the ability to specify a plurality of criteria for the search. At 5302, the user is able to select search criteria for performing the search. The search criteria in one embodiment may be specified using a service from services database 210. More generally, service requests may be launched while editing or viewing a document in any application program enabled with directed search capabilities. In this more general embodiment, a directed search may be invoked by selecting with a pointing device a particular section of a document while the document is being edited or viewed. In this general embodiment, settings of the directed search may be specified in a popup window similar to interface 5300 or automatically using a set of user and/or system specified default settings.

At 5304, the user is able to specify parameters of the selected search criteria (e.g., service) at 5302. At 5306, the user is able to specify the form of enrichment, which include links, content, or metadata. Links can be passive links or active links (e.g., a URL to a CGI-BIN script). Content can be formatted using the format of the original document content. Metadata can include predefined formatting specified by for example the user or the content service invoked. At 5308, the user is able to specify how frequently the search should be performed (e.g., once, daily, weekly, monthly, etc.).

In addition at 5310, the user is able to specify and/or select from one or more information service providers (i.e., information source). In the example shown in FIG. 53, Thomson and Hoover as shown as selected information service providers, whereas Reuters is not. In the event the user does not specify an information service provider, one or more service providers will be automatically selected at runtime using other search criteria specified by the user in the request. Furthermore, of the information providers selected at 5310, the user is able to rank the order in which these selected information providers are to be used to carry out the directed search at 5318. For example in FIG. 53, the user is provided with the option of either specifying that information service providers should be searched by cost (i.e., use those selected information providers that charge less first) at 5320 or by speed (i.e., use those selected information providers that will carry out the search the fastest) at 5322.

In alternate embodiments, ranking criteria may also include an alphabetical ordering, a predefined user specified ordering, a quality ordering (i.e., rank those information providers that provide the highest quality service first, independent of cost), preferred customer ordering, and privacy ordering (i.e., rank those information providers with the best privacy policy first). In yet another embodiment, multiple ranking criteria can be selected and ordered at 5318 and later used to select which of the information providers specified at 5310 to first carry out the directed search.

At 5312, the user is able to specify parameters for the content identified by the information source(s) selected at 5310. These parameters include specifying the language of the content, whether the content is premium (i.e., whether the user is willing to pay for it), the quality (i.e., higher quality content is more expensive), whether copyrighted (i.e., from a copyrighted source), whether free or fee-based, the maximum expenditure of a fee-based search, and the maximum length (e.g., in words) of retrieved content. Automatic summarization can be used to reduce content that exceeds the maximum number of words specified by a user, such as described in U.S. Pat. No. 5,384,703, which is incorporated herein by reference.

At 5314 the user is able to specify exactly where and how the enrichment is to occur in the authored document content. In the embodiment shown in FIG. 53, the user is able to specify that results in the form specified at 5306 are to be inserted at for example: (a) after the current selection of the user; (b) before the current selection of the user; (c) as a comment to the current selection; or (d) as a footnote to the current selection. The current selection is the selection of document content last specified before invoking the interface 5300. To aid the user, the current document selection is reproduced at 5315. If no specific word is selected, then a location is identified using some indicia 5317. In either case, whether the content identified before invoking interface 5300 are words, images, and/or graphics, context surround the content is provided at 5315.

To formulate output of the directed search specified in the interface 5300 for the meta-document, the insert button 5316 is selected by the user. FIG. 54 illustrates an example of the output of the directed search specified in FIG. 53. Specifically, FIG. 54 shows XML tagged translations 5400 of the information entered in the interface 5300. This document service request once invoked by the scheduler 204 will lead to the execution of a query. As set forth above the meta-document server as shown in FIG. 4 executes a document service request that may fetch, filter and/or summarize content. The results of the query in the form of additional document markup 108 are then added to the meta-document 100.

In the event the service provided by a content service provider is fee-based, then the rights of material are purchased within the constraints specified by the user. Such purchases may for example a rights management services such as ContentGuard™. Document content 102 that is inserted and/or annotated can be color coded to indicate that it is fee-based content. In addition, color-coding can be used to indicate that a copyright to the content has or needs to be acquired. For example, if the maximum set price by a user is exceeded for document content, a notice can be inserted in the document content indicating that enrichment exists for the particular location by a particular content provider at an identified price.

G.4 Exporting/Importing Enriched Documents

This section describes a service for exporting and/or importing enriched meta-documents. This service allows user to exchange meta-documents that have been enriched at different meta-document servers. Generally, a meta-document is exported using an exchange format that includes specifying and/or describing all or portions of the meta-document 100 shown in FIG. 1. The exchange format allows binding between identical or dissimilar meta-document formats. The exchange formats can be represented using one or more exchange files using any appropriate media (e.g., email). In the event an imported exchange file is dissimilar to the exchange formats of the importing meta-document server, a method is provided for binding any dissimilarities with services and/or personalities available at the importing meta-document server. The binding of dissimilarities are tracked so that the meta-document can be exported to the originally exporting meta-document server and accurately re-mapped to the importing meta-document server.

The exchange process is initiated when a command is received to either import and/or export a meta-document. The exchange process can be used for exchanging meta-documents with another meta-document server and/or for archival or backup. In one embodiment, the exchange process is invoked by selecting import/export button 1050 at client interface 1010 shown in FIG. 10. It will be appreciated, however, that a meta-document exchange can be initiated either manually, semi-automatically, or automatically by a user and/or a system depending on the particular purpose for using the exchange process. In response to a command to export/import one or more selected meta-documents, the exchange process is invoked.

In one embodiment, the exchange process operates as part of content manager 208 in meta-document server 200 (shown in FIG. 2).

Figure 55:
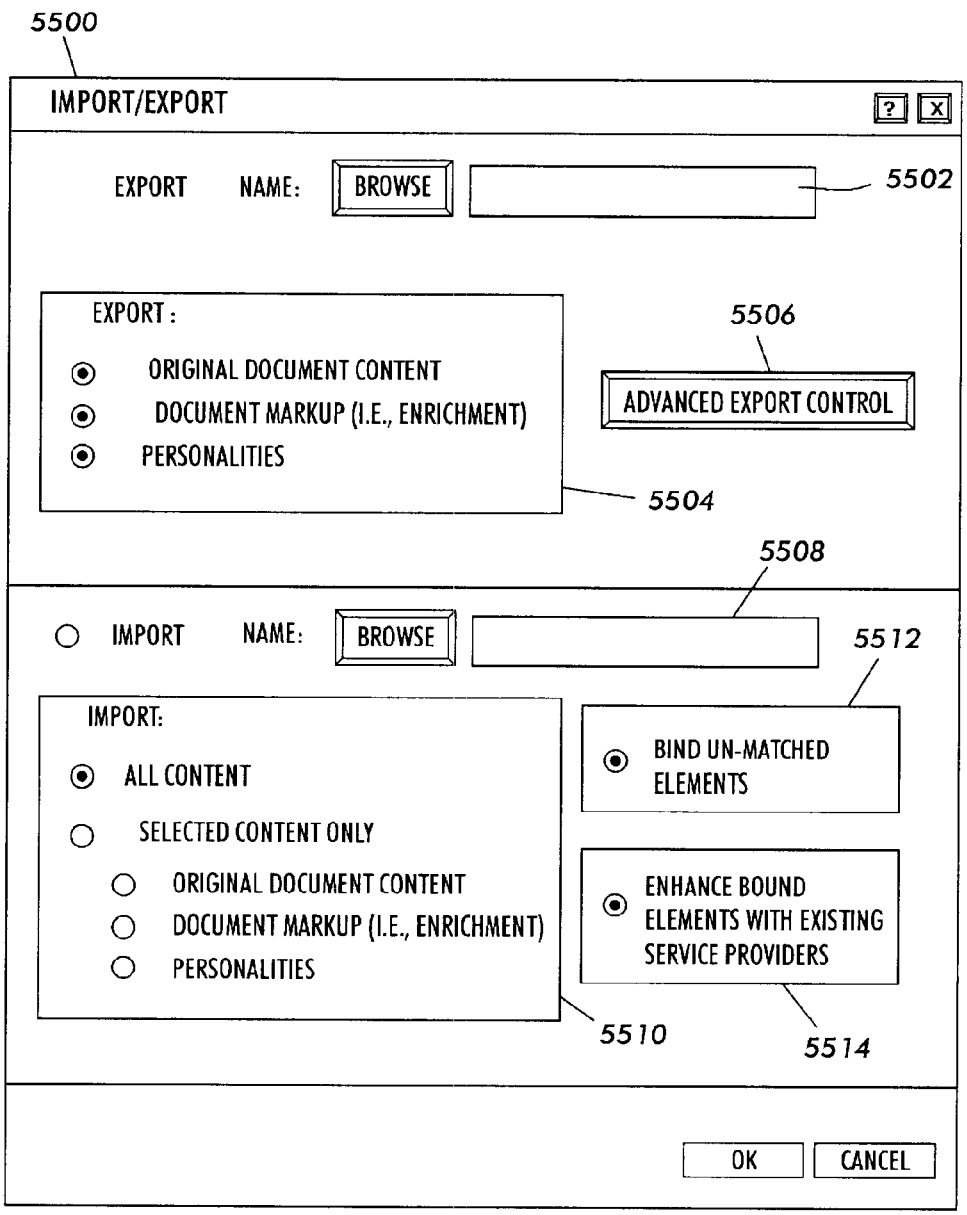
FIG. 55 illustrates one embodiment of an interface for specifying a metadocument exchange.

FIG. 55 illustrates one embodiment of an interface 5500 for specifying a meta-document exchange, which can be invoked by selecting button 1050 in client interface 1010 (shown in FIG. 10). In exporting a meta-document, the exchange process creates an export package that may be composed of a set of one or more export files. The set of export files in the export package encodes fully or partially the meta-document 100 specified at 5502. In exporting a meta-document, the exchange process is not concerned whether other meta-document servers have knowledge of the format used to export the meta-document. Accordingly as described below, the exchange process is adapted to bind information in an export package to its system when importing a set of export files.

G.4.1 Exporting

As shown in FIG. 55, the exchange process is adapted to export selected components of a meta-document at 5504. The general features of a meta-document 100, which is shown in FIG. 1, include: original document content 102, document markup 108 (i.e., document enrichment); and one or more personalities 104, each identifying one or more document service requests 106 and an entity database 111.

In one export format, a personality of a meta-document is represented using a set of services $S_{1,1}$ to $S_{1,j}$ and services providers $SP_{1,l}$ to $SP_{1,k}$. In another export format, the services and service providers are grouped into one or more personalities from available personalities $P_{1,1}$ to $P_{1,i}$. In this alternate export format, a personality identifies a named set of services and associated service providers. A detailed example of one possible export format is described in section G.4.2 below.

These different export formats may permit a set of dictionaries (i.e., entity database) $D_{1,1}$ to $D_{1,\lambda}$ that is used by the services to be recorded with a personality. Each dictionary is a static list of terms or regular expressions for identifying concepts within document content to be enriched (i.e., entities). Also these different export formats may permit a set of strategies $St_{1,1}$ to $St_{1,m}$ that are used to identify key concepts within the document to be specified within a personality. Strategies encode the order and mode in which entities in dictionaries are applied (see FIG. 61 and description thereof below). The mode of entities in a dictionary can be negative or positive, depending on whether a dictionary is used to identify concepts to be enriched or to eliminate concepts from the enrichment.

In addition, advanced export control features can be specified at 5506 shown in FIG. 55. One advance export control feature allows the exchange history (i.e., import and/or export) of a meta-document can be specified. The exchange history specifies whether a meta-document has already been exported from and/or imported to another meta-document server. In one embodiment, each meta-document server is identified by a unique set of properties that identify itself and possibly the services it uses (e.g., server id, service descriptions, providers, etc.).

Also the results of the last enrichment performed on a meta-document can be specified as an advanced export feature. The last enrichment can include additional content, links, and metadata. This advanced feature need not be specified to accurately export a meta-document since the importing meta-document server will recreate an enriched document using the exported document markup in any case. However, exporting this data in addition to document markup provides an importing meta-document server with additional information to bind to services in its services database that do not map to services defined in the imported meta-document. In the event no direct mapping between services exists, the results associated to the unavailable service(s) are displayed in the imported meta-document are marked with a status "frozen". A service can also be "frozen" if it cannot be accessed, which may occur when a service cannot be accessed because it is either unavailable because it is down or the meta-document server trying to access it cannot (e.g., it is off-line).

G.4.2 Exchange Format

FIGS. 56, 57, 58A, and 58B illustrate a detailed example of an export format. In this example, an exported meta-document is represented using a single file, although it will be appreciated that multiple files may be used to accomplish the same result. In one embodiment, multiple files are compressed and packaged into one file to represent the export file. Whenever this export file includes other documents, for example, the original document content of these documents needs to be included in the export file. For example, if original document content is formatted in HTML, then all the necessary HTML frames, images, style sheets, and JavaScript files needs to be included in the export files so that the original document content can be rebuilt at the importing meta-document server.

Generally the export file includes everything needed to rebuild a meta-document document at the importing meta-document server. More specifically, as shown in FIGS. 56, 57, 58A, and 58B, the export file includes all information relating to personalities, services, providers, dictionaries and strategies used to enrich document content. Advantageously, a meta-document can be completely or partially rebuilt at an importing meta-document server depending on how well services in the export file match with services available at the importing meta-document server.

It will be appreciated by those skilled in the art that although the export file format shown in FIGS. 56, 57, 58A, and 58B is described using XML, any equivalent format or syntax could be used to describe the export format. It will also be appreciated that although two types of results are illustrated in the export file format (i.e., entities and global results), the export file format may instead include additional information produced during document enrichment (e.g., keywords, categories, etc.).

In addition, this export format can also be used to export and then import complete services or even full personalities between meta-document servers provided that additional data is recorded in the export file(s). The additional data includes data describing connectors to information providers (i.e., wrappers) and the format of dictionaries and strategies.

G.4.3 Importing

Referring again to FIG. 55, which illustrates one embodiment of an interface 5500 for specifying a meta-document exchange invoked by selecting button 1050 in client interface 1010 (shown in FIG. 10). At 5508, the name of an exported meta-document file produced by the exchange process operating on a meta-document server (i.e., the exporting meta-document server) is specified by an importing meta-document server. In requesting that an exported meta-document file is imported, the user is provided with the ability to specify importing all or selected portions of the exported meta-document file into a new meta-document at 5510.

More specifically, the exchange process is adapted to import an exported meta-document file into a new meta-document, where the exported meta-document file may include one or more of the following elements: Personalities $P_{2,1}$ to $P_{2,n}$; services $S_{2,1}$ to $S_{2,o}$; service providers $SP2,1$ to $SP_{2,p}$; dictionaries $D_{2,1}$ to $D_{2,q}$; and strategies $St_{2,1}$ to $St_{2,r}$.

When personalities, services, providers, dictionaries and strategies of the exported meta-document file do not match or strictly include the personalities, services, service providers, dictionaries and strategies used by the importing meta-document server, then the importing meta-document server may be requested to bind unmatched elements (e.g., personalities, services, dictionaries, etc.) with elements existing in the importing meta-document server. In one embodiment shown in FIG. 55, the user is provided with the ability to specify whether to bind un-matched elements at 5512. Binding un-matched elements requires the importing meta-document server to identify a mapping between un-matched elements and compatible elements in the importing meta-document server.

In one embodiment, the following six actions are performed by the importing meta-document server to recreate a new meta-document given an exported meta-document file. It will be appreciated by those skilled in the art that this method is just one possible way to import an exported meta-document file and that alternate methods including the order of the actions and what is performed at each action may be varied to produce identical or similar results.

The first action involves extracting original document content forming part of the exported meta-document file and inserting the extracted original document content into the new meta-document.

The second action involves evaluating whether the personalities (i.e., $P_{1,1}$ to $P_{1,j}$) specified in the exported meta-document file are standard personalities. This second action is performed using properties that identify the personalities (e.g., name, creator, version number, unique identifier defined, for example, using the Digital Object Identifier standard, etc.). Standard personalities may, for example, be provided by software vendors and may be used by multiple systems. For all standard personalities, the exchange process matches the equivalent standard personalities from $P_{2,1}$ to $P_{2,n}$ to the personalities specified in the exported meta-document file. Identified matches are inserted into (or attached to) the new meta-document. Consequently, services and service providers associated with standard personalities are also inserted (or attached to), provided they correspond to services available at the importing meta-document server.

The third action involves identifying "standalone services" that are specified outside a personality (i.e., $S_{1,1}$ to $S_{1,j}$). Similar to personalities, the third action matches standard services available at the importing meta-document server using properties that identify the services in the exported meta-document file. Subsequently at this third action, these identified services are inserted (or attached to) in the new meta-document file. Consequently, any local dictionaries and strategies associated with these services are also inserted (or attached to), provided they correspond to dictionaries and strategies available at the importing meta-document server.

The fourth action involves creating at the importing meta-document server similar personalities for all un-matched personalities (i.e., non-standard personalities). This fourth action includes: examining properties of services, service providers, dictionaries and strategies that are needed to implement the un-matched personalities (hereinafter referred to as "the examined properties"); and creating a personality with services, providers, dictionaries and strategies present at the importing meta-document server that have properties similar to the examined properties. Subsequently, these identified matches are inserted into (or attached to) the new meta-document.

The fifth action involves creating at the importing meta-document server similar services for all un-matched standalone services (i.e., non-standard standalone services), which is described in detail in section G.4.4 below. When an exported meta-document file is successively imported and exported by several meta-document servers, any mapping performed at the second, third, forth or fifth actions is applied to the original service description and not to a service description of a mapped service.

The sixth action involves recording those non-standard personalities and non-standard standalone services that were not successfully mapped to personalities and services of the importing meta-document server. In the event there exists binding errors, entities affected by these binding errors in the imported document content are marked as "frozen" so that the user understands that they cannot be updated.

Also these binding errors can be recorded with the new meta-document and associated with a meta-document server identifier so that they may be identified in the event that the new meta-document is imported by the exporting meta-document server. At such time the new meta-document is imported by the exporting meta-document server, any binding errors are eliminated by activating the content previously marked as "frozen". In addition, these binding errors can be either presented to a user for error reporting purposes or for requesting manual mapping to personalities and services existing on the importing meta-document server. Binding errors can be further eliminated as new services are added to the importing meta-document server. In this embodiment, as a new service is added to the importing meta-document server, meta-documents with unresolved binding errors (i.e., frozen content) that match against the new service are activated.

G.4.4 Matching Method

This section describes the fifth action (introduced in section G.4.3) that involves creating at the importing meta-document server similar services for all non-standard standalone services. Specifically at this fifth action, the importing meta-document server attempts to map all non-standard standalone services onto an existing service with dictionaries and strategies present at the importing meta-document server that have properties similar to the examined properties of the exported meta-document file. Subsequently, these identified matches are inserted into (or attached to) the new meta-document. Specifically, this mapping to non-standard standalone services described below is performed by first attempting to satisfy a category match; if a category match is successful, then a dictionary match, and a key match are performed. The category match is necessary but not sufficient for a binding to take place. That is, both the dictionary match and the key match must be satisfied in addition to the category match to successfully bind two services.

In addition to performing a binding function, the method described in this section for performing a mapping to non-standard standalone services can be used to add related service providers available at the importing meta-document server to services (standalone or referenced by a personality) already bound to the new meta-document. In operation, the user may select this added feature at 5514 in the interface 5500 shown in FIG. 55. More specifically, this feature allows elements forming part of the exported elements that are bound to service providers available at the importing meta-document server to be augmented with additional related service providers also available at the importing meta-document server.

To achieve a category match between service, providers, dictionaries and strategies, the importing meta-document server develops an ontology of namespaces that describes all entities in the exported meta-document file. Each class of namespaces allows compatible entities to be classified in the ontology. In developing an ontology, any service and entity specified in the exported meta-document file is matched with a service in the importing meta-document server if identifications and descriptions correspond strictly to a common namespace (i.e., fall in the same category in the ontology).

In one embodiment, the importing meta-document server enhances the ontology of namespaces with mapping information from previous exported meta-document files that were imported. If a meta-document has been exchanged several times between the exporting meta-document server and the importing meta-document server, mappings between respective services of the exporting meta-document server and the importing meta-document server is more readily defined.

Thus, in the event services from the exporting meta-document server do not map exactly onto the description of services from the importing meta-document server (i.e., step four in section 4.3 above), then partial mappings between descriptions of services is examined. If a partial mapping between descriptions of services exists (e.g., namespaces "stock quotes delayed" and "stock quotes real time") then a dictionary match and a key match are initiated.

More specifically, if a non-standard standalone service from the exporting meta-document server cannot be exactly mapped to a service from the importing meta-document server because no service from the importing meta-document server has an exact matching description, then two services can be bound only if they are identified by the same category in the ontology and satisfy a dictionary match and a key match.

Assuming that each dictionary has an associated category in an ontology of namespaces, and that S and S' are services from the exporting and importing meta-document servers, respectively, such that: category(S) equals category(S'); and $\{D_1, \ldots, D_n\}$ and $\{D'_1, \ldots, D'_{n'}\}$ are the categories of the dictionaries associated with the services S and S'. Also, assuming each service is associated with a set of providers, and each provider use a "key" that describes the type of information needed to satisfy a query. This key may be "generic" to the service provider (e.g., "TickerSymbol" for a stock quote service). Alternatively, this key may be "specific" to the service provider (e.g. "BloombergKeyId") when the service provider cannot use a generic key.

To determine if service S can be mapped to service S', the importing meta-document server evaluates whether the intersection of the categories of dictionaries associated with services S $\{D_1, \ldots, D_n\}$ and the categories of dictionaries associated with services S' $\{D'_1, \ldots, D'_{n'}\}$ yields any matching dictionaries, and whether any of the keys of any of the matching dictionaries match. A specific key that is associated with a generic key is said to match this generic key. Alternatively, a first specific key is said to match a second specific key if they both can reduce to an equivalent generic key. If at least one of the keys of matching dictionaries match then the service S can be mapped to the service S' in the new meta-document. That is, services available at the importing meta-document server may be specified in the new meta-document when the services partially map to a predefined categorization, and have at least one common dictionary and key.

In one embodiment, a service S can be mapped onto a service S' by the importing meta-document server when one or more of the following mappings can be deduced: an equivalent mapping, a specific mapping, and a generic mapping. An equivalent mapping occurs when all of the dictionaries associated with the services S and S' are equivalent (i.e., $\{D_1, \ldots, D_n\} = \{D'_1, \ldots, D'_{n'}\}$); in this case, services S and S' are said to be equivalent. A specific mapping occurs when all of the dictionaries associated with the services S map to a subset of the dictionaries associated with the services S' (i.e., $\{D_1, \ldots, D_n\} \subset \{D'_1, \ldots, D'_{n'}\}$); in this case, service S is said to be more specific than service S'. A generic mapping occurs when all of the dictionaries associated with the services S' map to a subset of the dictionaries associated with the services S (i.e., $\{D_1, \ldots, D_n\} \supset \{D'_1, \ldots, D'_{n'}\}$); in this case, service S is said to be more generic than service S'.

G.5 Alternate Embodiments

This section describes an alternate embodiment of the meta-document and meta-document server.

Figure 59:
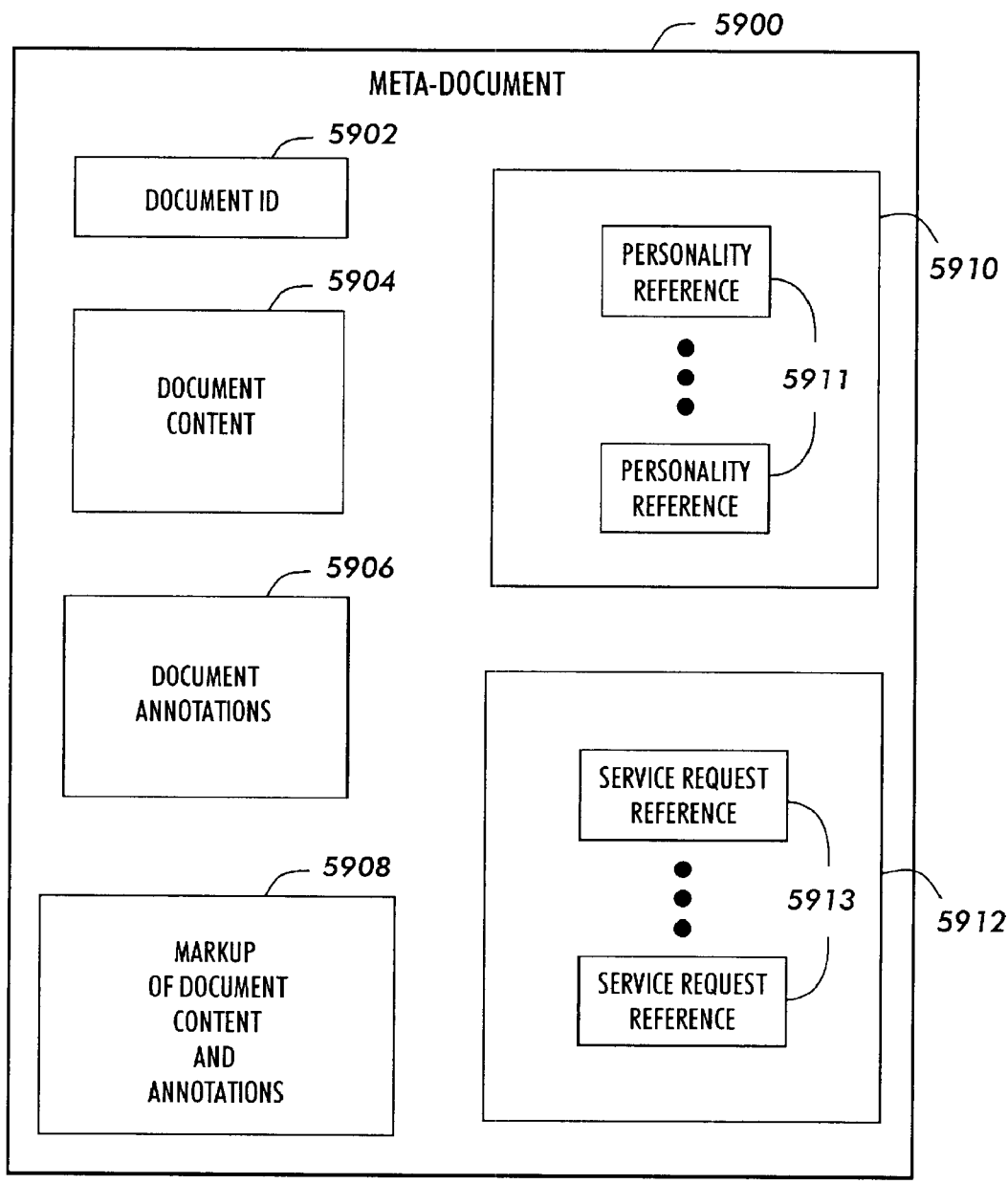
FIG. 59 illustrates another embodiment of a meta-document.

FIG. 59 illustrates a meta-document with document ID 5902, document content 5904, document annotations 5906. The document ID 5902 records information concerning the meta-document such as a unique identifier, and properties such as owner, permissions, etc. The document content 5904 identifies the original content associated with the meta-document. The document annotations 5906 includes any annotations (e.g., comments) added to the original content 5904 by a user. In addition, a meta-document may include document markup 5908 of the document content 5904 and/or document annotations 5906.

Figure 60:
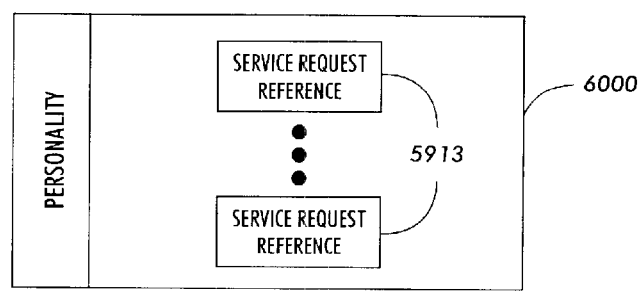
FIG. 60 illustrates an embodiment of the contents of a personality.

FIG. 59 also illustrates that the meta-document 5900 may include a list 5910 of one or more personality references 5911. Also, the meta-document 5900 may include a list 5912 of one or more service reference requests 5913. FIG. 60 illustrates the contents of a personality 6000 that is referenced by a personality reference 5911. The personality 6000 includes a list of one or more service request references 5913. In addition, the meta-document 5900 may include an entity database 5914 that sets forth entities that are related in a document-centric way to the meta-document (e.g., user defined entities specific to the document content or document markup).

Figure 61:
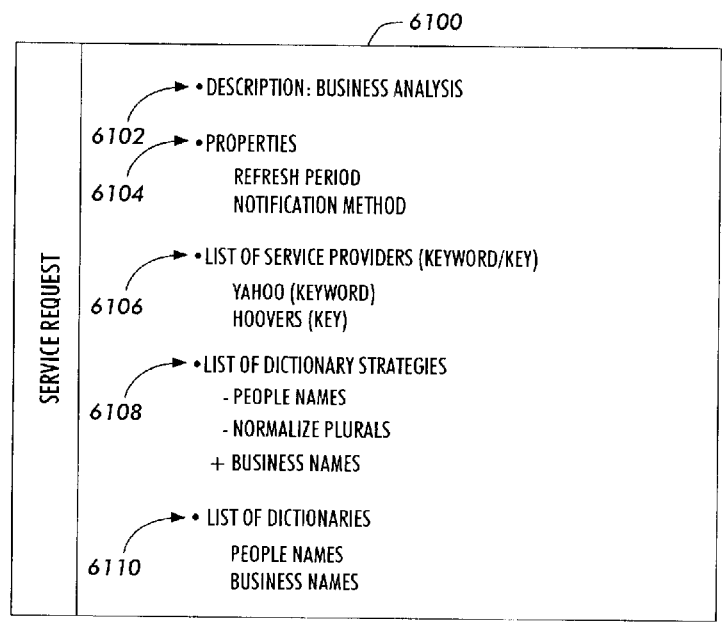
FIG. 61 illustrates an embodiment of the contents of a service request.

FIG. 61 illustrates a service request 6100 that is referenced by a service request reference 5913. Each service request includes a description 6102, properties 6104 (e.g., refresh period between enrichments, notification method when content is enriched), a list of service providers 6106, strategies 6108, and dictionaries 6110 (i.e., entity databases). The list of service providers 6106 specifies a service provider and whether the service provider anticipates receiving a keyword or a key and/or requires a login identifier (and/or a new session at each login). A keyword is almost any content that is used to submit to a generic service provider (e.g., yahoo), whereas a key is content in a specific format that is used to access certain specific information (e.g., a ticker symbol to access a stock quote).

The strategies 6108 are used to identify key concepts within the document to be specified within a personality. Strategies are rules that encode the order and mode in which entities in dictionaries are applied to document content or markup. The entities in a dictionary can be applied negatively or positively, depending on whether a dictionary is used to identify concepts to be enriched or to eliminate concepts from being enriched. In the example shown in FIG. 61, first people names are removed from those entities to be marked up, subsequently plurals as normalized and eliminated, and business names are identified.

In an alternate embodiment of the scheduler 204 and content manager 208 shown starting in FIG. 2, the scheduler is given alternative or additional functions of identifying meta-documents in the meta-documents database 202 that need periodic updates performed thereto and awakens the content manager 204 (i.e., builder) as necessary. In addition, the scheduler can be programmed with maintenance events and/or batch processing events. The programming of such events can be performed by the system and/or a user. An example of a batch processing event, is the processing of enrichment of an identified folder of document(s) and/or document reference(s). The functions of the content manager in this embodiment are to identify document services that need to be satisfied. This can occur once it receives a meta-document to operate on either directly by a user at a client interface or by the scheduler. For each of the services that needs to be applied, the content manager builds a service request, triggers it, waits for results, and packages the results into markup of the meta-document.

Figure 62:
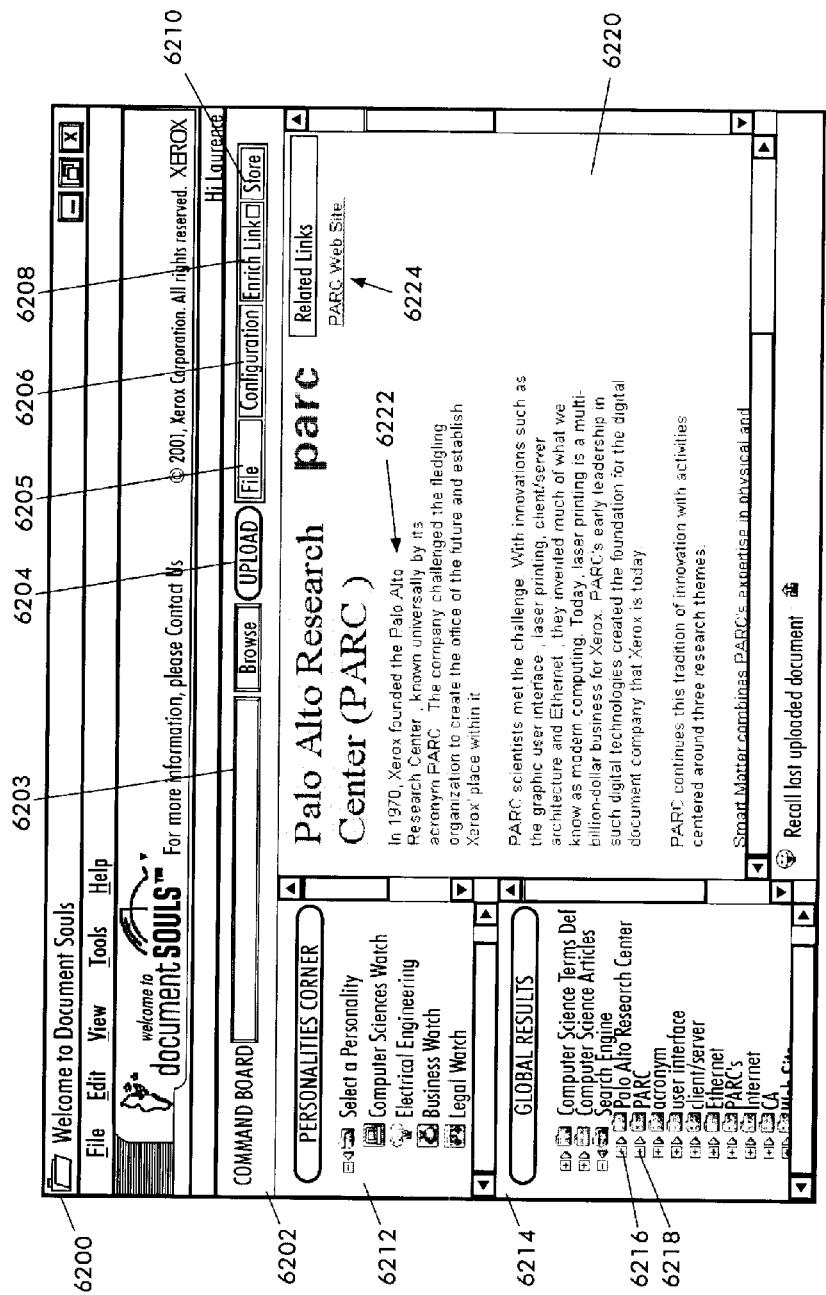
FIG. 62 illustrates an alternate embodiment of the client interface shown in FIG. 10.

FIG. 62 illustrates an alternate embodiment of the client interface shown in FIG. 10. The client interface 6200 shown in FIG. 62 includes a command board 6202, which provides a user with the option of uploading a specified URL at 6203 by clicking upload button 6204. Depending on the manner in which a user has defined marking options (discussed below with reference to FIG. 67), the uploaded document is either automatically enriched with a specified personality or enriched once a user specifies a personality in personality corner frame 6212.

Figure 63:
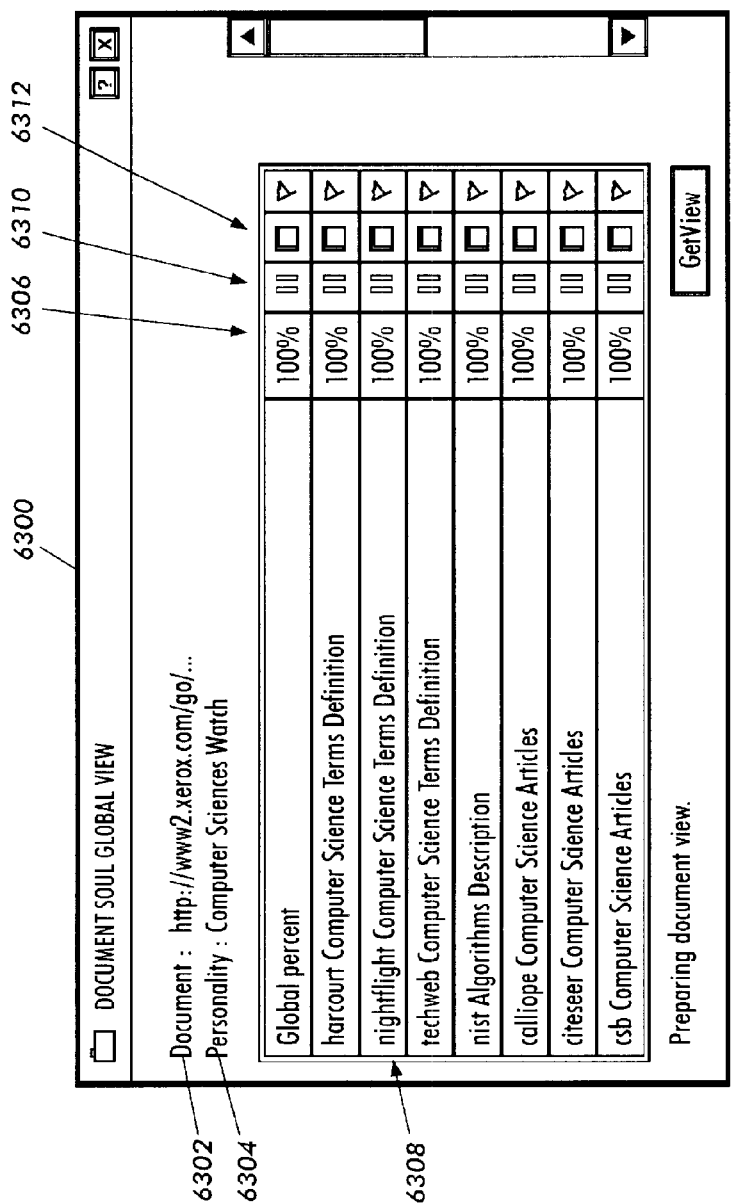
FIG. 63 illustrates a status window that displayed when enrichment is invoked for a specified document.

When enrichment is either automatically or manually invoked a status window 6300 shown in FIG. 63 is presented to a user for the specified document 6302 and the specified personality 6304. The status window shows the percentage completion 6306 for each specified service 6308 of the personality. Services may be individually paused at 6310 or stopped at 6312. A service that is stopped is terminated for example if there is no response from the service or paused if that response is known to be temporary. Generally, enrichment is not shown on the uploaded document until all service requests are completed. However, get view button 6314 allows a user to temporarily view the enrichment of a document before all service requests have completed. In the example shown in FIG. 63, all service request have completed and the window will subsequently disappear and the uploaded document enriched.

Figure 64:
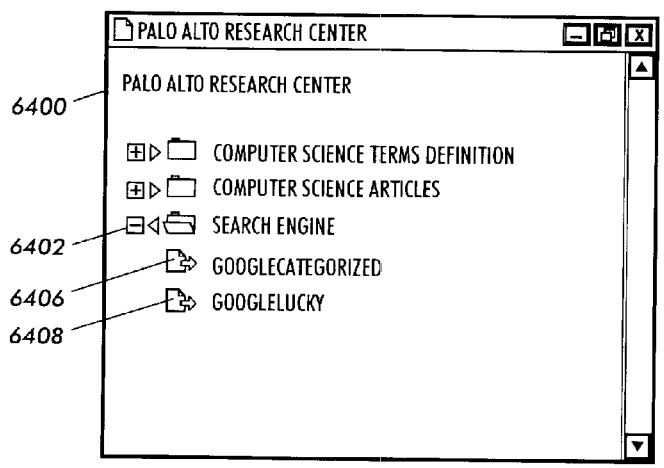
FIGS. 64 and 65 illustrate two examples of popup windows that appear when identified entities are selected.
Figure 65:
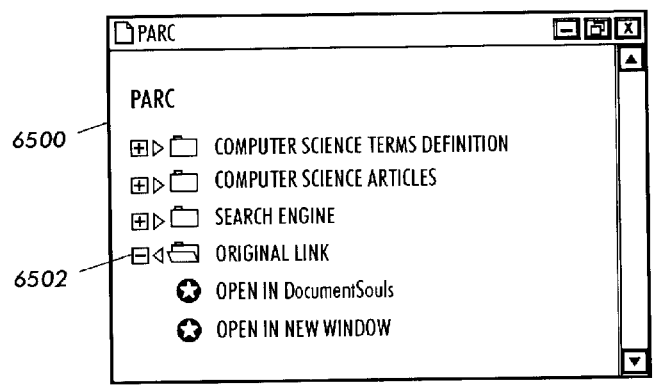

Once a document is uploaded and/or enriched, an enrich link button 6208 on the command board 6202 allows a user to specify whether or not to enrich links that are followed in the document currently viewed. These links may be links that are enriched by the meta-document server or links that previously existed in the linked document. For example, in the document view frame 6220 of the client interface 6200 highlighted text "Palo Alto" identified by reference number 6222 as well as highlighted test "PARC Web Site" identified by reference number 6224 have been enriched by the meta-document server. The text 6224 unlike the text 6222 included a hyperlink (as shown by the underlining) in the original document. When text 6222 and the text 6224 are selected by a user, popup windows 6400 and 6500 appear, respectively, as shown in FIGS. 64 and 65. As shown in FIG. 65, the original link is accessible at 6502 and may be viewed in either the meta-document client window or in a separate browser window.

More specifically, each of the popup windows 6400 and 6500 set forth those services which can be applied to an identified entity. For example, the search engine service 6402 shown in FIG. 64 may be invoked using either a query 6406 enhanced to focus on a particular category of a search engine as set forth in section F.3. In addition, a query 6408 may be invoked that is not enhanced in any form. For both queries 6406 and 6408, in one embodiment the highest ranked result is automatically displayed and if specified enriched. It will be appreciated that in alternate embodiments, other types of queries such as those discussed in section F.3 above may be specified at 6402.

Global results frame 6214 shown in FIG. 62 provides direct access to services of entities identified in uploaded and enriched document content. Folders 6216 and 6218 effectively provide the same information as shown in popup windows 6400 and 6500 shown in FIGS. 64 and 65 respectively. Thus entities with services attached to them may be invoked either directly through document view frame 6220 by selecting the entity or through global results frame 6214 through services to which entities have been linked.

Figure 66:
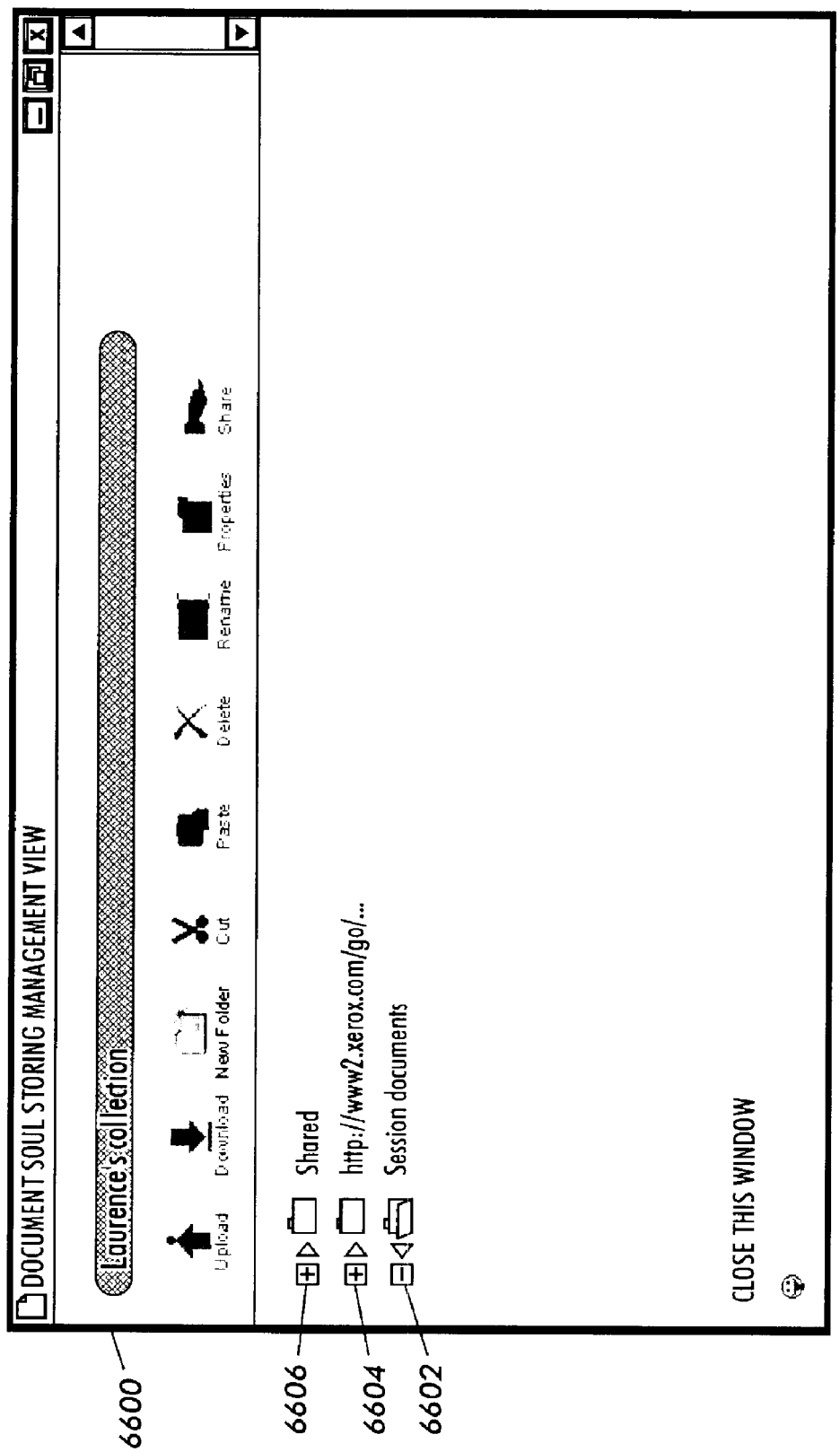
FIG. 66 illustrates an example of a document storing management view of a user's files.

A store button 6210 on the command board 6202 provides the user with the option of storing an uploaded and enriched document as shown in FIG. 62. Unless a document is stored, its enrichment will only exist for the current session a user is logged in. In addition, under the file tab 6205 the user is given the ability to manage stored files. FIG. 66 illustrates a document storing management view 6600 of a user's files. In this view, documents uploaded for the current session can be viewed in folder 6602. In addition, documents stored by a user are viewed in the view 6600 such as folder 6604. The storing management view 6600 also allows a user to add to and view shared documents at 6606.

Figure 67:
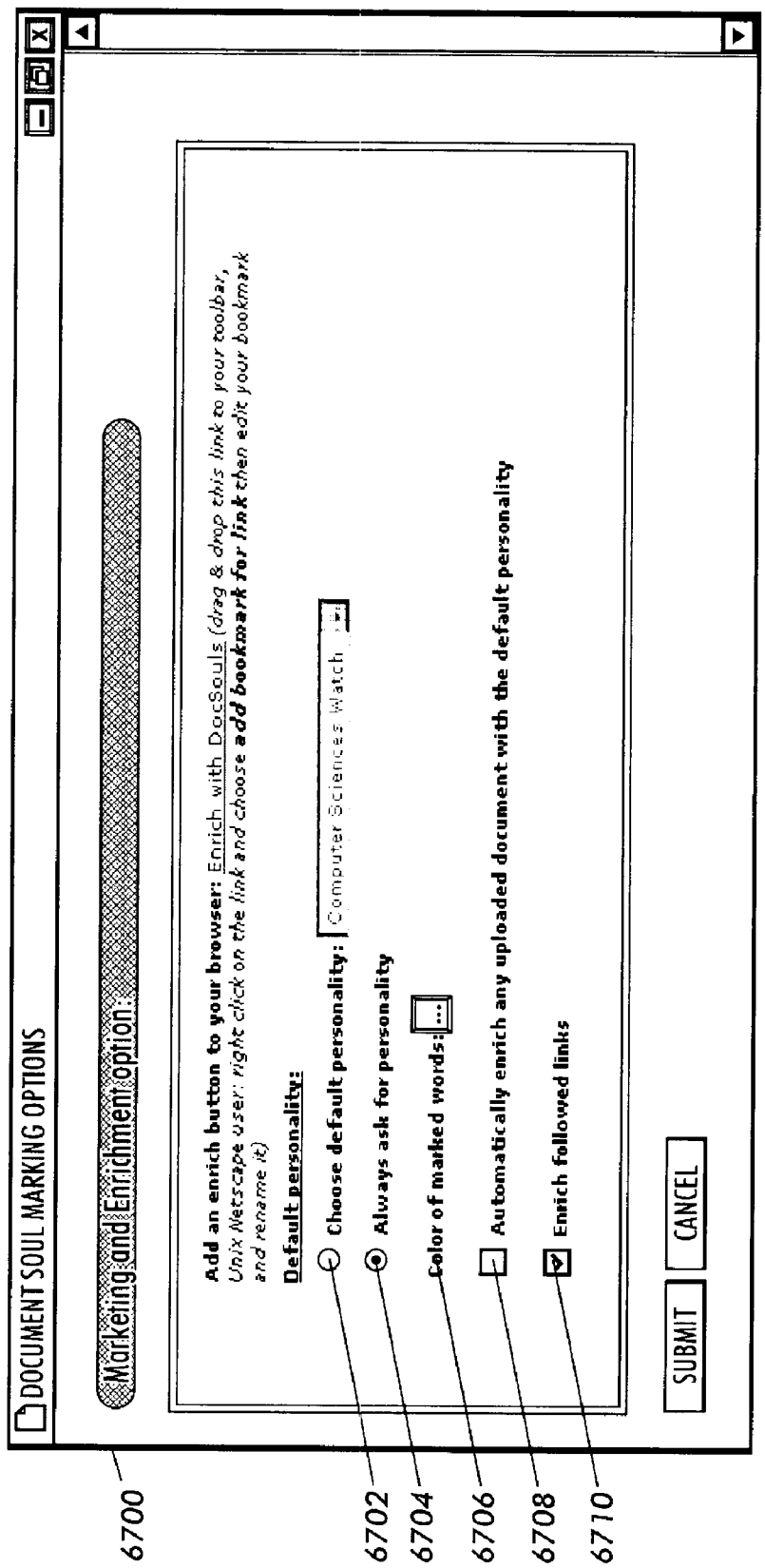
FIG. 67 illustrates an example interface for selecting document marking options.

A user options window 6700 shown in FIG. 67 may be accessed by a user in the configuration tab 6206 shown in FIG. 62. The user options window 6700 provides a user with the ability to choose a default personality or always be asked to select a personality at 6702 and 6704, respectively. In addition, the user options window allows the format of marked up content to be specified at 6706, whether the default personality should be applied to each uploaded document at 6708, and whether to always enrich followed links at 6710 (as opposed to a specific uploaded document at 6208 shown in FIG. 62).

Figure 68:
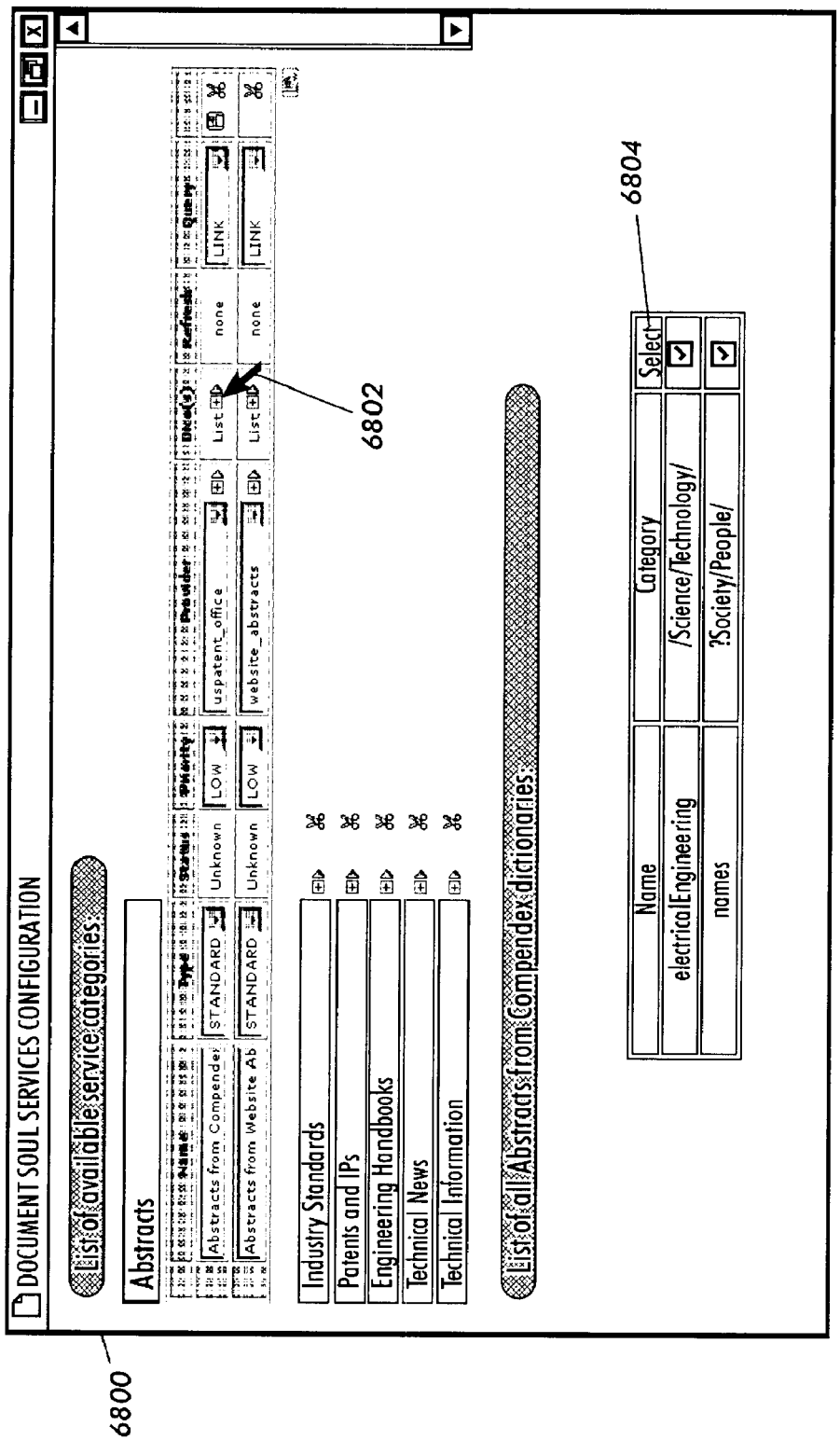
FIG. 68 illustrates an example of an interface for configuring services.

A services configuration window 6800 shown in FIG. 68 may be accessed by a user in the configuration tab 6206 shown in FIG. 62. For each specified service under each category of service, a user may specify: the type (standard, or special); the status (active, inactive); the priority (high, medium, low); the information provider; the list of dictionaries used by the service; its refresh period; and whether to attach links or content. By selecting a dictionary list for a service as illustrated by pointer 6802, a list of dictionaries appears as shown at 6804. Thus by specifying which dictionaries (i.e., entity databases) that can be applied by a service, the service can be made more specific or more general.

H. Miscellaneous

It will be appreciated by those skilled in the art that the meta-document server 200 and other computer systems described herein (e.g., computer 226, mobile phone 219, etc.) include software components and hardware components, and that such computer systems can be either a personal computer, workstation, a mobile/cellular phone, a handheld device etc.

The hardware components include a Central Processing Unit (i.e., CPU), Random Access Memory (RAM), Read Only Memory (ROM), User Input/Output ("I/O"), and network I/O. The User I/O may be coupled to various input and output devices, such as a keyboard, a cursor control device (e.g., pointing stick, mouse, etc.), a display, a floppy disk, a disk drive, an image capture device (e.g., scanner, camera), etc.

RAM is used by CPU as a memory buffer to store data. A display is an output device that displays data provided by CPU or other components in a computer system. In one embodiment, display is a raster device. Alternately, the display may be a CRT or LCD. Furthermore, user I/O may be coupled to a floppy disk and/or a hard disk drive to store data. Other storage devices such as nonvolatile memory (e.g., flash memory), PC-data cards, or the like, can also be used to store data used by computer system.

The network I/O provides a communications gateway to a network 221 (shown in FIG. 2) such as a LAN, WAN, or the Internet. The network I/O is used to send and receive data over a network 221 connected to one or more computer systems or peripheral devices.

The software components includes an operating system software, application program(s), and any number of elements of the meta-document server 200. It should be noted that not all software components are required for all the described embodiments. The operating system software may represent an MS-DOS, the Macintosh OS, OS/2, WINDOWS, WINDOWS NT, Unix operating systems, Palm operating system, or other known operating systems. Application Program(s) may represent one or more application programs such as word processing programs, spreadsheet programs, presentation programs, auto-completion programs, editors for graphics and other types of multimedia such as images, video, audio etc.

It will also be appreciated that such application programs including any of the meta-document services of the meta-document server may be accessed through a "user interface" or "client interface" that may take one or more forms that include, graphical user interfaces, paper user interfaces, and application program interfaces (APIs). Thus, the use of the term "user interface" or "client interface" is defined herein to include access to services offered by a program invoked by a user through a graphical user interface, or the like, or by another program through an API.

The computer system may be implemented by any one of a plurality of configurations. For example, processor may in alternative embodiments, be defined by a collection of microprocessors configured for multiprocessing. In yet other embodiments, the functions provided by software components may be distributed across multiple computing devices (such as computers and peripheral devices) acting together as a single processing unit. Furthermore, one or more aspects of software components may be implemented in hardware, rather than software. For other alternative embodiments, the computer system may be implemented by data processing devices other than a general purpose computer.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

The invention has been described with reference to particular embodiments. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A system for enriching document content, comprising:
    a user interface for specifying a personality defining a set of document service requests that identify enrichment themes for recognizing and annotating entities associated with the personality;
    a user-manager for receiving document content and the personality; the user-manager forming a meta-document with the document content and the personality;
    a scheduler for selecting at least a first and a second document service request from the set; the scheduler initiating and managing communication with a service provider to satisfy the selected document service request; wherein the first selected document service request in the set recognizes entities in the document content, and the second selected document service request in the set uses the recognized entities to carry out the second document service request;
    a content manager for integrating into the meta-document results received from carrying out the selected document service requests: the content manager integrating the results into the meta-document as document markup;
    wherein the user interface, the user-manager, the scheduler, and the content manager operate together to automatically generate or recommend new personalities or modify existing personalities using one or more in combination of:
        a set of algebraic computations for combining two or more personalities,
        an expanded document generated using a set of document references from document content for identifying entities and creating document service requests of personalities,
        a knowledge level for identifying personalities associated with experts or novices in a field, and
        a classification of personalities for associating a personality with document content based on extracted features.

2. The system according to claim 1, wherein the personalities are automatically generated, recommended or modified using a set of learning personalities that include services for annotating expressions identified in document content with translations, definitions, or tutorials.

3. The system according to claim 1, further comprising:
    means for displaying at a user interface a personality that includes a set of one or more services; each service in a personality having at least one of a set of service providers selected; each selected service provider having associated therewith one or more types of entities; and
    responsive to user input, means for modifying the personality to define one of a new personality and a modified personality by modifying the set of services.

4. The system according to claim 1, further comprising:
    means for defining a first personality having a first set of services;
    means for defining a second personality having a second set of services;
    means for applying an operator to the first personality and the second personality to create a third personality having a set of services that includes one or more of the services from the first set of services and the second set of services; wherein the third personality is a new personality.

5. The system according to claim 4, wherein the operator performs one of adding, subtracting, merging, composition, and intersection to services in the first set of services and the second set of services.

6. The system according to claim 1, further comprising:
    an entity extractor for developing an expanded document with a set of identified documents and constructing an entity database with the expanded document; and
    a service generator for creating a service request for each form identified in the expanded document and defining a new personality using the created service requests and the entity database.

7. The system according to claim 6, further comprising means for filtering the service request with no utility before defining the new personality using the entity database.

8. The system according to claim 6, wherein the set of documents is a set of links.

9. The system according to claim 1, further comprising:
    means for receiving a user defined question;
    means for identifying lexicons in the user defined question;
    means for replacing the identified lexicons with generic symbols to define a generic question;
    means for adding the generic question to one of a new personality and an existing personality.

10. The system according to claim 9, further comprising:
    means for searching for entities that satisfy the lexicons in the generic question to define a specific question; and
    means for answering the specific question using the entities that satisfy the lexicons in the generic question; wherein the lexicons are defined in an existing personality.

11. A method for enriching document content, comprising:
specifying at a user interface a personality defining a set of document service requests that identify enrichment themes for recognizing and annotating entities associated with the personality;
receiving at a user-manager document content and the personality; the user-manager forming a meta-document with the document content and the personality;
selecting with a scheduler at least a first and a second document service request from the set to initiate and manage communication with a service provider and satisfy the selected document service request; wherein the first selected document service request in the set recognizes entities in the document content, and the second selected document service request in the set uses the recognized entities to carry out to carry out the second document service request;
integrating with a content manager into the meta-document results received from carrying out the selected document service request: the content manager integrating the results into the meta-document as document markup;
operating the user interface, the user-manager, the scheduler, and the content manager together to automatically generate or recommend new personalities or modify existing personalities using one or more in combination of:
a set of algebraic computations for combining two or more personalities,
an expanded document generated using a set of document references from document content for identifying entities and creating document service requests of personalities,
a knowledge level for identifying personalities associated with experts or novices in a field, and
a classification of personalities for associating a personality with document content based on extracted features.

12. The method according to claim 11, wherein the personalities are automatically generated, recommended or modified using a set of learning personalities that include services for annotating expressions identified in document content with translations, definitions, or tutorials.

13. The method according to claim 11, further comprising:
displaying at a user interface a personality that includes a set of one or more services; each service in a personality having at least one of a set of service providers selected; each selected service provider having associated therewith one or more types of entities; and
responsive to user input, modifying the personality to define one of a new personality and a modified personality by modifying the set of services.

14. The method according to claim 11, further comprising:
defining a first personality having a first set of services;
defining a second personality having a second set of services;
applying an operator to the first personality and the second personality to create a third personality having a set of services that includes one or more of the services from the first set of services and the second set of services; wherein the third personality is the new personality.

15. The method according to claim 14, wherein the operator performs one of adding, subtracting, merging, composition, and intersection to services in the first set of services and the second set of services.

16. The method according to claim 11, further comprising:
identifying a set of documents;
developing an expanded document with the set of identified documents;
constructing an entity database with the expanded document;
creating a service request for each form identified in the expanded document;
defining the new personality using the created service requests and the entity database.

17. The method according to claim 16, further comprising filtering the service request with no utility before defining the new personality using the entity database.

18. The method according to claim 11, further comprising:
receiving a user defined question;
identifying lexicons in the user defined question;
replacing the identified lexicons with generic symbols to define a generic question;
adding the generic question to one of a new personality and an existing personality.

19. The method according to claim 18, further comprising:
searching for entities that satisfy the lexicons in the generic question to define a specific question; and
answering the specific question using the entities that satisfy the lexicons in the generic question;
wherein the lexicons are defined in an existing personality.

20. The method according to claim 11, further comprising:
extracting features from the document content;
categorizing the features into a class of enrichment themes; and
recommending one or more personalities associated with the class of enrichment themes to enrich the document content.

21. The method according to claim 20, wherein the features are categorized into a plurality of classes of enrichment themes that are ranked using a user profile.

22. The method according to claim 20, further comprising:
creating a profile of the document content by categorizing the document content; and
using the profile for identifying experts to enrich the document content.

23. The method according to claim 11, further comprising providing at the user interface selections for one of inserting enrichment in the document content and linking enrichment to the document content.

24. The method according to claim 11, further comprising providing at the user interface selections for specifying how frequently to enrich the document content.

25. The method according to claim 11, further comprising providing at the user interface selections for specifying one of an expert mode and a novice mode to enrich the document content.

* * * * *